(12) United States Patent
Lewis et al.

(10) Patent No.: US 12,423,032 B2
(45) Date of Patent: Sep. 23, 2025

(54) SYSTEMS AND METHODS FOR IMPLEMENTING AND USING A CROSS-PROCESS QUEUE WITHIN A SINGLE COMPUTER

(71) Applicant: SAS Institute Inc., Cary, NC (US)

(72) Inventors: Lawrence Edmund Lewis, Durham, NC (US); Mohammadreza Nazari, Wayne, PA (US); Amirhassan Fallah Dizche, Woburn, MA (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/737,740

(22) Filed: Jun. 7, 2024

(65) Prior Publication Data

US 2025/0068490 A1    Feb. 27, 2025

Related U.S. Application Data

(63) Continuation of application No. 18/737,592, filed on Jun. 7, 2024, now Pat. No. 12,271,635.
(Continued)

(51) Int. Cl.
*G06F 9/54* (2006.01)
*G06F 3/06* (2006.01)
*G06F 9/48* (2006.01)

(52) U.S. Cl.
CPC .......... *G06F 3/0659* (2013.01); *G06F 3/0619* (2013.01); *G06F 3/0673* (2013.01); *G06F 9/4881* (2013.01); *G06F 9/541* (2013.01)

(58) Field of Classification Search
None
See application file for complete search history.

(56) References Cited

U.S. PATENT DOCUMENTS 5,812,843 A * 9/1998 Yamazaki ........... G06F 9/45537
709/201
6,182,158 B1 * 1/2001 Kougiouris ........... G06F 9/4843
719/328
(Continued)

FOREIGN PATENT DOCUMENTS

CN   100673497     * 12/2009   ........... G06F 15/167
CN   101477511 B  *  8/2010   ........... G06F 15/167
(Continued)

OTHER PUBLICATIONS

Mod Python, "4.1 Multiple Interpreters," 2024 pp. 1-1.
(Continued)

*Primary Examiner* — Charles E Anya
(74) *Attorney, Agent, or Firm* — Padowithz Alce; Quintin Scheitlin; Alce PLLC

(57) ABSTRACT

A system, method, and computer-program product includes implementing a cross-process queue within a single computer that is configured to transfer a data block between an operating system process executing a write operation and an operating system process executing a read operation, initializing in-memory cell indices within the cross-process queue that include a write operation index tracking index values of one or more cells within the cross-process queue that are available to write and a read operation index tracking index values of one or more cells within the cross-process queue that are available to read, and implementing a cell synchronization data structure tracking states of a plurality of cells of the index of cells of the cross-process queue.

30 Claims, 28 Drawing Sheets

Related U.S. Application Data

(60) Provisional application No. 63/534,326, filed on Aug. 23, 2023.

(56) References Cited

U.S. PATENT DOCUMENTS

| | | | |
|---|---|---|---|
| 6,757,904 B1 * | 6/2004 | Woodruff | G06F 9/54 |
| | | | 719/319 |
| 7,380,073 B2 | 5/2008 | Shorb | |
| 7,594,091 B2 | 9/2009 | Shorb | |
| 7,627,710 B1 | 12/2009 | Todd et al. | |
| 8,429,675 B1 * | 4/2013 | Radhakrishnan | G06F 9/5077 |
| | | | 719/319 |
| 8,572,617 B2 | 10/2013 | Shorb | |
| 9,213,586 B2 | 12/2015 | Shorb | |
| 10,459,849 B1 | 10/2019 | Shorb et al. | |
| 10,803,023 B2 | 10/2020 | Ghazaleh | |
| 10,803,024 B2 | 10/2020 | Ghazaleh | |
| 11,042,549 B2 | 6/2021 | Ghazaleh | |
| 11,099,899 B2 | 8/2021 | Shorb | |
| 11,379,404 B2 * | 7/2022 | Schmidt | G06F 13/1673 |
| 2002/0152280 A1 * | 10/2002 | Winkeler | H04L 67/10 |
| | | | 709/217 |
| 2004/0015979 A1 * | 1/2004 | Shen | G06F 9/544 |
| | | | 718/107 |
| 2008/0147213 A1 | 6/2008 | Omiya et al. | |
| 2009/0282392 A1 * | 11/2009 | Russell | G06F 16/258 |
| | | | 717/131 |
| 2012/0005691 A1 * | 1/2012 | Wong | G06F 9/45558 |
| | | | 719/321 |
| 2013/0246714 A1 | 9/2013 | Lv et al. | |
| 2014/0006718 A1 | 1/2014 | Ramani-Augustin et al. | |
| 2014/0215181 A1 | 7/2014 | Svendsen | |
| 2015/0046661 A1 | 2/2015 | Gathala et al. | |
| 2016/0092357 A1 | 3/2016 | Rehana et al. | |
| 2017/0017412 A1 | 1/2017 | Luan et al. | |
| 2017/0026459 A1 * | 1/2017 | Trott | H04L 67/10 |
| 2019/0012269 A1 | 1/2019 | Bubb et al. | |
| 2019/0196745 A1 | 6/2019 | Persson et al. | |
| 2019/0370288 A1 | 12/2019 | Bequet et al. | |
| 2022/0342573 A1 | 10/2022 | Cao et al. | |
| 2024/0176603 A1 * | 5/2024 | Raedle | G06N 20/00 |

FOREIGN PATENT DOCUMENTS

| | | | | |
|---|---|---|---|---|
| CN | 101847105 A | * | 9/2010 | G06F 9/455 |
| CN | 110347517 A | * | 10/2019 | G06F 21/71 |
| CN | 115437719 A | * | 12/2022 | |
| WO | WO-9912095 A1 | * | 3/1999 | G06F 9/45537 |
| WO | WO-2004088508 A2 | * | 10/2004 | G06F 8/00 |
| WO | WO-2013059905 A1 | * | 5/2013 | G06F 3/038 |

OTHER PUBLICATIONS

Github, "Multicorn is a Multi-Interpreter Server for Python," 2024, pp. 1-3.
IN202421040823A, "Application not yet published", pp. 1-15.
Python Enhancement Proposals, "Pep 554—Multiple Interpreters in the Stdlib," Sep. 5, 2017, pp. 1-40.
Python Enhancement Proposals, "Pep 734—Multiple Interpreters in the Stdlib," Nov. 6, 2023, pp. 1-23.
Mouse Vs Python, "Python 3.13 Allows Disabling of the GIL + Subinterpreters.," Mar. 14, 2024, pp. 1-6.
Stinner et al., "The 2021 Python Language Summit: Progress on Running Multiple Python interpreters in Parallel in the Same Process," Python Software Foundation, May 16, 2021, pp. 1-3.
Github, "Running Python Parallel Applications with Sub Interpreters," Nov. 17, 2023, pp. 1-19.
Microsoft, "Select and Install Python Interpreters—Visual Studio (Windows)," 2022, pp. 1-4.
Jake Edge, "Subinterpreters for Python," lwn.net, May 13, 2020, pp. 1-10.
Nathan Ojaokomo, "What is a Python Interpreter," Jan. 4, 2023, pp. 1-13.
Pypi, "Ipcquene 0.9.7," Sep. 11, 2021, pp. 1-4.
Ipcquene, "Welcome to Ipcquene's Documentation," 2017, pp. 1-5.
Boost Software, "Class Template Quene," 2008, pp. 1-6.
TU/e Eindhoven University of Technology, "Co-operating Sequential Processes," Jan. 1, 1968, pp. 1-88.
E.W. Dijkstra Archive, "Cooperating Sequential Processes," Aug. 11, 2010, pp. 1-31.
readme.md, "A Fast Multi-Producer, Multi-Consumer Lock-Free Concurrent Quene for C++11, "Jun. 10, 2023, pp. 1-13.
readme.md, "A Bounded Single-Producer Single-Consumer Wait-Free and Lock-Free Quene Written in C++11," Jun. 22, 2021, pp. 1-7.
Intel, "Intel oneAPI Threading Building Blocks Documentation.," Sep. 30, 2022, pp. 1-3.
Baeldung, "Producer-Consumer Problem with Example in Java," Aug. 29, 2023, pp. 1-19.

* cited by examiner

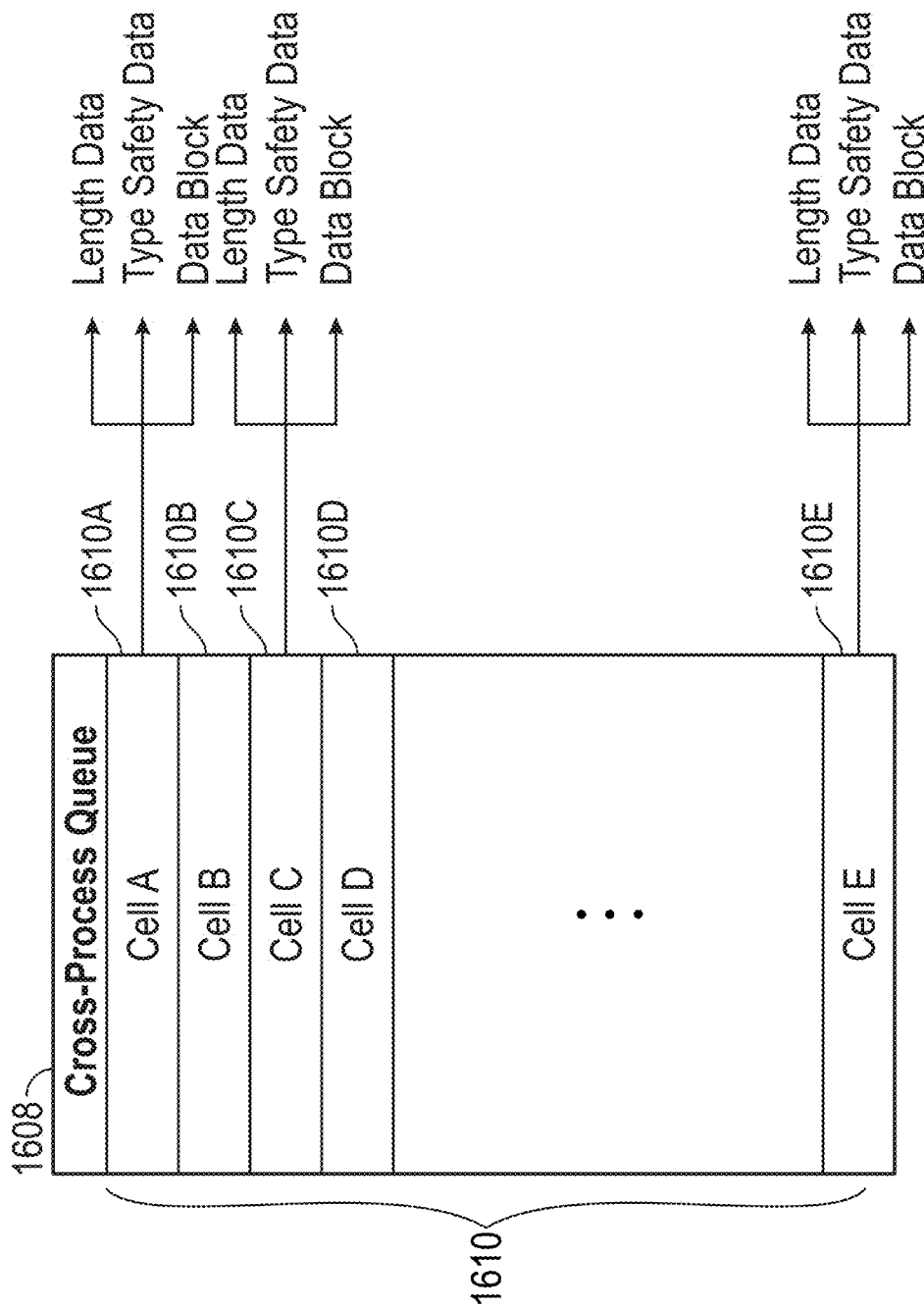

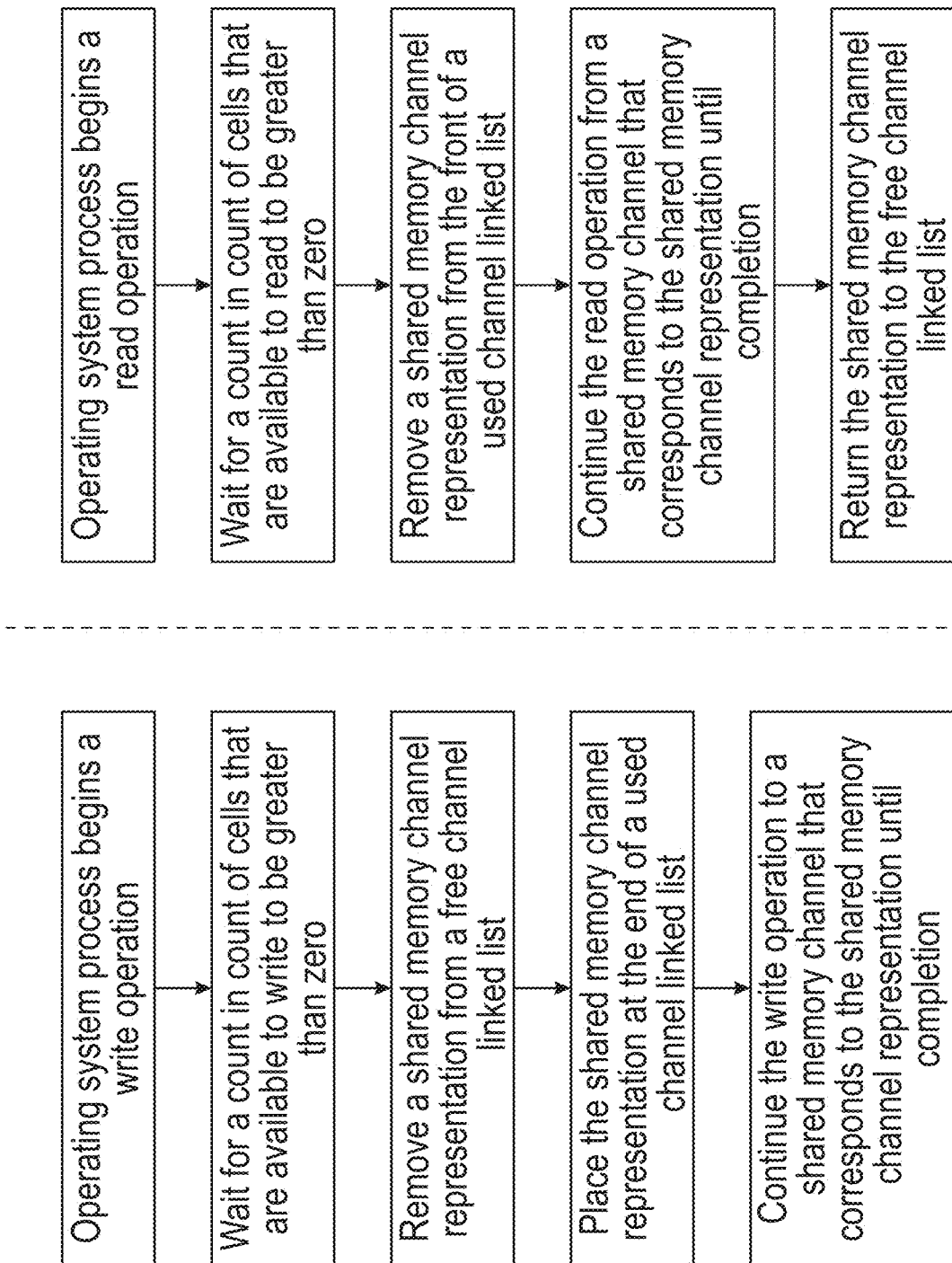

2200

2210

Identifying a request, by a write operation process of a first analytical compute process, to write a data block having a dynamically changing maximum length to a cross-process queue, the cross-process queue is in-memory of a single computer and comprises a plurality of cells, wherein each cell of the plurality of cells of the cross-process queue:

2210A

Has a fixed length

2210B

Is assigned a cell index value of a plurality of cell index values

2220

Identifying, by the cross-process queue, that the dynamically changing maximum length of the data block exceeds the fixed length of a cell of the plurality of cells

2230

Partitioning the data block associated with the write operation process into a plurality of partitions of data, wherein each respective partition of data of the plurality of partitions of data do not exceed the fixed length of each cell of the plurality of cells

2240

Assigning a distinct cell index value of the plurality of cell index values to each respective partition of data of the plurality of partitions of data

2250

Writing, by causing the write operation process to execute a plurality of write operations, each respective partition of data of the plurality of partitions of data within a distinct cell of the plurality of cells based on the distinct cell index value assigned to the respective partition of data

2610
Implementing a cross-process queue within a single computer that enables a transfer of data between a first operating system process and a second operating system process, wherein: the first operating system process is created by executing a computer program written in a first computer language, and the second operating system process is created by executing a computer program written in a second computer language 2620
Receiving, at the cross-process queue, a data block from the first operating system process based on an execution by the first operating system process of a write operation to a memory of the cross-process queue, wherein the data block is encoded in a data structure of the first computer language 2630
Converting, by an interpreting application, the data block encoded in the data structure of the first computer language to a translated data block encoded in a data structure of the second computer language 2640
Storing, within the memory of the cross-process queue, the translated data block based on the conversion of the data block 2650
Enabling a read access, by the second operating system process, to the translated data block stored within the memory of the cross-process queue

FIG. 26

SYSTEMS AND METHODS FOR IMPLEMENTING AND USING A CROSS-PROCESS QUEUE WITHIN A SINGLE COMPUTER

CROSS-REFERENCE TO RELATED APPLICATIONS

This application is a continuation of U.S. patent application Ser. No. 18/737,592, filed 7 Jun. 2024, which claims the benefit of U.S. Provisional Application No. 63/534,326, filed on 23 Aug. 2023, which are incorporated in their entireties by this reference.

TECHNICAL FIELD

This invention relates generally to the computer architecture field, and more specifically, to new and useful systems and methods for transferring data blocks between multiple operating system processes running on the same computing device.

BACKGROUND

In traditional computing environments, particularly POSIX-compliant operating systems, data transfers typically occur across threads rather than processes. This is because threads share the same memory space making data transfers across threads feasible. However, transferring data between processes presents substantial technical challenges due to each process having its own distinct memory address space.

Therefore, there is a need in the art for systems, methods, and computer program products that enable a transfer of data across multiple processes running or scheduled to run on a single computer. The embodiments of the present application provide technical solutions that address, at least, the needs described above, as well as the deficiencies of the state of the art.

BRIEF SUMMARY OF THE INVENTION(S)

In one embodiment, a computer-program product embodied in a non-transitory machine-readable storage medium storing computer instructions that, when executed by one or more processors, perform operations including: implementing a cross-process queue within a single computer that is configured to transfer a data block between an operating system process executing a write operation and an operating system process executing a read operation, wherein the cross-process queue includes an index of cells; initializing in-memory cell indices within the cross-process queue that include: (1) a write operation index tracking index values of one or more cells within the cross-process queue that are available to write, and (2) a read operation index tracking index values of one or more cells within the cross-process queue that are available to read, wherein the in-memory cell indices govern write operations to and read operations from a plurality of cells of the index of cells as directed by the operating system process executing the write operation and the operating system process executing the read operation based on the index values tracked by the write operation index and the index values tracked by the read operation index; and implementing a cell synchronization data structure tracking states of the plurality of cells of the index of cells of the cross-process queue, wherein the cell synchronization data structure tracks a count of cells of the plurality of cells of the index of cells that are available to write and tracks a count of cells of the plurality of cells of the index of cells that are available to read, wherein the cell synchronization data structure regulates a utilization of the cross-process queue for the operating system process executing the write operation and the operating system process executing the read operation based on the count of cells of the index of cells that are available to write and the count of cells of the index of cells that are available to read.

In one embodiment, when the count of cells of the index of cells that are available to write is greater than zero, the cell synchronization data structure causes a given operating system process requesting to execute a write operation to access the cross-process queue, and when the count of cells of the index of cells that are available to write is zero, the cell synchronization data structure causes the given operating system process requesting to execute the write operation to pause and not access the cross-process queue.

In one embodiment, when the count of cells of the index of cells that are available to read is greater than zero, the cell synchronization data structure causes a given operating system process requesting to execute a read operation to access the cross-process queue, and when the count of cells of the index of cells that are available to write is zero, the cell synchronization data structure causes the given operating system process requesting to execute the read operation to pause and not access the cross-process queue.

In one embodiment, the cell synchronization data structure further regulates the utilization of the cross-process queue by a plurality of operating system processes requesting to execute write operations and a plurality of operating system processes requesting to execute read operations based on the count of cells of the index of cells that are available to write and the count of cells of the index of cells that are available to read, and the in-memory cell indices govern write operations to and read operations from the plurality of cells of the index of cells as directed by the plurality of operating system processes requesting to execute write operations and the plurality of operating system processes requesting to execute read operations based on the index values tracked by the write operation index and the index values tracked by the read operation index.

In one embodiment, when the write operation index of the in-memory cell indices tracks at least one index value of a cell of the index of cells that is available to write, a given index value of a cell of the index of cells is assigned to a given operating system process of the plurality of operating system processes requesting to execute write operations.

In one embodiment, when the read operation index of the in-memory cell indices tracks at least one index value of a cell of the index of cells that is available to read, a given index value of a cell of the index of cells is assigned to a given operating system process of the plurality of operating system processes requesting to execute read operations.

In one embodiment, the computer-program product further includes executing, by the operating system process executing the read operation and the operating system process executing the write operation, atomic updates causing a change to the index values tracked by the write operation index and the index values tracked by the read operation index.

In one embodiment, the computer-program product further includes implementing a plurality of shared memory channels defining an index of shared memory channels within the single computer, the plurality of shared memory channels each having an associated cross-process queue for transferring data between a plurality of operating system processes executing write operations and a plurality of operating system processes executing read operations.

In one embodiment, the computer-program product further includes implementing in-memory channel indices of the plurality of shared memory channels that include: a first free channel index tracking an index value of a given shared memory channel at a head of a queue of shared memory channels that are available to write; a first used channel index tracking an index value of another given shared memory channel at a head of a queue of shared memory channels that are available to read; a last used channel index tracking an index value of a further given shared memory channel at a tail of the queue of shared memory channels that are available to read, wherein the in-memory channel indices regulate a utilization of the index of shared memory channels by the plurality of operating system processes executing write operations and the plurality of operating system processes executing read operations based on index values of the first free channel index and index values of the first used channel index.

In one embodiment, the computer-program product further includes implementing a channel synchronization data structure tracking states of the plurality of shared memory channels of the index of shared memory channels, wherein the channel synchronization data structure: tracks a count of channels of the index of shared memory channels not assigned to any operating system processes, and tracks a count of channels of the index of shared memory channels assigned to any given operating system process executing write operations and that are not assigned to any given operating system process executing read operations; wherein the channel synchronization data structure controls an acquisition of one or more of the plurality of shared memory channels by the plurality of operating system processes executing write operations and the plurality of operating system processes executing read operations based on the count of channels of the index of shared memory channels not assigned to any operating system processes and the count of channels of the index of shared memory channels assigned to any given operating system process executing write operations and that are not assigned to any given operating system process executing read operations.

In one embodiment, when the count of channels of the index of shared memory channels not assigned to any operating system processes is greater than zero, the channel synchronization data structure allows an acquisition of a given shared memory channel of the index of shared memory channels by a subject operating system process requesting to execute a write operation to the index of shared memory channels, and when the count of channels of the index of shared memory channels not assigned to any operating system processes is zero, the channel synchronization data structure disallows the acquisition of the given shared memory channel of the index of shared memory channels by the subject operating system process requesting to execute the write operation to the index of shared memory channels.

In one embodiment, the acquisition of the given shared memory channel by the subject operating system process requesting to execute the write operation, removes an index value of the given shared memory channel from an array of index values of shared memory channels that are available to write and inserts the index value of the given shared memory channel to an array of index values of shared memory channels that are available to read at a completion of the write operation.

In one embodiment, the acquisition of the given shared memory channel by the subject operating system process requesting to execute the read operation, removes an index value of the given shared memory channel from the array of index values of shared memory channels that are available to read and inserts the index value of the given shared memory channel to the array of index values of shared memory channels that are available to write at a completion of the read operation.

In one embodiment, a computer-implemented method includes: implementing a cross-process queue within a single computer that is configured to transfer a data block between an operating system process executing a write operation and an operating system process executing a read operation, wherein the cross-process queue includes an index of cells; initializing in-memory cell indices within the cross-process queue that include: (1) a write operation index tracking index values of one or more cells within the cross-process queue that are available to write, and (2) a read operation index tracking index values of one or more cells within the cross-process queue that are available to read, wherein the in-memory cell indices govern write operations to and read operations from a plurality of cells of the index of cells as directed by the operating system process executing the write operation and the operating system process executing the read operation based on the index values tracked by the write operation index and the index values tracked by the read operation index; and implementing a cell synchronization data structure tracking states of the plurality of cells of the index of cells of the cross-process queue, wherein the cell synchronization data structure tracks a count of cells of the plurality of cells of the index of cells that are available to write and tracks a count of cells of the plurality of cells of the index of cells that are available to read, wherein the cell synchronization data structure regulates a utilization of the cross-process queue for the operating system process executing the write operation and the operating system process executing the read operation based on the count of cells of the index of cells that are available to write and the count of cells of the index of cells that are available to read.

In one embodiment, when the count of cells of the index of cells that are available to write is greater than zero, the cell synchronization data structure causes a given operating system process requesting to execute a write operation to access the cross-process queue, and when the count of cells of the index of cells that are available to write is zero, the cell synchronization data structure causes the given operating system process requesting to execute the write operation to pause and not access the cross-process queue.

In one embodiment, when the count of cells of the index of cells that are available to read is greater than zero, the cell synchronization data structure causes a given operating system process requesting to execute a read operation to access the cross-process queue, and when the count of cells of the index of cells that are available to write is zero, the cell synchronization data structure causes the given operating system process requesting to execute the read operation to pause and not access the cross-process queue.

In one embodiment, the cell synchronization data structure further regulates the utilization of the cross-process queue by a plurality of operating system processes requesting to execute write operations and a plurality of operating system processes requesting to execute read operations based on the count of cells of the index of cells that are available to write and the count of cells of the index of cells that are available to read, and the in-memory cell indices govern write operations to and read operations from the plurality of cells of the index of cells as directed by the plurality of operating system processes requesting to execute write operations and the plurality of operating system processes requesting to execute read operations based on the index values tracked by the write operation index and the index values tracked by the read operation index.

In one embodiment, when the write operation index of the in-memory cell indices tracks at least one index value of a cell of the index of cells that is available to write, a given index value of a cell of the index of cells is assigned to a given operating system process of the plurality of operating system processes requesting to execute write operations.

In one embodiment, when the read operation index of the in-memory cell indices tracks at least one index value of a cell of the index of cells that is available to read, a given index value of a cell of the index of cells is assigned to a given operating system process of the plurality of operating system processes requesting to execute read operations.

In one embodiment, the computer-implemented further includes executing, by the operating system process executing the read operation and the operating system process executing the write operation, atomic updates causing a change to the index values tracked by the write operation index and the index values tracked by the read operation index.

In one embodiment, the computer-implemented further includes implementing a plurality of shared memory channels defining an index of shared memory channels within the single computer, the plurality of shared memory channels each having an associated cross-process queue for transferring data between a plurality of operating system processes executing write operations and a plurality of operating system processes executing read operations.

In one embodiment, the computer-implemented further includes implementing in-memory channel indices of the plurality of shared memory channels that include: a first free channel index tracking an index value of a given shared memory channel at a head of a queue of shared memory channels that are available to write; a first used channel index tracking an index value of another given shared memory channel at a head of a queue of shared memory channels that are available to read; a last used channel index tracking an index value of a further given shared memory channel at a tail of the queue of shared memory channels that are available to read, wherein the in-memory channel indices regulate a utilization of the index of shared memory channels by the plurality of operating system processes executing write operations and the plurality of operating system processes executing read operations based on index values of the first free channel index and index values of the first used channel index.

In one embodiment, the computer-implemented further includes implementing a channel synchronization data structure tracking states of the plurality of shared memory channels of the index of shared memory channels, wherein the channel synchronization data structure: tracks a count of channels of the index of shared memory channels not assigned to any operating system processes, and tracks a count of channels of the index of shared memory channels assigned to any given operating system process executing write operations and that are not assigned to any given operating system process executing read operations; wherein the channel synchronization data structure controls an acquisition of one or more of the plurality of shared memory channels by the plurality of operating system processes executing write operations and the plurality of operating system processes executing read operations based on the count of channels of the index of shared memory channels not assigned to any operating system processes and the count of channels of the index of shared memory channels assigned to any given operating system process executing write operations and that are not assigned to any given operating system process executing read operations.

In one embodiment, when the count of channels of the index of shared memory channels not assigned to any operating system processes is greater than zero, the channel synchronization data structure allows an acquisition of a given shared memory channel of the index of shared memory channels by a subject operating system process requesting to execute a write operation to the index of shared memory channels, and when the count of channels of the index of shared memory channels not assigned to any operating system processes is zero, the channel synchronization data structure disallows the acquisition of the given shared memory channel of the index of shared memory channels by the subject operating system process requesting to execute the write operation to the index of shared memory channels.

In one embodiment, the acquisition of the given shared memory channel by the subject operating system process requesting to execute the write operation, removes an index value of the given shared memory channel from an array of index values of shared memory channels that are available to write and inserts the index value of the given shared memory channel to an array of index values of shared memory channels that are available to read at a completion of the write operation.

In one embodiment, the acquisition of the given shared memory channel by the subject operating system process requesting to execute the read operation, removes an index value of the given shared memory channel from the array of index values of shared memory channels that are available to read and inserts the index value of the given shared memory channel to the array of index values of shared memory channels that are available to write at a completion of the read operation.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations including: implementing a cross-process queue within a single computer that is configured to transfer a data block between an operating system process executing a write operation and an operating system process executing a read operation, wherein the cross-process queue includes an index of cells; initializing in-memory cell indices within the cross-process queue that include: (1) a write operation index tracking index values of one or more cells within the cross-process queue that are available to write, and (2) a read operation index tracking index values of one or more cells within the cross-process queue that are available to read, wherein the in-memory cell indices govern write operations to and read operations from a plurality of cells of the index of cells as directed by the operating system process executing the write operation and the operating system process executing the read operation based on the index values tracked by the write operation index and the index values tracked by the read operation index; and implementing a cell synchronization data structure tracking states of the plurality of cells of the index of cells of the cross-process queue, wherein the cell synchronization data structure tracks a count of cells of the plurality of cells of the index of cells that are available to write and tracks a count of cells of the plurality of cells of the index of cells that are available to read, wherein the cell synchronization data structure regulates a utilization of the cross-process queue for the operating system process executing the write operation and the operating system process executing the read operation based on the count of cells of the index of cells that are available to write and the count of cells of the index of cells that are available to read.

In one embodiment, when the count of cells of the index of cells that are available to write is greater than zero, the cell synchronization data structure causes a given operating system process requesting to execute a write operation to access the cross-process queue, and when the count of cells of the index of cells that are available to write is zero, the cell synchronization data structure causes the given operating system process requesting to execute the write operation to pause and not access the cross-process queue.

In one embodiment, when the count of cells of the index of cells that are available to read is greater than zero, the cell synchronization data structure causes a given operating system process requesting to execute a read operation to access the cross-process queue, and when the count of cells of the index of cells that are available to write is zero, the cell synchronization data structure causes the given operating system process requesting to execute the read operation to pause and not access the cross-process queue.

In one embodiment, the cell synchronization data structure further regulates the utilization of the cross-process queue by a plurality of operating system processes requesting to execute write operations and a plurality of operating system processes requesting to execute read operations based on the count of cells of the index of cells that are available to write and the count of cells of the index of cells that are available to read, and the in-memory cell indices govern write operations to and read operations from the plurality of cells of the index of cells as directed by the plurality of operating system processes requesting to execute write operations and the plurality of operating system processes requesting to execute read operations based on the index values tracked by the write operation index and the index values tracked by the read operation index.

In one embodiment, a computer-program product embodied in a non-transitory machine-readable storage medium storing computer instructions that, when executed by one or more processors, perform operations including: identifying a request, by a write operation process of a first analytical compute process, to write a data block having a dynamically changing maximum length to a cross-process queue, the cross-process queue is in-memory of a single computer and comprises a plurality of cells, wherein each cell of the plurality of cells of the cross-process queue: has a fixed length, and is assigned a cell index value of a plurality of cell index values; identifying, by the cross-process queue, that the dynamically changing maximum length of the data block exceeds the fixed length of a cell of the plurality of cells; partitioning the data block associated with the write operation process into a plurality of partitions of data, wherein each respective partition of data of the plurality of partitions of data do not exceed the fixed length of each cell of the plurality of cells; assigning a distinct cell index value of the plurality of cell index values to each respective partition of data of the plurality of partitions of data; and writing, by causing the write operation process to execute a plurality of write operations, each respective partition of data of the plurality of partitions of data within a distinct cell of the plurality of cells based on the distinct cell index value assigned to the respective partition of data.

In one embodiment, the computer-program product further includes identifying a request to read the data block, by a read operation process of a second analytical compute process, from the cross-process queue; and in response to identifying the request to read the data block, causing the read operation process to execute a plurality of read operations for reading the data block from the plurality of cells of the cross-process queue, wherein executing the plurality of read operations includes executing a single read operation for each respective cell of the plurality of cells storing the plurality of partitions of data.

In one embodiment, the computer-program product further includes identifying a sequence of distinct cell index values for the plurality of partitions of data of the data block based on the distinct cell index value assigned to each respective partition of data of the plurality of partitions of data, wherein the sequence of distinct cell index values defines a sequential ordering of the plurality of partitions of data that corresponds to a data structure of the data block.

In one embodiment, the computer-program product further includes identifying a request to read the data block, by a read operation process of a second analytical compute process, from the cross-process queue; and in response to identifying the request to read the data block, causing the read operation process to execute a plurality of read operations of the plurality of cells of the cross-process queue in a predetermined order based on the sequence of distinct cell index values.

In one embodiment, the computer-program product further includes identifying a request to read the data block, by a read operation process of a second analytical compute process, from the cross-process queue; and in response to identifying the request to read the data block, reassembling the plurality of partitions of data into the data block based on the sequence of distinct cell index values.

In one embodiment, reassembling the plurality of partitions of data into the data block includes merging the plurality of partitions of data of the data block to a merged data block matching the data structure of the data block.

In one embodiment, reassembling the plurality of partitions of data into the data block includes: at a time of executing the read operation process, setting the plurality of cells storing the plurality of partitions of data in a predetermined order based on the sequence of distinct cell index values; and merging the plurality of partitions of data by executing a plurality of read operations of the plurality of cells based on reading the plurality of cells in the predetermined order.

In one embodiment, the computer-program product further includes generating a command signal to the cross-process queue identifying a start of the data block when starting the write operation process to the cross-process queue and a maximum length of the data block is unknown at a time that the write operation process started to write the data block.

In one embodiment, the computer-program product further includes generating a command signal to the cross-process queue identifying an end of the data block when completing the write operation process to the cross-process queue and a maximum length of the data block is unknown at a time that the write operation process started the write operation.

In one embodiment, a length of the data block exceeds a memory available in the cross-process queue: assigning auxiliary cross-process queue to the write operation process, and writing into the auxiliary cross-process queue a remainder of the length of the data block that exceeds the memory available in the cross-process queue.

In one embodiment, if the data block being written by the write operation process to the cross-process queue exceeds an available memory of the cross-process queue, the write operation process is returned to a wait queue of an operating system until a wait condition is satisfied.

In one embodiment, the single computer includes random access memory, the cross-process queue is located within the random-access memory of the single computer, and the cross-process queue enables a transfer of a given data block between a plurality of analytical compute processes executed in different computer languages, wherein: each analytical compute process of the plurality of analytical compute processes are executed on the single computer, and each analytical compute process of the plurality of analytical compute processes has access to the random-access memory of the single computer.

In one embodiment, all cells within the cross-process queue have a same fixed length.

In one embodiment, a computer-implemented method includes: identifying a request, by a write operation process of a first analytical compute process, to write a data block having a dynamically changing maximum length to a cross-process queue, the cross-process queue is in-memory of a single computer and comprises a plurality of cells, wherein each cell of the plurality of cells of the cross-process queue: has a fixed length, and is assigned a cell index value of a plurality of cell index values; identifying, by the cross-process queue, that the dynamically changing maximum length of the data block exceeds the fixed length of a cell of the plurality of cells; partitioning the data block associated with the write operation process into a plurality of partitions of data, wherein each respective partition of data of the plurality of partitions of data do not exceed the fixed length of each cell of the plurality of cells; assigning a distinct cell index value of the plurality of cell index values to each respective partition of data of the plurality of partitions of data; and writing, by causing the write operation process to execute a plurality of write operations, each respective partition of data of the plurality of partitions of data within a distinct cell of the plurality of cells based on the distinct cell index value assigned to the respective partition of data.

In one embodiment, the computer-implemented method further includes identifying a request to read the data block, by a read operation process of a second analytical compute process, from the cross-process queue; and in response to identifying the request to read the data block, causing the read operation process to execute a plurality of read operations for reading the data block from the plurality of cells of the cross-process queue, wherein executing the plurality of read operations includes executing a single read operation for each respective cell of the plurality of cells storing the plurality of partitions of data.

In one embodiment, the computer-implemented further includes identifying a sequence of distinct cell index values for the plurality of partitions of data of the data block based on the distinct cell index value assigned to each respective partition of data of the plurality of partitions of data, wherein the sequence of distinct cell index values defines a sequential ordering of the plurality of partitions of data that corresponds to a data structure of the data block.

In one embodiment, the computer-implemented method further includes identifying a request to read the data block, by a read operation process of a second analytical compute process, from the cross-process queue; and in response to identifying the request to read the data block, causing the read operation process to execute a plurality of read operations of the plurality of cells of the cross-process queue in a predetermined order based on the sequence of distinct cell index values.

In one embodiment, the computer-implemented method further includes identifying a request to read the data block, by a read operation process of a second analytical compute process, from the cross-process queue; and in response to identifying the request to read the data block, reassembling the plurality of partitions of data into the data block based on the sequence of distinct cell index values.

In one embodiment, reassembling the plurality of partitions of data into the data block includes merging the plurality of partitions of data of the data block to a merged data block matching the data structure of the data block.

In one embodiment, reassembling the plurality of partitions of data into the data block includes: at a time of executing the read operation process, setting the plurality of cells storing the plurality of partitions of data in a predetermined order based on the sequence of distinct cell index values; and merging the plurality of partitions of data by executing a plurality of read operations of the plurality of cells based on reading the plurality of cells in the predetermined order.

In one embodiment, the computer-implemented method further includes generating a command signal to the cross-process queue identifying a start of the data block when starting the write operation process to the cross-process queue and a maximum length of the data block is unknown at a time that the write operation process started to write the data block.

In one embodiment, the computer-implemented method further includes generating a command signal to the cross-process queue identifying an end of the data block when completing the write operation process to the cross-process queue and a maximum length of the data block is unknown at a time that the write operation process started the write operation.

In one embodiment, a length of the data block exceeds a memory available in the cross-process queue: assigning auxiliary cross-process queue to the write operation process, and writing into the auxiliary cross-process queue a remainder of the length of the data block that exceeds the memory available in the cross-process queue.

In one embodiment, if the data block being written by the write operation process to the cross-process queue exceeds an available memory of the cross-process queue, the write operation process is returned to a wait queue of an operating system until a wait condition is satisfied.

In one embodiment, the single computer includes random access memory, the cross-process queue is located within the random-access memory of the single computer, and the cross-process queue enables a transfer of a given data block between a plurality of analytical compute processes executed in different computer languages, wherein: each analytical compute process of the plurality of analytical compute processes are executed on the single computer, and each analytical compute process of the plurality of analytical compute processes has access to the random-access memory of the single computer.

In one embodiment, all cells within the cross-process queue have a same fixed length.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: identifying a request, by a write operation process of a first analytical compute process, to write a data block having a dynamically changing maximum length to a cross-process queue, the cross-process queue is in-memory of a single computer and comprises a plurality of cells, wherein each cell of the plurality of cells of the cross-process queue: has a fixed length, and is assigned a cell index value of a plurality of cell index values; identifying, by the cross-process queue, that the dynamically changing maximum length of the data block exceeds the fixed length of a cell of the plurality of cells; partitioning the data block associated with the write operation process into a plurality of partitions of data, wherein each respective partition of data of the plurality of partitions of data do not exceed the fixed length of each cell of the plurality of cells; assigning a distinct cell index value of the plurality of cell index values to each respective partition of data of the plurality of partitions of data; and writing, by causing the write operation process to execute a plurality of write operations, each respective partition of data of the plurality of partitions of data within a distinct cell of the plurality of cells based on the distinct cell index value assigned to the respective partition of data.

In one embodiment, the computer-implemented system further includes identifying a request to read the data block, by a read operation process of a second analytical compute process, from the cross-process queue; and in response to identifying the request to read the data block, causing the read operation process to execute a plurality of read operations for reading the data block from the plurality of cells of the cross-process queue, wherein executing the plurality of read operations includes executing a single read operation for each respective cell of the plurality of cells storing the plurality of partitions of data.

In one embodiment, the computer-implemented system further includes identifying a sequence of distinct cell index values for the plurality of partitions of data of the data block based on the distinct cell index value assigned to each respective partition of data of the plurality of partitions of data, wherein the sequence of distinct cell index values defines a sequential ordering of the plurality of partitions of data that corresponds to a data structure of the data block.

In one embodiment, the computer-implemented system further includes identifying a request to read the data block, by a read operation process of a second analytical compute process, from the cross-process queue; and in response to identifying the request to read the data block, causing the read operation process to execute a plurality of read operations of the plurality of cells of the cross-process queue in a predetermined order based on the sequence of distinct cell index values.

In one embodiment, a computer-program product embodied in a non-transitory machine-readable storage medium storing computer instructions that, when executed by one or more processors, perform operations including: implementing a cross-process queue within a single computer that enables a transfer of data between a first operating system process and a second operating system process, wherein: the first operating system process is created by executing a computer program written in a first computer language, and the second operating system process is created by executing a computer program written in a second computer language; receiving, at the cross-process queue, a data block from the first operating system process based on an execution by the first operating system process of a write operation to a memory of the cross-process queue, wherein the data block is encoded in a data structure of the first computer language; converting, by an interpreting application, the data block encoded in the data structure of the first computer language to a translated data block encoded in a data structure of the second computer language; storing, within the memory of the cross-process queue, the translated data block based on the conversion of the data block; and enabling a read access, by the second operating system process, to the translated data block stored within the memory of the cross-process queue.

In one embodiment, converting, by the interpreting application, the data block encoded in the data structure of the first computer language includes: automatically converting one or more data types of the first computer language to one or more data types of the second computer language based on the receiving, at the cross-process queue, the data block from the first operating system process.

In one embodiment, converting, by the interpreting application, the data block encoded in the data structure of the first computer language includes automatically converting one or more objects of the first computer language to one or more objects of the second computer language based on the receiving, at the cross-process queue, the data block from the first operating system process.

In one embodiment, the first operating system process based on identifying the second computer language of the second operating system process, automatically connects to the interpreting application enabling the conversion of the data block during the write operation by the first operating system process to the memory of the cross-process queue.

In one embodiment, the interpreting application is implemented as a child process of the first operating system process.

In one embodiment, the interpreting application is extensible to interpreting a given data block encoded in the data structure of the first computer language to a target computer language of a plurality of computer languages based on identifying a computer language of a given operating system process that executes read operations in the target computer language.

In one embodiment, the memory of the cross-process queue includes a plurality of cells of fixed length that are available for writing data to and available for reading from by each of the first operating system process and the second operating system process.

In one embodiment, data stored within each of the plurality of cells of the memory channel is encoded with a respective type safety header identifying a respective data type of a plurality of data types of an item of data stored within a respective cell of the plurality of cells.

In one embodiment, a given type safety header a given cell of the plurality of cells prohibits an attempted read operation of a given item of data stored within the given cell when the attempted read operation executes a read operation in a different data type than a data type identified by the given type safety header.

In one embodiment, the computer-program product further includes detecting an attempted read operation of a given data stored within a given cell of the plurality of cells when the attempted read operation executes a read operation in a different data type than a given data type identified by the type safety header; generating a read exception based on the detection of the attempted read operation; and automatically transforming the given data type of the type safety header of the given data to the different data type based on the read exception.

In one embodiment, a computer-implemented method includes: implementing a cross-process queue within a single computer that enables a transfer of data between a first operating system process and a second operating system process, wherein: the first operating system process is created by executing a computer program written in a first computer language, and the second operating system process is created by executing a computer program written in a second computer language; receiving, at the cross-process queue, a data block from the first operating system process based on an execution by the first operating system process of a write operation to a memory of the cross-process queue, wherein the data block is encoded in a data structure of the first computer language; converting, by an interpreting application, the data block encoded in the data structure of the first computer language to a translated data block encoded in a data structure of the second computer language; storing, within the memory of the cross-process queue, the translated data block based on the conversion of the data block; and enabling a read access, by the second operating system process, to the translated data block stored within the memory of the cross-process queue.

In one embodiment, converting, by the interpreting application, the data block encoded in the data structure of the first computer language includes automatically converting one or more data types of the first computer language to one or more data types of the second computer language based on the receiving, at the cross-process queue, the data block from the first operating system process.

In one embodiment, converting, by the interpreting application, the data block encoded in the data structure of the first computer language includes: automatically converting one or more objects of the first computer language to one or more objects of the second computer language based on the receiving, at the cross-process queue, the data block from the first operating system process.

In one embodiment, the first operating system process based on identifying the second computer language of the second operating system process, automatically connects to the interpreting application enabling the conversion of the data block during the write operation by the first operating system process to the memory of the cross-process queue.

In one embodiment, the interpreting application is implemented as a child process of the first operating system process.

In one embodiment, the interpreting application is extensible to interpreting a given data block encoded in the data structure of the first computer language to a target computer language of a plurality of computer languages based on identifying a computer language of a given operating system process that executes read operations in the target computer language.

In one embodiment, the memory of the cross-process queue includes a plurality of cells of fixed length that are available for writing data to and available for reading from by each of the first operating system process and the second operating system process.

In one embodiment, data stored within each of the plurality of cells of the memory channel is encoded with a respective type safety header identifying a respective data type of a plurality of data types of an item of data stored within a respective cell of the plurality of cells.

In one embodiment, a given type safety header a given cell of the plurality of cells prohibits an attempted read operation of a given item of data stored within the given cell when the attempted read operation executes a read operation in a different data type than a data type identified by the given type safety header.

In one embodiment, the computer-implemented method further includes detecting an attempted read operation of a given data stored within a given cell of the plurality of cells when the attempted read operation executes a read operation in a different data type than a given data type identified by the type safety header; generating a read exception based on the detection of the attempted read operation; and automatically transforming the given data type of the type safety header of the given data to the different data type based on the read exception.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: implementing a cross-process queue within a single computer that enables a transfer of data between a first operating system process and a second operating system process, wherein: the first operating system process is created by executing a computer program written in a first computer language, and the second operating system process is created by executing a computer program written in a second computer language; receiving, at the cross-process queue, a data block from the first operating system process based on an execution by the first operating system process of a write operation to a memory of the cross-process queue, wherein the data block is encoded in a data structure of the first computer language; converting, by an interpreting application, the data block encoded in the data structure of the first computer language to a translated data block encoded in a data structure of the second computer language; storing, within the memory of the cross-process queue, the translated data block based on the conversion of the data block; and enabling a read access, by the second operating system process, to the translated data block stored within the memory of the cross-process queue.

In one embodiment, converting, by the interpreting application, the data block encoded in the data structure of the first computer language includes automatically converting one or more data types of the first computer language to one or more data types of the second computer language based on the receiving, at the cross-process queue, the data block from the first operating system process.

In one embodiment, converting, by the interpreting application, the data block encoded in the data structure of the first computer language includes: automatically converting one or more objects of the first computer language to one or more objects of the second computer language based on the receiving, at the cross-process queue, the data block from the first operating system process.

In one embodiment, the first operating system process based on identifying the second computer language of the second operating system process, automatically connects to the interpreting application enabling the conversion of the data block during the write operation by the first operating system process to the memory of the cross-process queue.

In one embodiment, the interpreting application is implemented as a child process of the first operating system process.

In one embodiment, the interpreting application is extensible to interpreting a given data block encoded in the data structure of the first computer language to a target computer language of a plurality of computer languages based on identifying a computer language of a given operating system process that executes read operations in the target computer language.

In one embodiment, the memory of the cross-process queue includes a plurality of cells of fixed length that are available for writing data to and available for reading from by each of the first operating system process and the second operating system process.

In one embodiment, data stored within each of the plurality of cells of the memory channel is encoded with a respective type safety header identifying a respective data type of a plurality of data types of an item of data stored within a respective cell of the plurality of cells.

In one embodiment, a given type safety header a given cell of the plurality of cells prohibits an attempted read operation of a given item of data stored within the given cell when the attempted read operation executes a read operation in a different data type than a data type identified by the given type safety header.

In one embodiment, the computer-implemented system further includes detecting an attempted read operation of a given data stored within a given cell of the plurality of cells when the attempted read operation executes a read operation in a different data type than a given data type identified by the type safety header; generating a read exception based on the detection of the attempted read operation; and automatically transforming the given data type of the type safety header of the given data to the different data type based on the read exception.

BRIEF DESCRIPTION OF THE FIGURES

FIG. 20 illustrates an example schematic of the various data that may be stored in any given cell of a cross-process queue, according to some embodiments of the present technology;

FIG. 21A illustrates an example process of using a free channel linked list, according to some embodiments of the present technology;

FIG. 21B illustrates an example process of using a used channel linked list, according to some embodiments of the present technology;

FIG. 22 illustrates a flow chart showing an example process of writing a data block having variable length to a cross-process queue, according to some embodiments of the present technology;

FIG. 26 illustrates an example process of translating a data block encoded in a data structure of a first computer language to a data structure encoded in a second computer language, according to some embodiments of the present technology;

DESCRIPTION OF THE PREFERRED EMBODIMENTS

Figure 1:
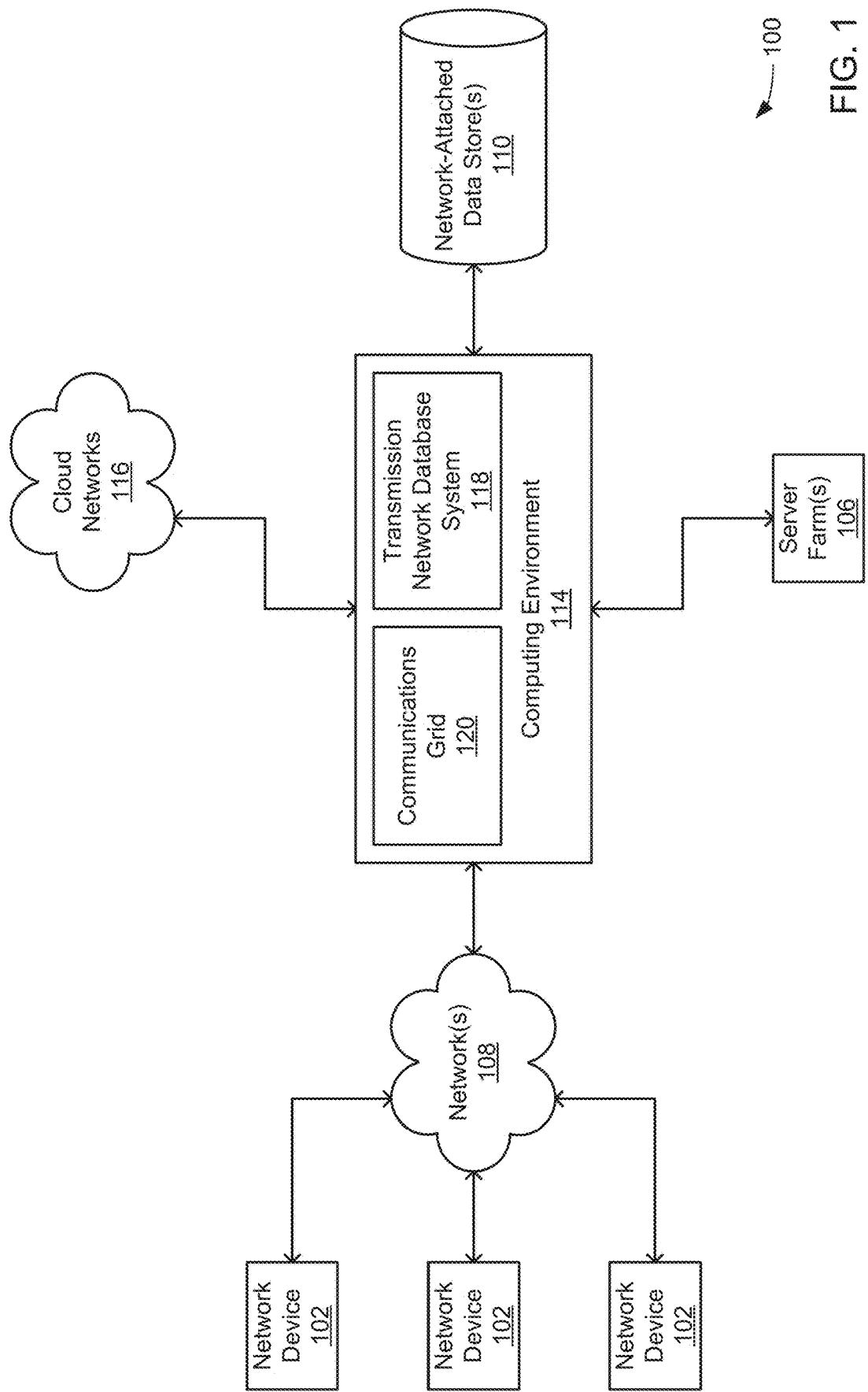
FIG. 1 illustrates a block diagram that provides an illustration of the hardware components of a computing system, according to some embodiments of the present technology.

The following description of the preferred embodiments of the inventions are not intended to limit the inventions to these preferred embodiments, but rather to enable any person skilled in the art to make and use these inventions.

Detailed Description

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

The systems, methods, computer program products, and embodiments described herein may be implemented in a variety of technology areas where data needs to be transferred between multiple computer processes (e.g., operating system processes) running on a single computer. This includes, but is not limited to, cloud applications, data exchange systems, analytics platforms, streaming services, and any other type of system service, or application that requires inter-process communication on a single computing device.

As described in more detail herein, the systems, methods, computer program products, and embodiments may be configured to support a variety of operational configurations, including single-producer/single-consumer and multiple-producer/multiple-consumer use cases.

For instance, in various single-producer/single-consumer embodiments of the present application, the methods, systems, and computer program products may function to implement a cross-process queue and one or more in-memory cell indices within shared memory of a single computing device (e.g., single computer or the like). Moreover, in such single-producer/single-consumer embodiments, the methods, systems, and computer program products may function to implement, within the single computing device, a synchronization mechanism (e.g., cell synchronization data structure) that regulates a utilization of the cross-process queue using one or more semaphores (e.g., POSIX semaphores). Accordingly, implementing the cross-process queue, the one or more in-memory cell indices, and the synchronization mechanism within the same computing device provides many technical benefits and advantages.

For example, in traditional POSIX-compliant operating systems, transferring data between processes (e.g., computer processes, operating system processes, etc.), rather than threads, presents significant technical challenges as each process operates within its own distinct memory address space. In other words, memory addresses in a first operating system process do not correspond to the same physical memory locations as memory addresses in a second operating system process. Thus, transferring data across operating system processes within a single computer in traditional POSIX-compliant operating systems is not typically feasible because operating system processes do not share the same memory address space. However, by implementing and using the cross-process queue, the one or more in-memory cell indices, and the synchronization mechanism, the traditional barriers hindering data transfer between operating system processes in POSIX-compliant operating systems are overcome.

Furthermore, in various single-producer/single-consumer embodiments of the present application, the methods, systems, and computer program products may ensure that data integrity is maintained through type safety. For example, if a producer process is writing a data block to a cross-process queue as integers, the methods, systems, and computer program products may be designed to prevent a consumer process from reading the data block from the cross-process queue as strings. Accordingly, at least one technical advantage of maintaining type safety prevents the potential for data inconsistencies or errors that could occur if a consumer process were allowed to read a data block from a cross-process queue in a data type different than the one intended by the producer process.

Furthermore, in various single-producer/single-consumer embodiments of the present application, the methods, systems, and computer program products may function to automatically convert or translate a data block encoded in a data structure of a first computer language to an equivalent data block encoded in a data structure of a second computer language different from the first computer language. In other words, the methods, systems, and computer program products may be designed to translate a data block encoded in a native format of one operating system process to a compatible format understood by another operating system process when cross-process communication is required between operating system processes associated with different computer languages. Accordingly, at least one technical advantage of automatically converting or translating a subject data block may enable a downstream or child operating system process to use the converted or translated data block without any risk of data errors, exceptions, or compatibility issues.

Moreover, in various multiple-producer/multiple-consumer embodiments of the present application, the methods, systems, and computer program products may function to implement a plurality of shared memory channels and one or more in-memory channel indices within shared memory of a single computing device (e.g., single computer or the like). Furthermore, in such multiple-producer/multiple-consumer embodiments, the methods, systems, and computer program products may function to implement, within the single computing device, a channel synchronization mechanism (e.g., channel synchronization data structure) using one or more semaphores (e.g., POSIX semaphores). Accordingly, in such multiple-producer/multiple-consumer embodiments, implementing the plurality of shared memory channels, the one or more in-memory channel indices, and the channel synchronization mechanism on the same computing device provides many technical benefits and advantages.

For example, in traditional POSIX-compliant operating systems, transferring data between processes (e.g., computer processes, operating system processes, etc.), rather than threads, presents significant technical challenges as each process operates within its own distinct memory address space. In other words, memory addresses in one operating system process do not correspond to the same physical memory locations as memory addresses in another operating system process. Thus, transferring data across operating system processes within a single computer in traditional POSIX-compliant operating systems is not typically feasible because operating system processes do not share the same memory address space. However, by implementing and using the plurality of shared memory channels, the one or more in-memory channel indices, and the channel synchronization mechanism, the traditional barriers hindering data transfer between operating system processes on POSIX-compliant operating systems are overcome.

At least one technical advantage of some of the multiple-producer/multiple-consumer embodiments of the present application include eliminating the need for a size or length of a data block to be less than or equal to the predetermined maximum cell size of a cross-process queue of a respective shared memory channel before the data block is written to the cross-process queue. In this way, the data block may be written to multiple cells of the cross-process queue of the respective shared memory channel when the size or length of the data block is greater than the predetermined maximum cell size of the cross-process queue of the respective shared memory channel. Accordingly, because a data block may be written to multiple cells, the predetermined maximum cell size for a cross-process queue of a corresponding shared memory channel does not have to be set based on the length or size of the longest or largest data block. Instead, the predetermined maximum cell size may be set based on the length or size of the majority (e.g., 60%-90%) of the expected data blocks to be transferred.

Another technical advantage of some of the multiple-producer/multiple-consumer embodiments of the present application includes multiple operating system processes writing data to a first set of shared memory channels (e.g., one or more shared memory channels, two or more shared memory channels, three or more shared memory channels, four or more shared memory channels, etc.) of a multiple-producer/multiple-consumer cross-process queue, while multiple operating system processes are reading data from a second set of shared memory channels (e.g., one or more shared memory channels, two or more shared memory channels, three or more shared memory channels, four or more shared memory channels, etc.) of the multiple-producer/multiple-consumer cross-process queue at the same time.

Another technical advantage of some of the multiple-producer/multiple-consumer embodiments of the present application include ensuring that data integrity is maintained through type safety. For example, if a producer process is writing a data block to a cross-process queue of a respective shared memory channel as integers, the methods, systems, and computer program products may be designed to prevent a consumer process from reading the data block from the cross-process queue of the respective shared memory channel as strings. Accordingly, at least one technical advantage of maintaining type safety prevents the potential for data inconsistencies or errors that could occur if a consumer process were allowed to read a data block from a cross-process queue of a target shared memory channel in a data type different than the one intended by the producer process.

Another technical advantage of some of the multiple-producer/multiple-consumer embodiments of the present application include automatically converting or translating a data block encoded in a data structure of one computer language to an equivalent data block encoded in a data structure of another computer language. In other words, the methods, systems, and computer program products may be designed to translate a data block encoded in a native format of one operating system process to a compatible format understood by another operating system process when cross-process communication is required between operating system processes associated with different computer languages. Accordingly, at least one technical advantage of automatically converting or translating a subject data block may enable a downstream or child operating system process to use the converted or translated data block without any risk of data errors, exceptions, or compatibility issues.

Example Systems

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
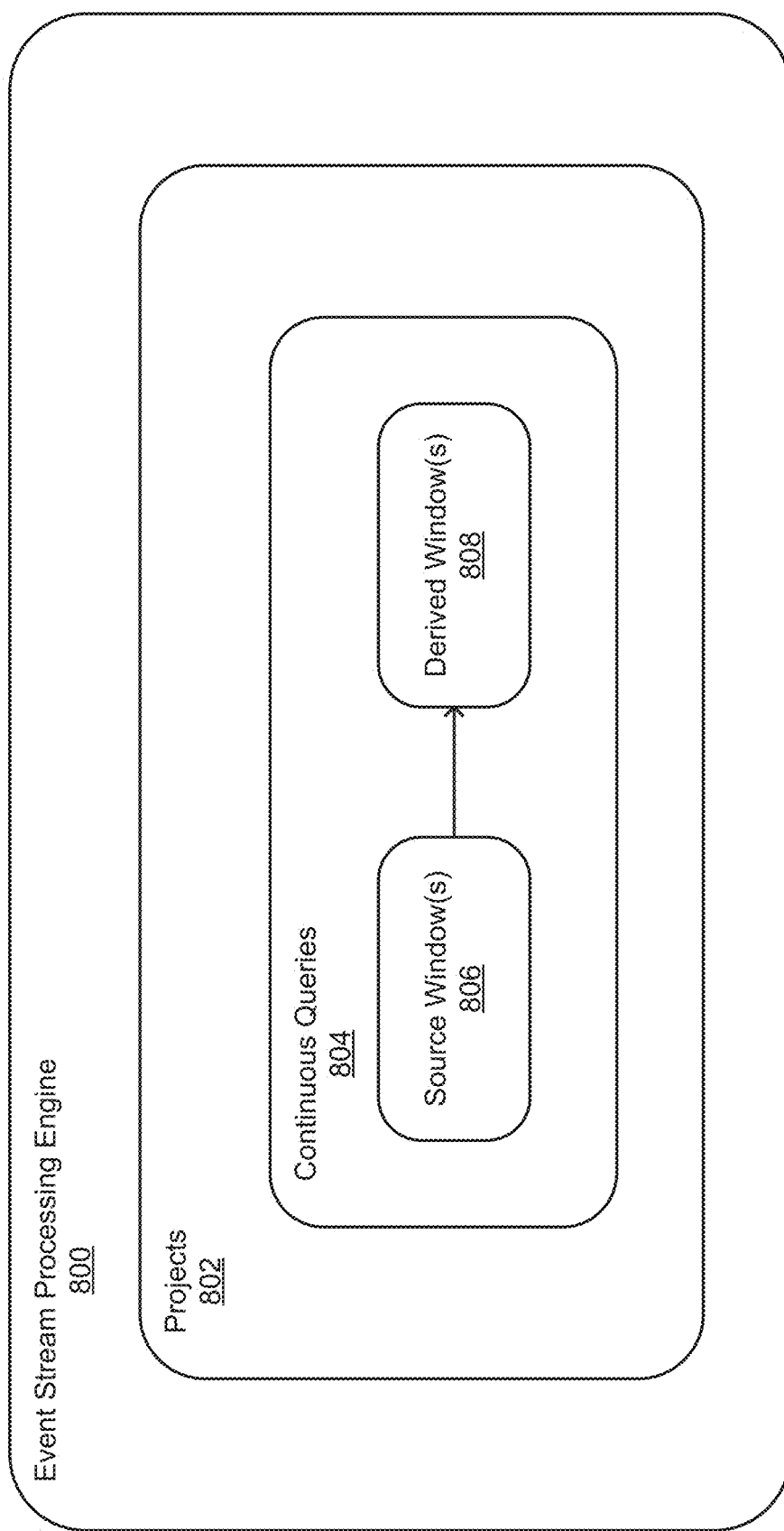
FIG. 8 illustrates a block diagram including components of an Event Stream Processing Engine (ESPE), according to embodiments of the present technology.
Figure 9:
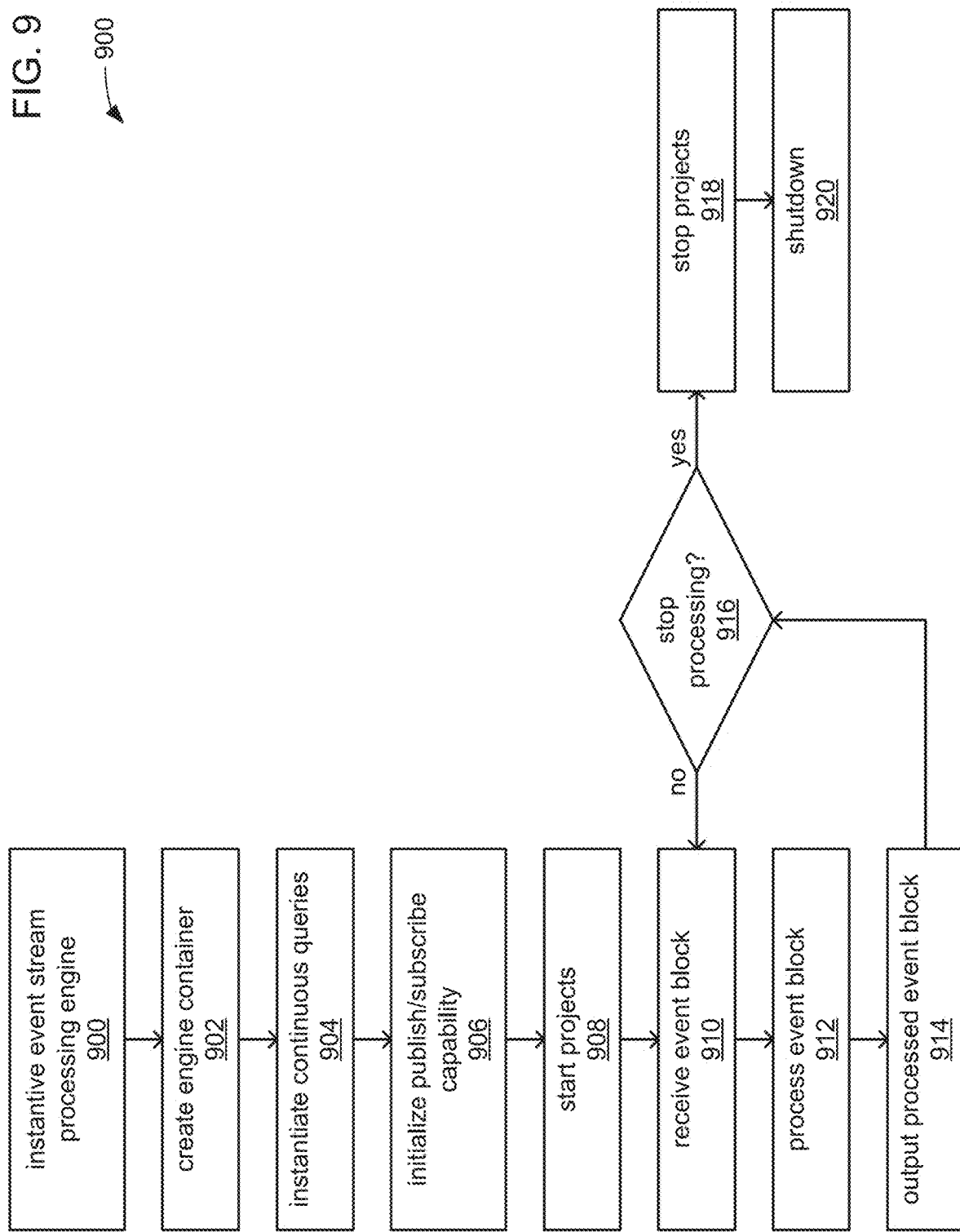
FIG. 9 illustrates a flow chart showing an example process including operations performed by an event stream processing engine, according to some embodiments of the present technology.
Figure 10:
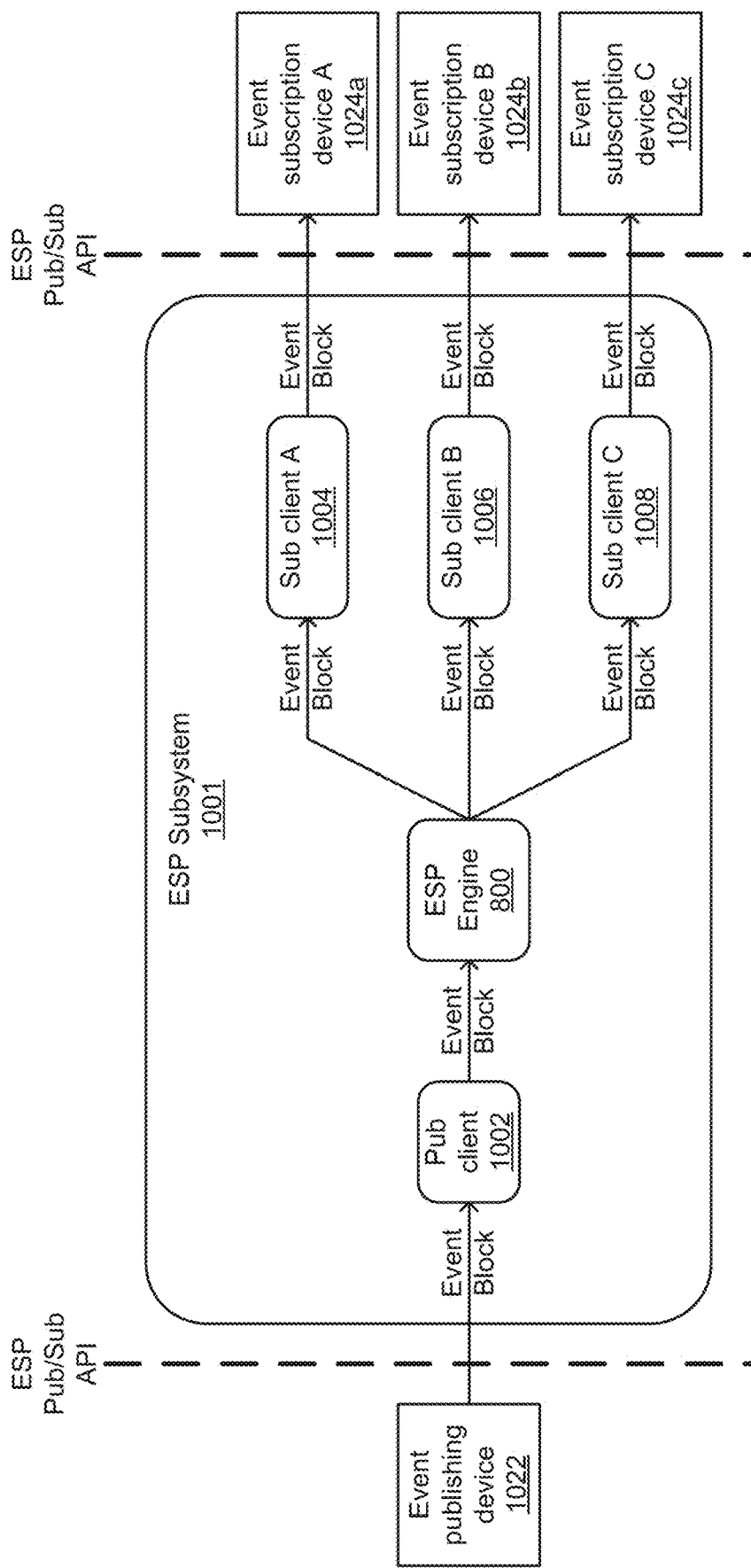
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® LOW Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
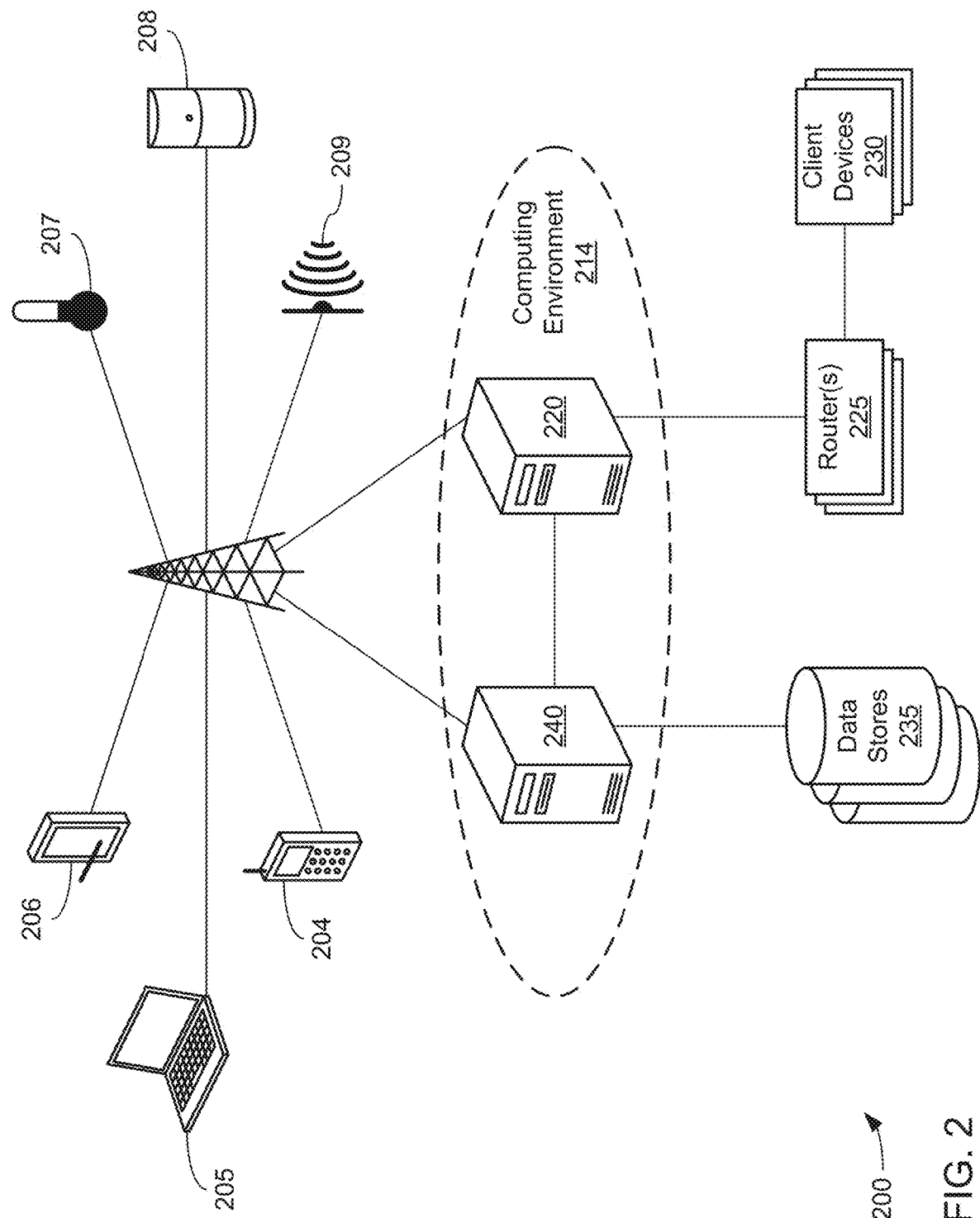
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
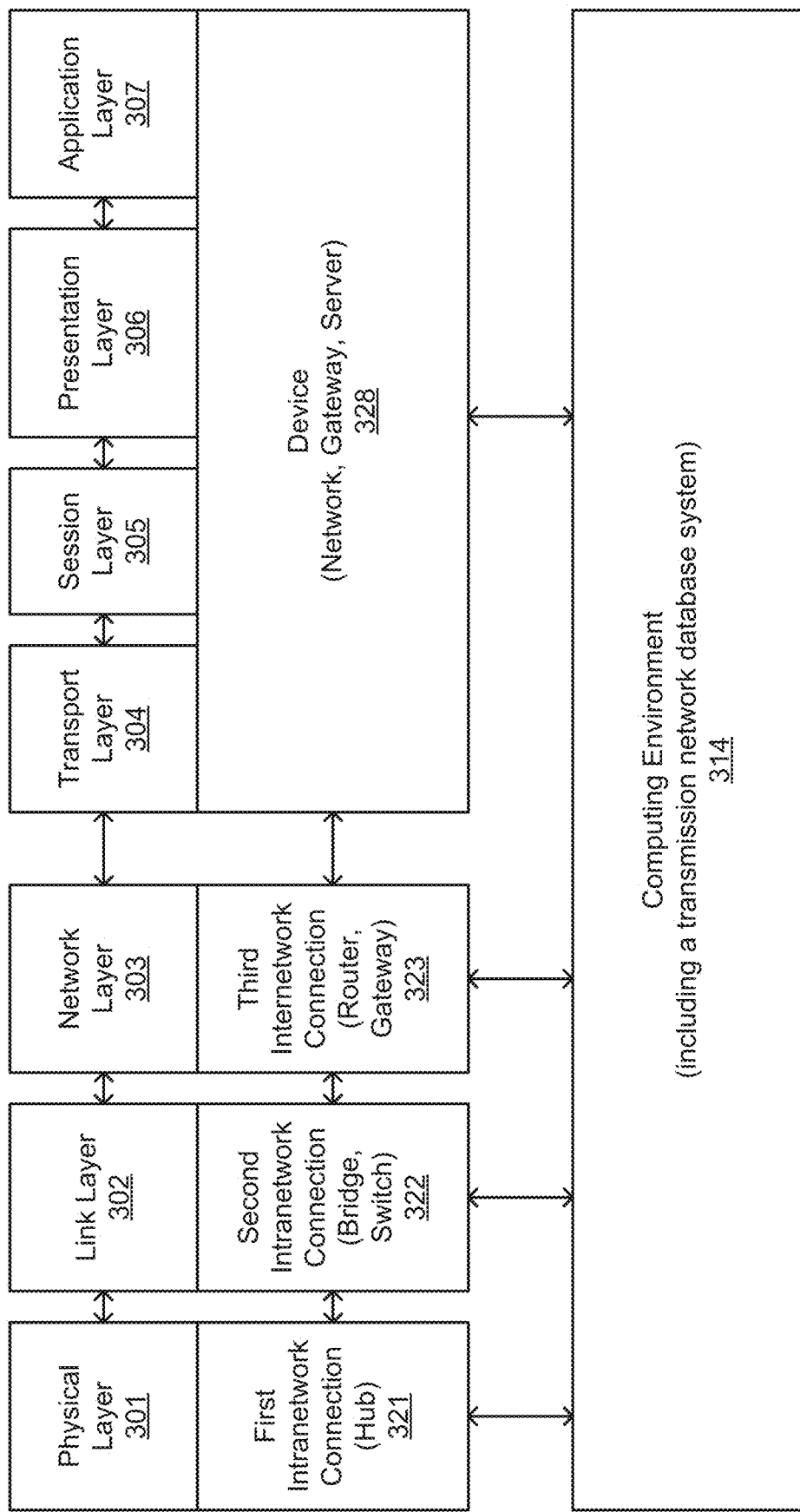
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
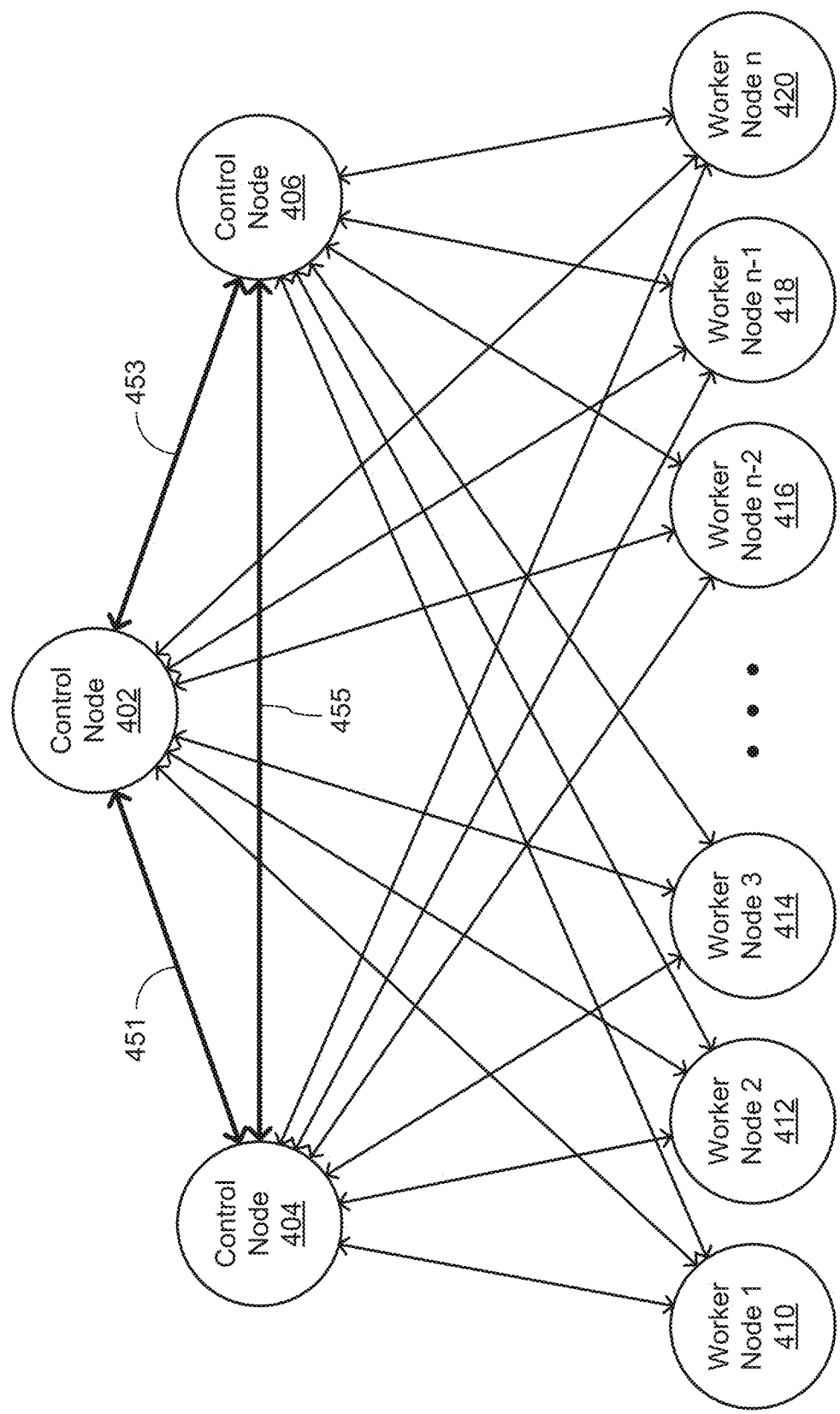
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420.

Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
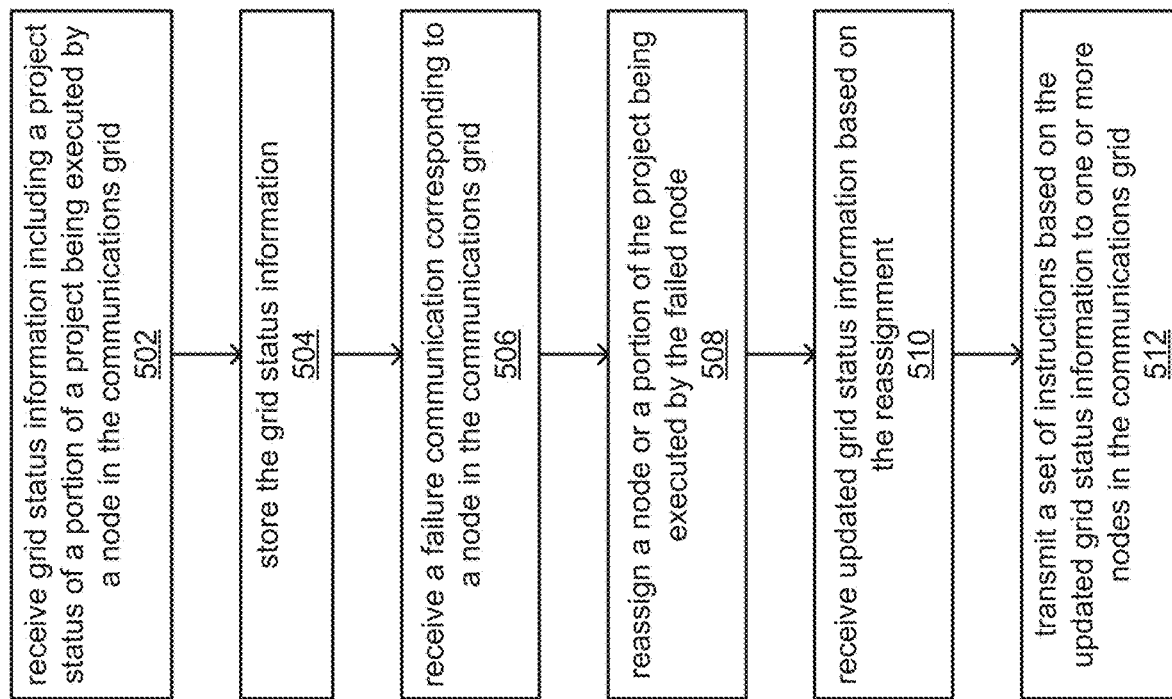
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
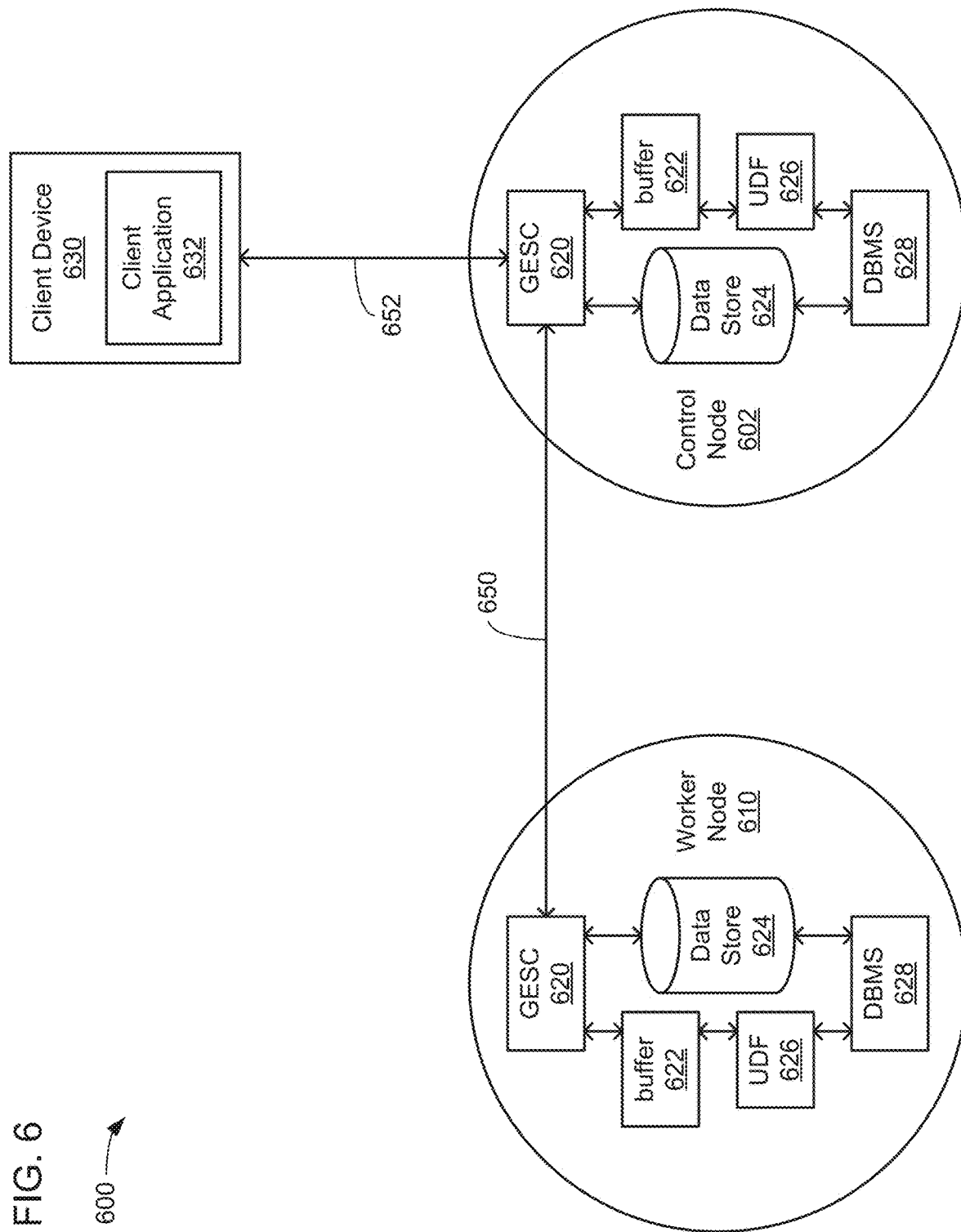
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
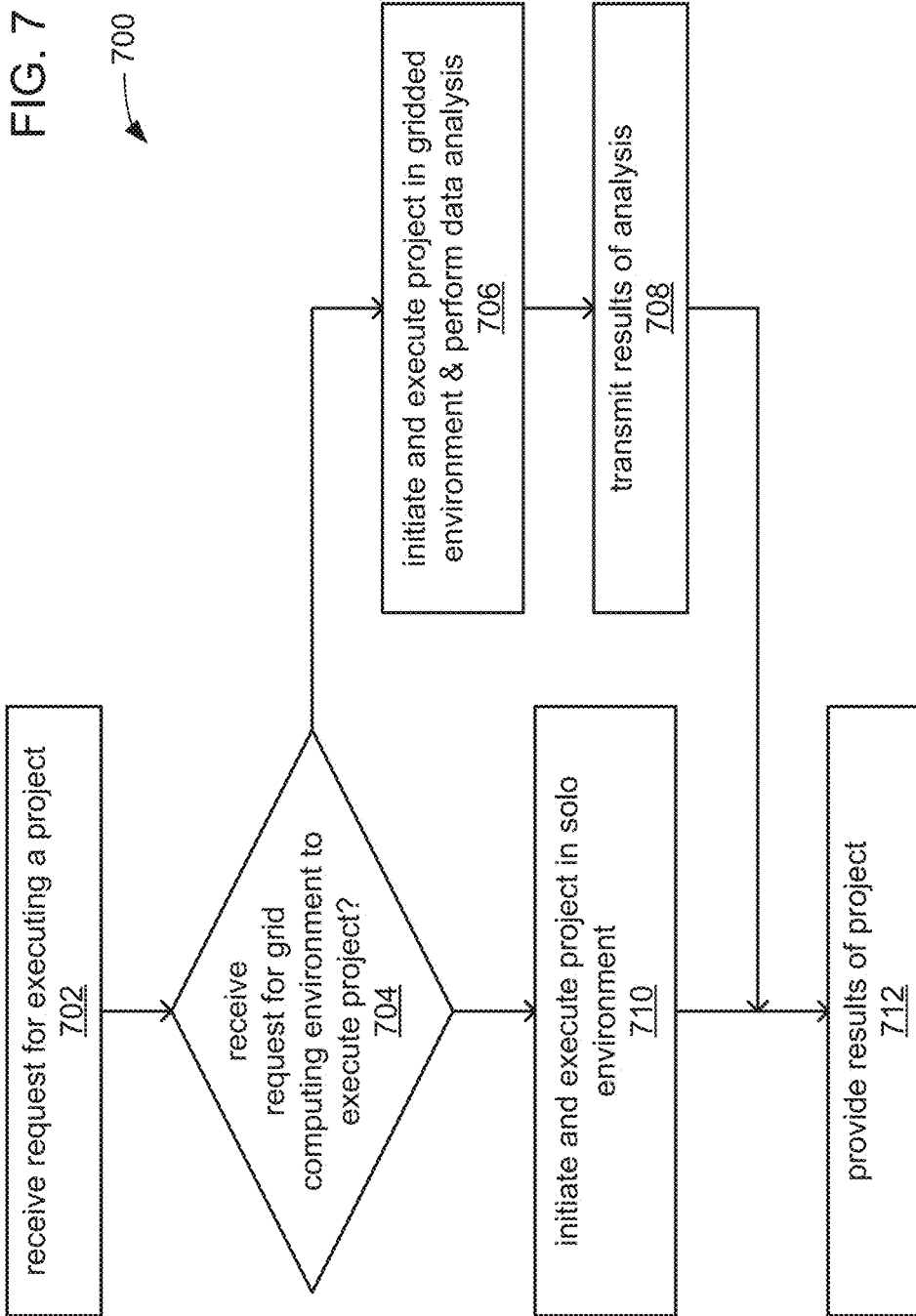
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
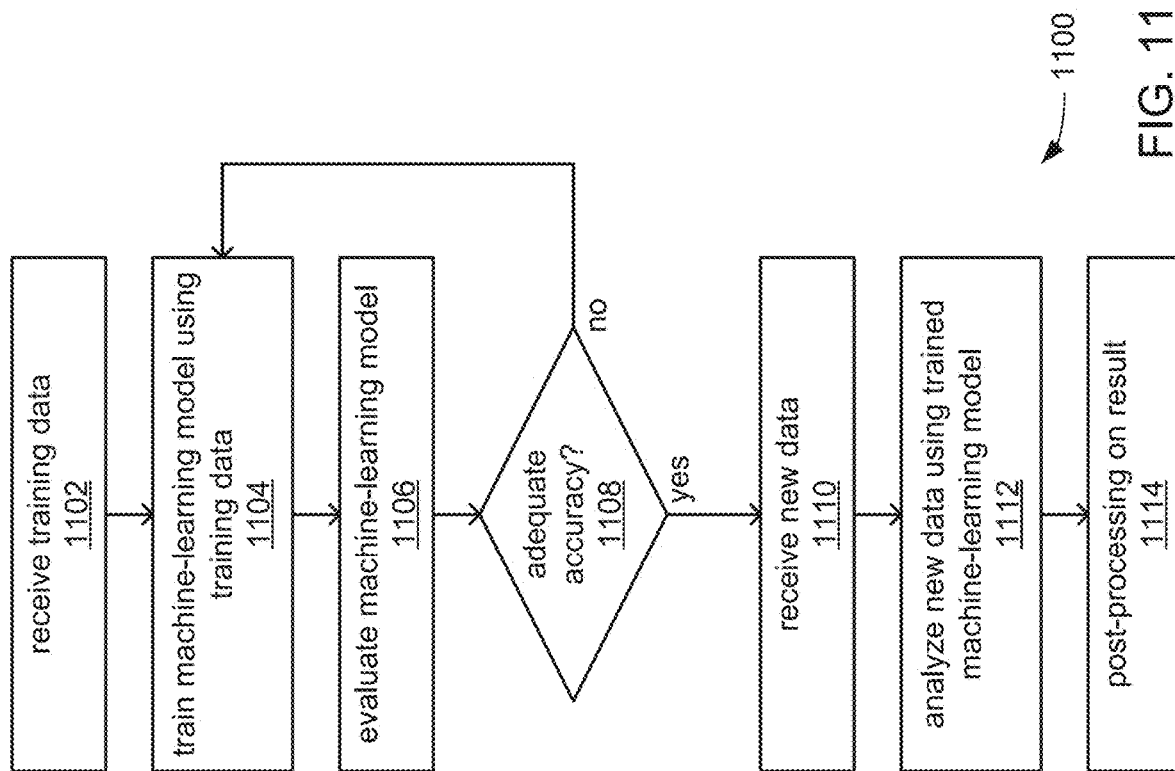
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
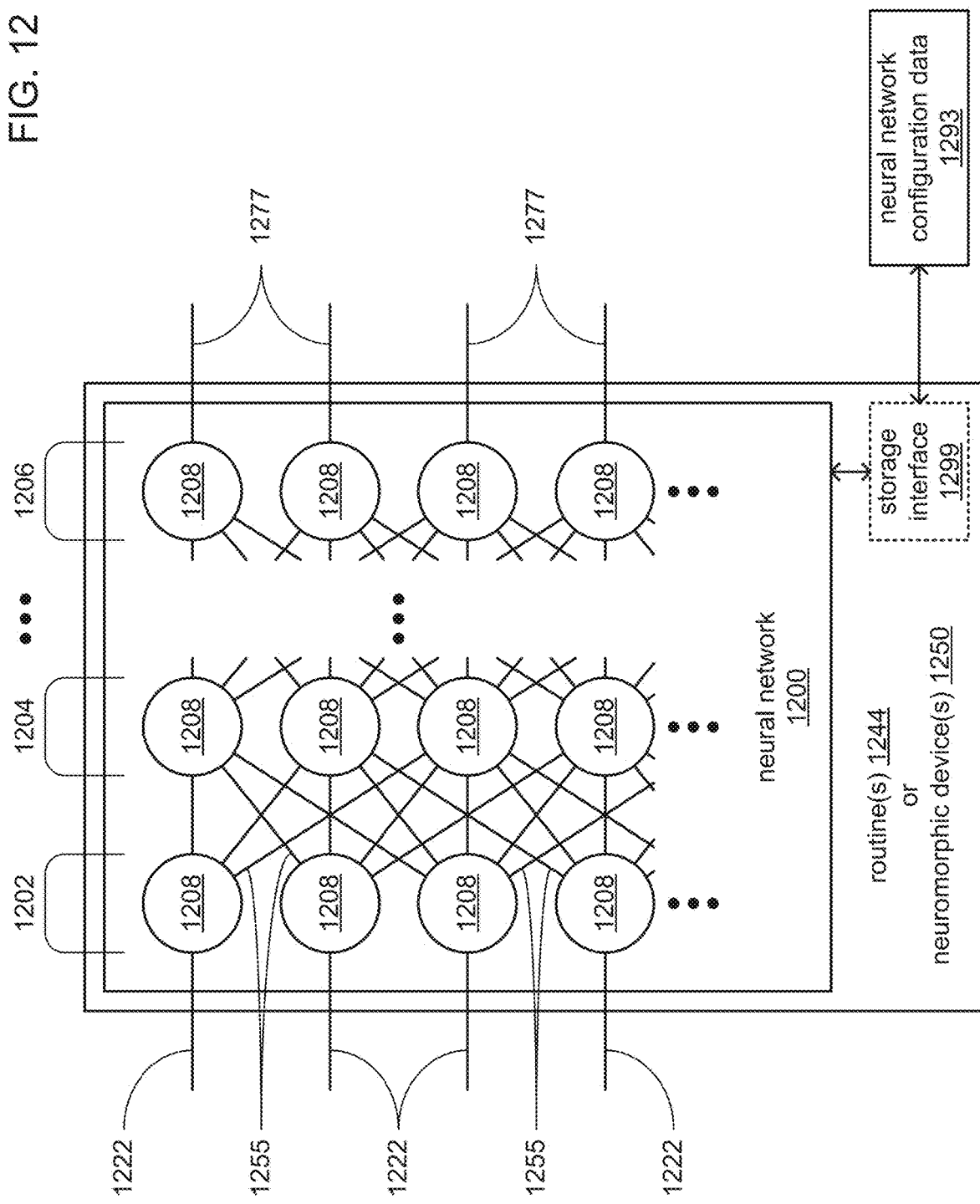
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, o)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
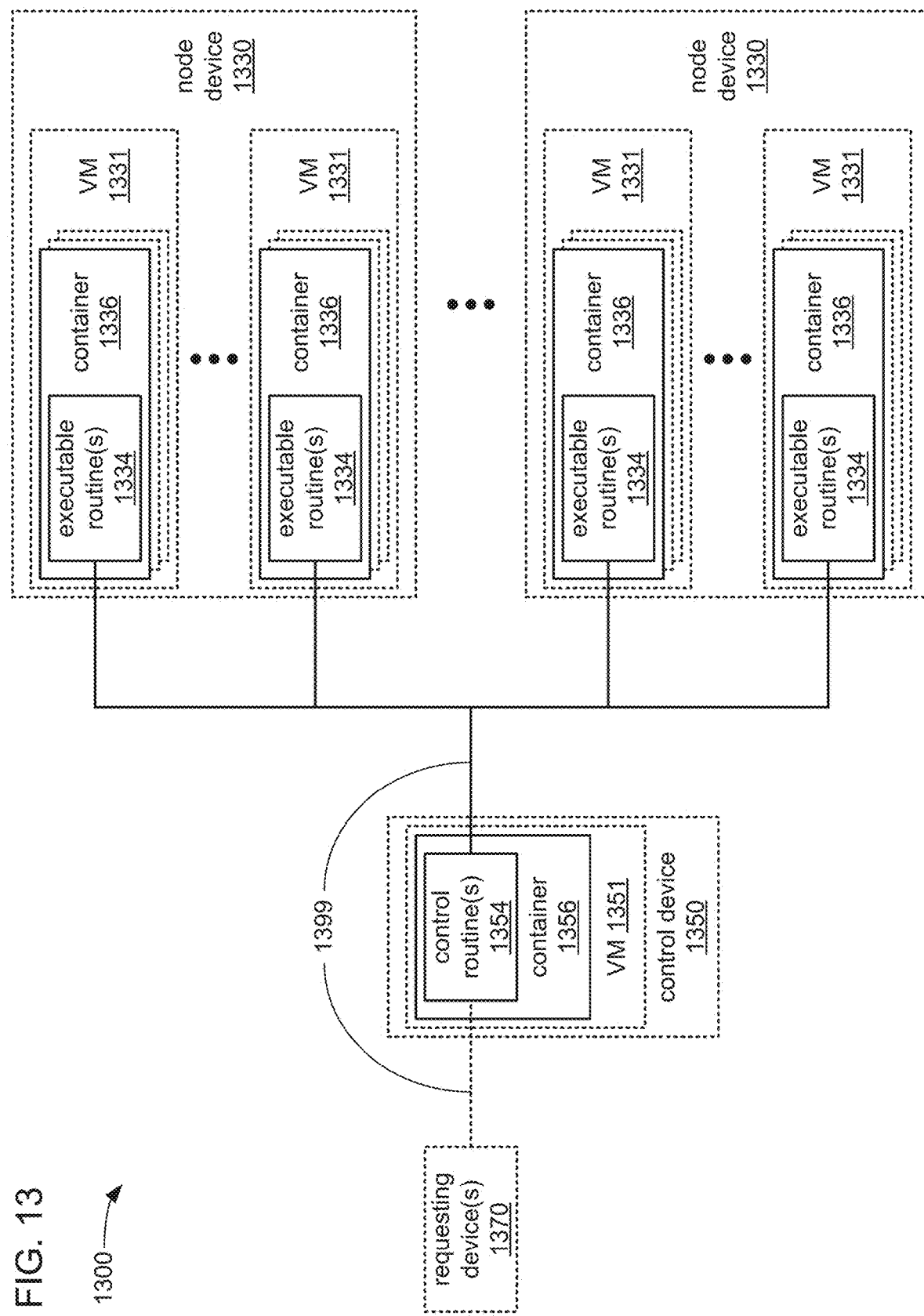
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages.

In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

Figure 14:
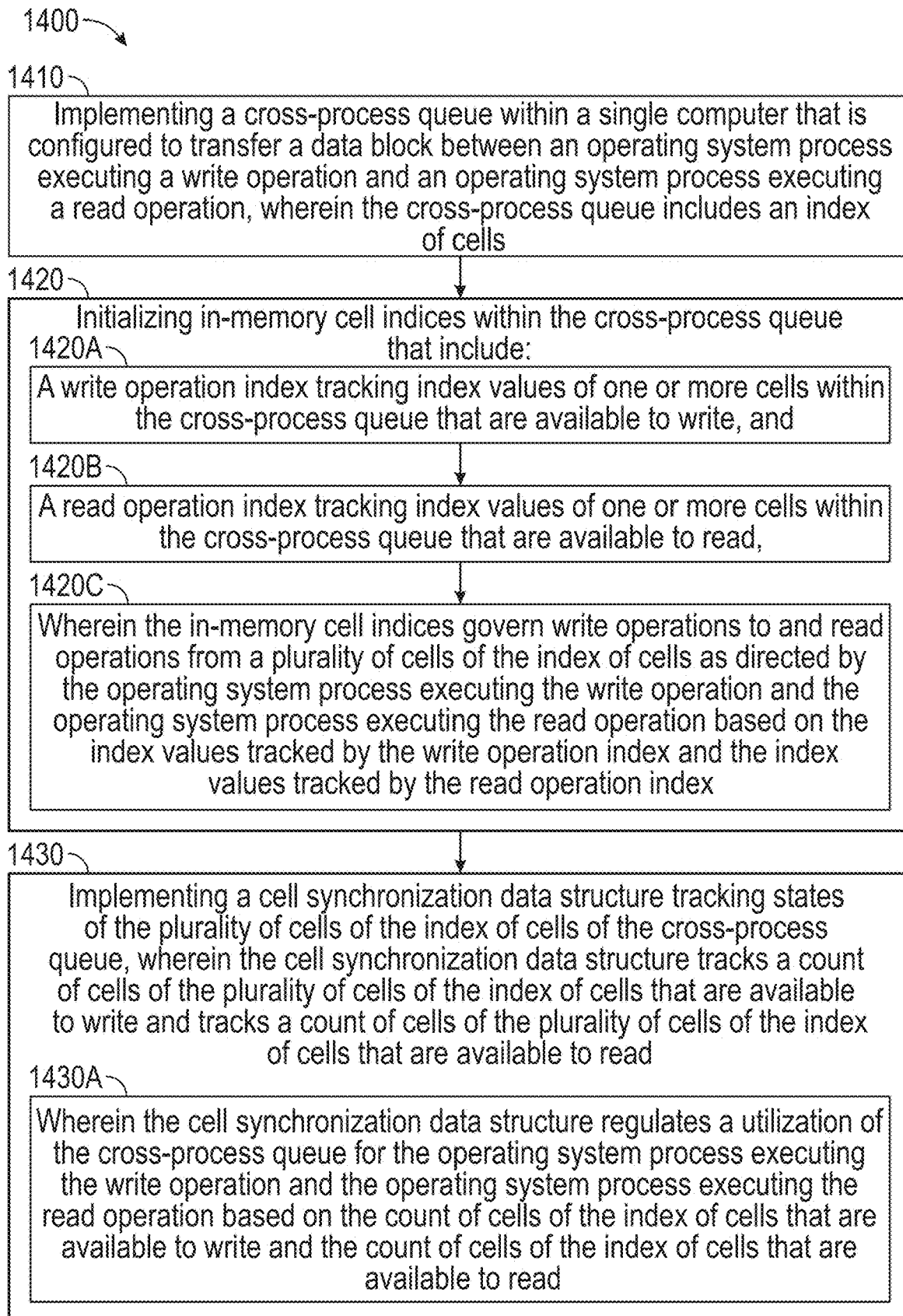
FIG. 14 illustrates a flow chart showing an example process of implementing a cross-process queue, according to some embodiments of the present technology.

FIG. 14 illustrates one embodiment of a method 1400 for implementing and using a cross-process queue to transfer data between a plurality of distinct operating system processes. It will be appreciated that other embodiments contemplated within the scope of the present disclosure may involve more operations, fewer operations, different operations, or a different order of operations than as shown in FIG. 14.

In one or more embodiments, a computing device may use method 1400 to implement a plurality of software-based components that enables the computing device to transfer data across multiple operating system processes. For example, in one or more embodiments, the computing device may function to implement a cross-process queue, one or more in-memory cell indices, and a cell synchronization data structure, which will be described in greater detail herein.

Single-Producer/Single-Consumer Cross-Process Queue

In one or more embodiments, the software-based components (e.g., the cross-process queue, the one or more in-memory cell indices, and the cell synchronization data structure) implemented by the computing device may be specifically designed for a single-producer/single-consumer application. A single-producer/single-consumer application, as generally used herein, may relate to a scenario where one operating system process is writing data to the cross-process queue and another operating system process is reading data from the cross-process queue. In other words, a single-producer/single consumer application, in some embodiments, may exclude multiple operating system processes reading and writing data from the cross-process queue at the same time.

Accordingly, at least one technical advantage of a system or service implementing method 1400 may enable any suitable computing device to efficiently transfer data across operating system processes, particularly in cloud environments.

Implementing a Cross-Process Queue

In one or more embodiments, method 1400 may include process 1410. Process 1410, which includes implementing a cross-process queue, may function to implement a cross-process queue that is configured to transfer data between at least two distinct operating system processes running on a single computer. A single computer, as generally referred to herein, may be a computing device (e.g., a server, a desktop computer, a laptop computer, etc.) that is capable of simultaneously or sequentially running multiple operating system processes using one or more hardware components and/or one or more software components of the computing device.

Figure 15:
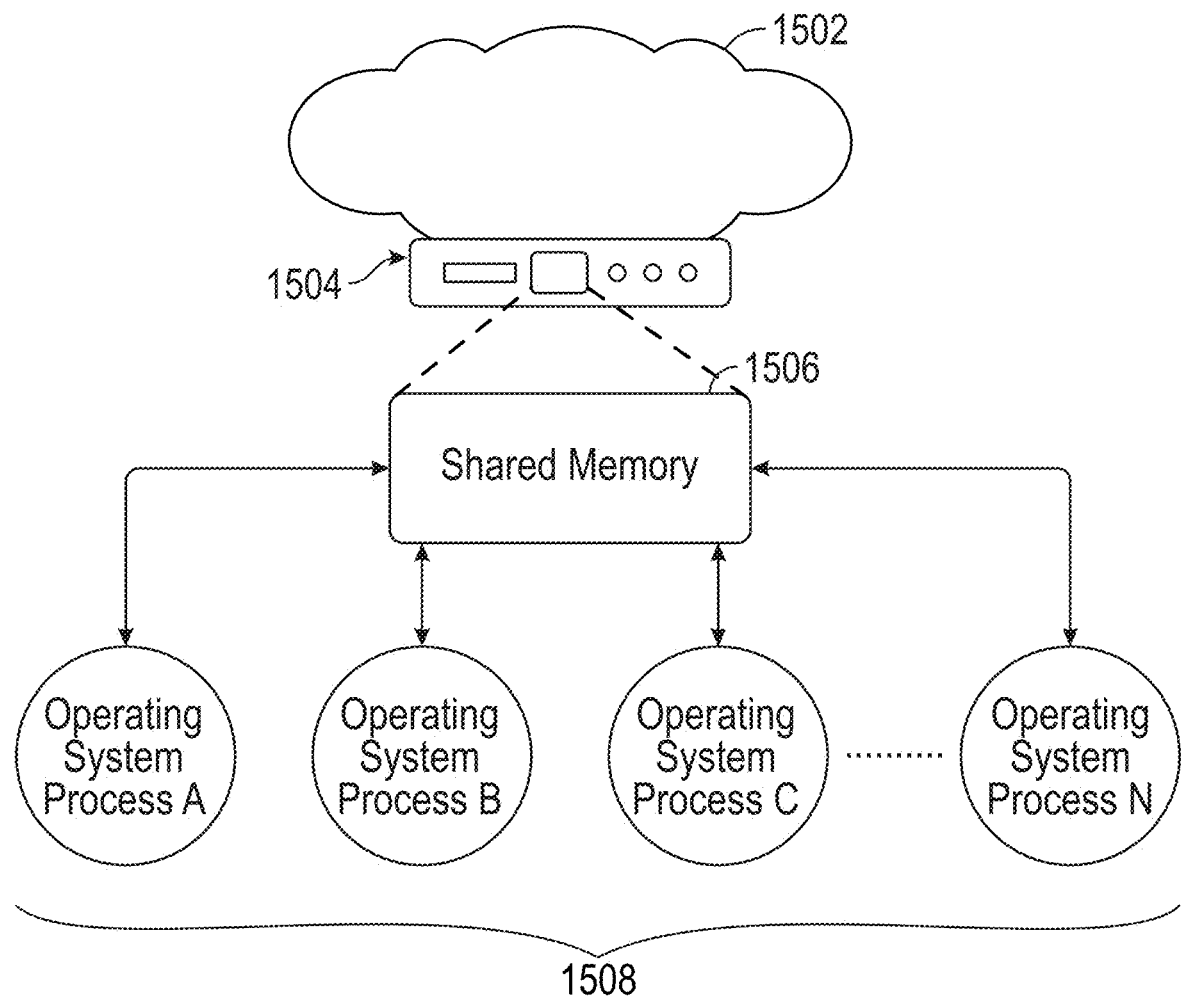
FIG. 15 illustrates an example schematic of a single computer and multiple operating system processes accessing shared memory of the single computer, according to some embodiments of the present technology.

For instance, in a non-limiting example, a plurality of distinct operating system processes 1508 may be scheduled to run on single computer 1504 (e.g., a server or the like) within cloud environment 1502, as shown generally by way of example in FIG. 15. The single computer 1504, in one or more embodiments, may operate on a portable operating system interface (POSIX), such as Linux or any other suitable POSIX-compliant operating system. In such a non-limiting example, one of the plurality of distinct operating system processes 1508 may require data from another one of the plurality of distinct operating system processes 1508 running or scheduled to run on the operating system of the single computer 1504.

It shall be recognized that transferring data between operating system processes in traditional POSIX-compliant operating systems presents many technical challenges as traditional POSIX-compliant operating systems do not share the same memory address space across operating system processes (e.g., memory address zero (0) in operating system process A does not correspond to the same physical memory location as memory address zero (0) in operating system process B). Thus, as described in more detail herein, process 1410 may function to implement a cross-process queue (e.g., circular buffer or the like) that enables an efficient transfer of data between at least two distinct operating system processes either running or scheduled to run on the same computing device.

It shall be further recognized that, in one or more embodiments, the systems, computer program products, and methods described herein may transfer data between operating system processes faster than other inter-process communication mechanisms (e.g., data sockets, network sockets, etc.) because only one copy operation (e.g., write operation) is needed, whereas using sockets or the like requires two copy operations (e.g., two write operations: a first copy (e.g., first write operation) of data from a user space of a first process to a kernel space and a second copy (e.g., second write operation) of the data from the kernel space to the user space of a second process). As described in more detail herein, by creating and/or writing data to a cross-process queue in shared memory, only one copy operation (e.g., write operation) is needed to transfer data between two processes as both processes have access to the cross-process queue.

Figure 16:
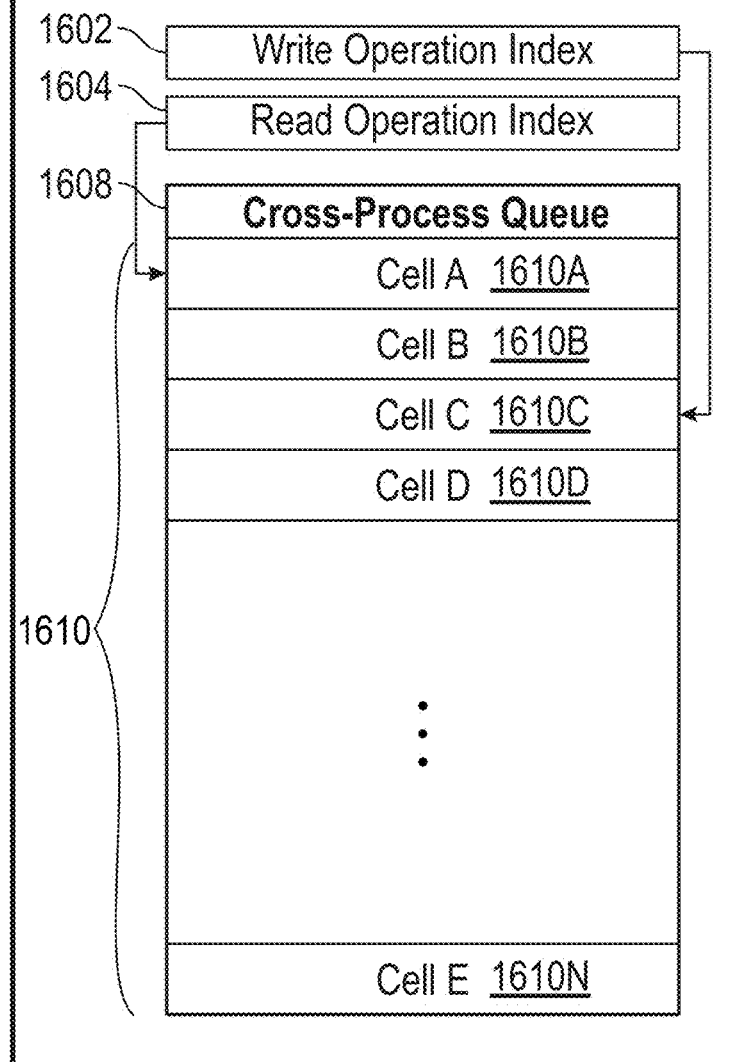
FIG. 16 illustrates an example schematic of reading and writing data using a cross-process queue and a cell synchronization data structure, according to some embodiments of the present technology.

Turning briefly to FIG. 16, in one or more embodiments, a system or service implementing method 1400 may function to implement cross-process queue 1608 within single computer 1504. For instance, in a non-limiting example, process 1410 may function to implement cross-process queue 1608 within random access memory (RAM) of the single computer 1504. Alternatively, in another non-limiting example, process 1410 may function to implement cross-process queue 1608 within shared memory 1506 (e.g., POSIX shared memory) of the single computer 1504. Those skilled in the art can appreciate that the cross-process queue 1608 may be implemented within any suitable memory structure or storage component of the single computer 1504.

The cross-process queue 1608, in one or more embodiments, may include a plurality of cells 1610 that may be used as its underlying memory resource or backing memory. In such embodiments, each cell of the plurality of cells 1610 may be configured to store a predetermined maximum amount of data (e.g., four (4) megabytes, six (6) kilobytes, etc.). It shall be recognized that the plurality of cells 1610 (e.g., cells 1610A-1610N) may collectively form an "index of cells", a "contiguous array of fixed-length elements", and/or the like.

For example, in one or more embodiments, when an operating system process executing a write operation writes to any one of the plurality of cells 1610 of the cross-process queue 1608, the corresponding cell may function to store a data block associated with the write operation, a length of the data block, a data structure type of the data block (e.g., Python NumPy, Python float, Python int, C++ vector, etc.), and/or any other suitable information, as shown generally by way of example in FIG. 16 and FIG. 20.

In one or more embodiments, based on or in response to implementing cross-process queue 1608, each cell of the plurality of cells 1610 of the cross-process queue 1608 may be assigned a corresponding cell index value. For instance, in a non-limiting example, cross-process queue 1608 may include ten (10) cells in which each cell is assigned a unique cell index value. In such a non-limiting example, a cell index value of zero (0) may correspond to the first cell of the cross-process queue 1608, a cell index value of one (1) may correspond to the second cell of the cross-process queue 1608, a cell index value of two (2) may correspond to the third cell of the cross-process queue 1608, a cell index value of three (3) may correspond to the fourth cell of the cross-process queue 1608, a cell index value of four (4) may correspond to the fifth cell of the cross-process queue 1608, a cell index value of five (5) may correspond to the sixth cell of the cross-process queue 1608, a cell index value of six (6) may correspond to the seventh cell of the cross-process queue 1608, a cell index value of seven (7) may correspond to the eighth cell of the cross-process queue 1608, a cell index value of eight (8) may correspond to the ninth cell of the cross-process queue 1608, and a cell index value of nine (9) may correspond to the tenth cell of the cross-process queue 1608.

Accordingly, in one or more embodiments, after implementing cross-process queue 1608, the single computer 1504 may use cross-process queue 1608 to transfer a target data block between an operating system process executing a write operation and an operating system process executing a read operation.

Initializing In-Memory Cell Indices

In one or more embodiments, method 1400 may include process 1420. Process 1420, which includes initializing in-memory cell indices, may function to initialize one or more in-memory cell indices within cross-process queue 1608. An in-memory cell index, as generally referred to herein, may be configured to track which cells of the plurality of cells 1610 are in a target cell state. It shall be recognized that an "in-memory cell index" may be interchangeably referred to herein as a "cell state index", a "cell state tracker", or the like.

In one or more embodiments, process 1420 may function to initialize a distinct in-memory cell index for each cell state of a plurality of predetermined cell states that needs to be tracked by a system, service, or computing device implementing method 1400. For instance, in a non-limiting example, process 1420 may function to create or initialize a write operation index 1602 within shared memory 1506 (e.g., POSIX shared memory) of the single computer 1504. The write operation index 1602, in one or more embodiments, may be configured to track which cells of the plurality of cells 1610 of the cross-process queue 1608 are available to have data written to them.

Additionally, or alternatively, in such a non-limiting example, process 1420 may function to create or initialize a read operation index 1604 within shared memory 1506 (e.g., POSIX shared memory) of the single computer 1504. The read operation index 1604, in one or more embodiments, may be configured to track which cells of the plurality of cells 1610 of the cross-process queue 1608 are available to have data read from them.

In other words, in one or more embodiments, the write operation index 1602 may be configured to track index values of one or more cells of the cross-process queue 1608 that are available to write, and the read operation index 1604 may be configured to track index values of one or more cells of the cross-process queue 1608 that are available to read (e.g., sub-process 1420A and sub-process 1420B). For instance, with continued reference to the above non-limiting example, the write operation index 1602 may indicate that the first cell, the second cell, the third cell, the fourth cell, and the fifth cell are available for writing based on the write operation index 1602 having the index values of zero (0), one (1), two (2), three (3), and four (4), respectively, and the read operation index 1604 may indicate that the sixth cell, seventh cell, eight cell, ninth cell, and tenth cell are available for reading based on the read operation index 1604 having the index values of five (5), six (6), seven (7), eight (8), and nine (9), respectively.

It shall be recognized, in one or more embodiments, the in-memory cell indices (e.g., write operation index 1602, read operation index 1604, etc.) may govern write operations to and read operations from the plurality of cells 1610 of the cross-process queue 1608 as directed by a subject operating system process executing a write operation and a subject operating system process executing a read operation based on the index values tracked by the write operation index 1602 and the index values tracked by the read operation index 1604 (e.g., sub-process 1420C).

Stated another way, in one or more embodiments, a system, service, or computing device implementing method 1400 may assign a given index value stored within the write operation index 1602 (or a distinct memory address based on the given index value) to a given operating system process requesting to execute write operations, as described in greater detail herein. Furthermore, in one or more embodiments, a system, service, or computing device implementing method 1400 may assign a given index value stored within the read operation index 1604 (or a distinct memory address based on the given index value) to a given operating system process requesting to execute read operations, as described in greater detail herein.

It shall be noted, in one or more embodiments, a memory address or shared memory location for a given cell index may be computed using a formula that converts a cell index value to a memory address or shared memory location. The formula, in one or more embodiments, may be Memory Address or Shared Memory Location=(Cell Index*Cell Size)+Initial Location of the Cell in Shared Memory+Initial Location of the Shared Memory.

Implementing a Cell Synchronization Data Structure

In one or more embodiments, method 1400 may include process 1430. Process 1430, which includes implementing a cell synchronization data structure, may function to implement a cell synchronization data structure within a computing device. A cell synchronization data structure, as generally referred to herein, may be any suitable data structure that is configured to keep track of one or more predetermined cell states via a count or the like. It shall be recognized that a "cell synchronization data structure" may be interchangeably referred to herein as a "cell synchronization mechanism", a "synchronization mechanism", or the like.

In one or more embodiments, process 1430 may function to implement cell synchronization data structure 1612 within single computer 1504. In such embodiments, the cell synchronization data structure 1612 may be configured to track a count of cells of the plurality of cells 1610 that are available to have data written to them. In other words, the cell synchronization data structure 1612 may be configured to track a count of cells of the plurality of cells 1610 that are free.

Additionally, or alternatively, in one or more embodiments, the cell synchronization data structure 1612 may be configured to track a count of cells of the plurality of cells 1610 that are available to have data read from them. In other words, the cell synchronization data structure 1612 may be configured to track a count of cells of the plurality of cells 1610 that are not free.

It shall be recognized, in one or more embodiments, the cell synchronization data structure 1612 may function to regulate a utilization of the cross-process queue 1608 and, more specifically, the plurality of cells 1610 by allowing producer processes (e.g., operating system processes executing write operations) and consumer processes (e.g., operating system processes executing read operations) to proceed with their respective operations when the required cell resources are available and to enter a wait state when the required cell resources are unavailable (e.g., sub-process 1430A).

A non-limiting example of using the above-described embodiments and software-based components will now be described.

In one or more embodiments, a computing device (e.g., single computer 1504 or the like) may be running a plurality of distinct computer processes on an operating system of a computing device, such as a first operating system process requesting to execute a write operation and a second operating system process requesting to execute a read operation. In such embodiments, the computing device may need to transfer a data block between the first operating system process and the second operating system process.

In such embodiments, the computing device may use the cell synchronization data structure 1612 to regulate or govern when the first operating system process and the second operating system process has access to cross-process queue 1608. As described above, in one or more embodiments, the cell synchronization data structure 1612 may be configured to track a count of cells of the plurality of cells 1610 that are available to have data written to them. Thus, in one or more embodiments, when the count of cells of the plurality of cells 1610 that are available to write is greater than zero, the cell synchronization data structure 1612 may cause or allow the first operating system process requesting to execute the write operation to have access to cross-process queue 1608. Conversely, in one or more embodiments, when the count of cells of the plurality of cells 1610 that are available to write is zero, the cell synchronization data structure 1612 may cause the first operating system process requesting to execute the write operation to pause (e.g., wait) and not have access to cross-process queue 1608 until the count of cells of the plurality of cells 1610 that are available to write is greater than zero.

Additionally, in such embodiments, the cell synchronization data structure 1612 may be configured to track a count of cells of the plurality of cells 1610 that are available to have data read from them. Thus, in one or more embodiments, when the count of cells of the plurality of cells 1610 that are available to read is greater than zero, the cell synchronization data structure 1612 may cause or allow the second operating system process requesting to execute the read operation to have access to cross-process queue 1608. Conversely, in one or more embodiments, when the count of cells of the plurality of cells 1610 that are available to read is zero, the cell synchronization data structure 1612 may cause the second operating system process requesting to execute the read operation to pause (e.g., wait) and not have access to cross-process queue 1608 until the count of cells of the plurality of cells 1610 that are available to read is greater than zero.

In one or more embodiments, when the count of cells of the plurality of cells 1610 that are available to write is greater than zero, the computing device may function to assign a given index value within the write operation index 1602 (or a memory address based on the given index value) to the first operating system process requesting to execute the write operation and, in turn, the first operating system process may function to write a data block to the cell of the plurality of cells 1610 of the cross-process queue 1608 that corresponds to the given index value (e.g., if the cell index value of zero (0) is assigned to the first operating system process, the first operating system process may function to write a given data block to the first cell, if a subject memory address is assigned to the first operating system process, the first operating system process may function to write a given data block to the cell that corresponds to the subject memory address). It shall be noted that, in one or more embodiments, after the write operation is complete, the given index value assigned to the first operating system process may be removed from the write operation index 1602 and, subsequently, added to the read operation index 1604.

Additionally, in one or more embodiments, when the count of cells of the plurality of cells 1610 that are available to read is greater than zero, the computing device may function to assign a given index value within the read operation index 1604 (or a memory address based on the given index value) to the second operating system process requesting to execute the read operation. Accordingly, in such embodiments, the second operating system process may function to read the data block from the cell of the plurality of cells 1610 of the cross-process queue 1608 that corresponds to the given index value (e.g., if the cell index value of zero (0) is assigned to the second operating system process, the second operating system process may function to read the data block from the first cell, if a subject memory address is assigned to the second operating system process, the second operating system process may function to read the data block from the cell that corresponds to the subject memory address).

It shall be recognized that, in one or more embodiments, executing the first operating system process and the second operating system process may cause one or more atomic updates that causes a change to the index values tracked by the write operation index 1602 and the index values tracked by the read operation index 1604.

Another non-limiting example of using the above-described embodiments and software-based components will now be described.

Figure 18:
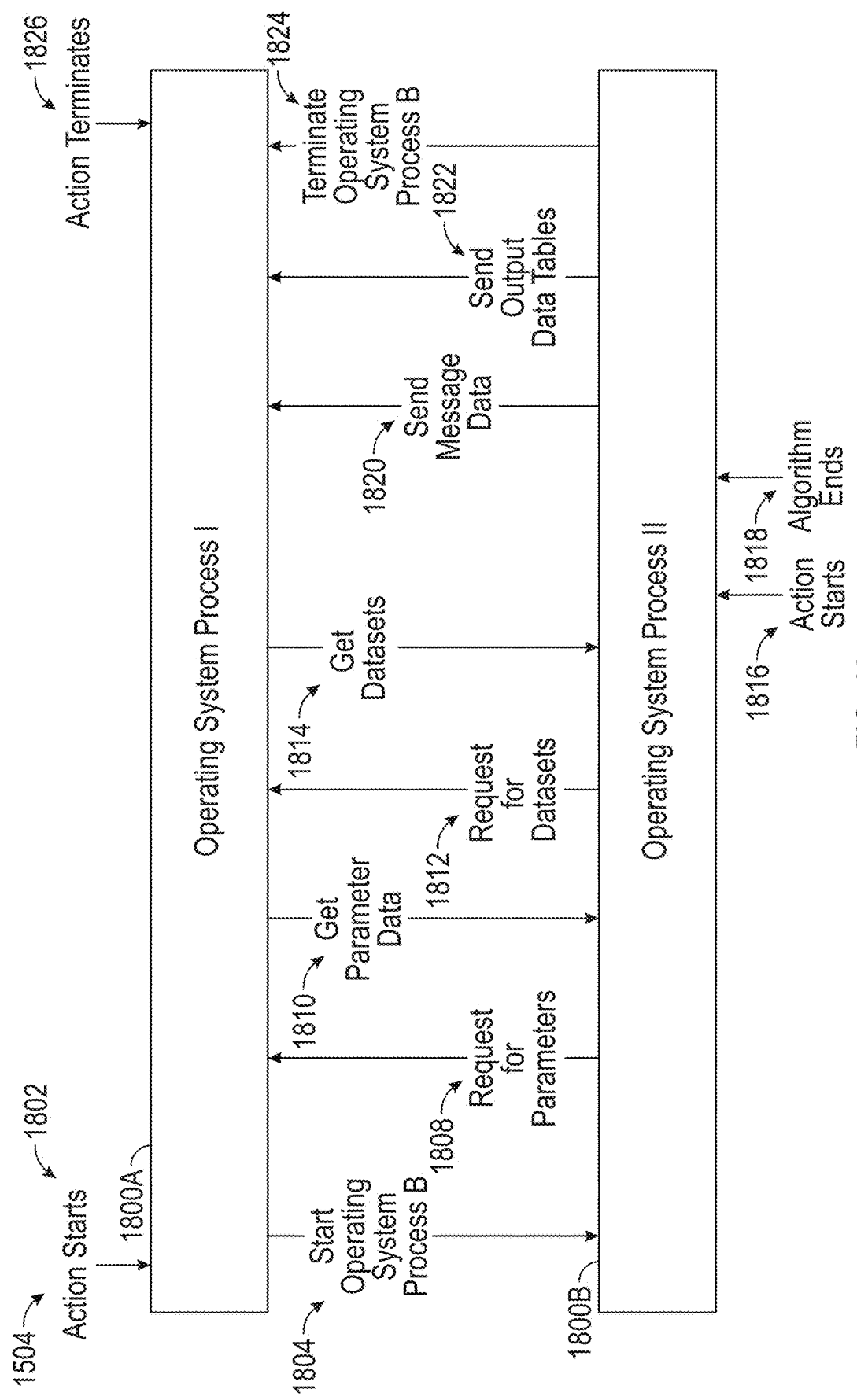
FIG. 18 illustrates an example schematic of transferring data blocks between multiple operating system processes running on the same computing device, according to some embodiments of the present technology.

Turning to FIG. 18, in one or more embodiments, a computing device (e.g., single computer 1504 or the like) may function to receive a triggering event that causes a computer action to be started (e.g., action starts 1802).

Accordingly, based on or in response to starting the computer action, operating system process I 1800A and all child processes of operating system process I 1800A, including operating system process II 1800B (e.g., start operating system process II 1804) may be started on the computing device.

In one or more embodiments, an algorithm running on operating system process II 1800B may require one or more parameters to execute successfully. In such embodiments, operating system process II 1800B may function to send a request for parameters 1808 to operating system process I 1800A and, in turn, operating system process II 1800B may function to obtain the requested parameters (e.g., get parameter data 1810). It shall be noted that, in one or more embodiments, the parameters requested by operating system process II 1800B may be obtained from operating system process I 1800A via user input, one or more graphical user interfaces (GUIs), command line interfaces (CLIs), application programming interfaces (APIs), or the like. It shall be further noted that, in one or more embodiments, to transfer parameter data from operating system process I 1800A to operating system process II 1800B, the computing device may use at least the cross-process queue 1608, the cell synchronization data structure 1612, the write operation index 1602, and the read operation index 1604 in analogous ways as described above.

Additionally, or alternatively, in one or more embodiments, an algorithm running on operating system process II 1800B may require one or more datasets to execute successfully. In such embodiments, operating system process II 1800B may function to send a request for datasets 1812 to operating system process I 1800A and, in turn, operating system process II 1800B may function to obtain the requested datasets (e.g., get datasets 1814). It shall be noted, in one or more embodiments, the datasets requested by operating system process II 1800B may be obtained from operating system process I 1800A via user input, one or more graphical user interfaces (GUIs), command line interfaces (CLIs), application programming interfaces (APIs), or the like. It shall be further noted that, in one or more embodiments, to transfer datasets from operating system process I 1800A to operating system process II 1800B, the computing device may use at least the cross-process queue 1608, the cell synchronization data structure 1612, the write operation index 1602, and the read operation index 1604 in analogous ways as described above.

In one or more embodiments, after operating system process II 1800B obtains the requested parameters and datasets, operating system process II 1800B may function to perform one or more analytical operations using at least the requested parameters and datasets. In such embodiments, operating system process II 1800B may function to start or launch an analytics algorithm (e.g., algorithm starts 1816) and terminate the analytics algorithm when the one or more analytical operations are complete (e.g., algorithm ends 1818).

Accordingly, in one or more embodiments, after the one or more analytical operations are complete, the computation results may be sent to operating system process I 1800A. For example, operating system process II 1800B may function to transfer or send message data (e.g., send message data 1820), output data tables (e.g., send output data tables 1822), and any other suitable computation results to operating system process I 1800A. It shall be noted that, in one or more, to transfer computation results from operating system process II 1800B to operating system process I 1800A, the computing device may use at least the cross-process queue 1608, the cell synchronization data structure 1612, the write operation index 1602, and the read operation index 1604 in analogous ways as described above.

It shall be further noted that, in one or more embodiments, after transferring or sending the computation results from operating system process II 1800B to operating system process I 1800A, operating system process II 1800B may be terminated (e.g., terminate operating system process II 1824). Furthermore, in one or more embodiments, the computer action may be terminated after obtaining the computation results (e.g., action terminates 1826).

Multiple-Producer/Multiple-Consumer Cross-Process Queue

In one or more embodiments, method 1400 may function to implement a plurality of software-based components that may be specifically designed for a multiple-producer/multiple-consumer application. A multiple-producer/multiple-consumer application, as generally used herein, may relate to a scenario where multiple operating system processes are writing data to a multiple-producer/multiple-consumer queue, while multiple operating system processes are reading data from the multiple-producer/multiple-consumer queue. Such multiple-producer/multiple-consumer queue may be used in computing systems where data needs to be exchanged between different processes (e.g., not threads).

Implementing Shared Memory Channels

Figure 17:
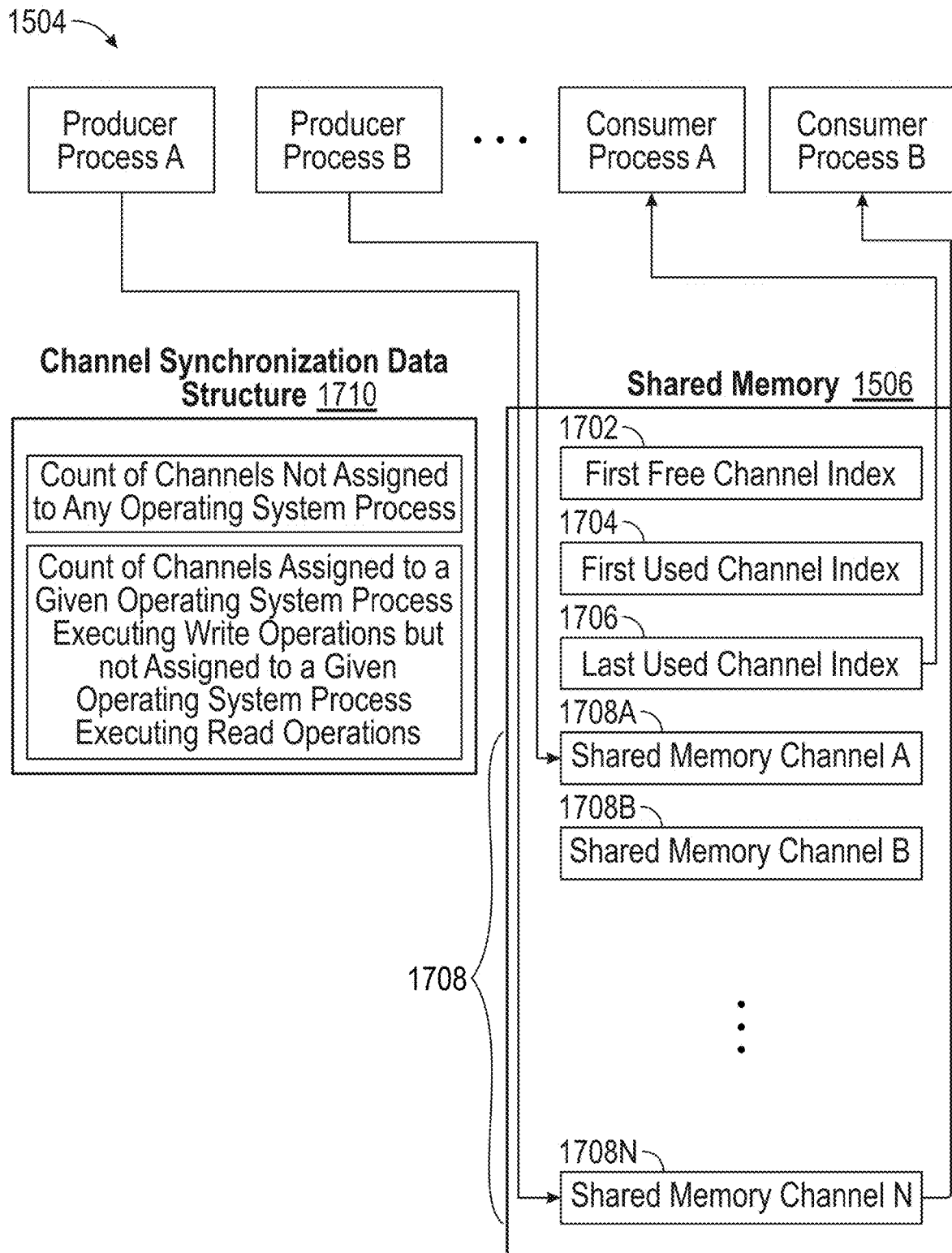
FIG. 17 illustrates an example schematic of reading and writing multiple data blocks to a plurality of shared memory channels, according to some embodiments of the present technology.

In one or more embodiments, method 1400 may function to implement a plurality of shared memory channels 1708 within shared memory 1506 of a single computing device (e.g., single computer 1504 or the like), as shown generally by way of example in FIG. 17. For instance, in a non-limiting example, a system or service implementing method 1400 may function to implement one or more shared memory channels, two or more shared memory channels, three or more shared memory channels, four or more shared memory channels, five or more shared memory channels, six or more shared memory channels, seven or more shared memory channels, eight or more shared memory channels, nine or more shared memory channels, ten or more shared memory channels, or any other suitable number of shared memory channels within shared memory 1506 (e.g., POSIX shared memory or the like) of single computer 1504.

Shared memory, as generally used herein, may relate to a memory region or memory area within a computing device that is accessible by all operating system processes running or scheduled to run on the computing device.

In one or more embodiments, based on or in response to implementing the plurality of shared memory channels 1708 (e.g., shared memory channels 1708A-1708N), each shared memory channel of the plurality of shared memory channels 1708 may be assigned a corresponding channel index value. For instance, in a non-limiting example, a multiple-producer/multiple-consumer cross-process queue may include ten (10) shared memory channels in which each shared memory channel is assigned a unique channel index value. In such a non-limiting example, an index value of zero (0) may correspond to the first shared memory channel of the multiple-producer/multiple-consumer cross-process queue, an index value of one (1) may correspond to the second shared memory channel of the multiple-producer/multiple-consumer cross-process queue, an index value of two (2) may correspond to the third shared memory channel of the multiple-producer/multiple-consumer cross-process queue, an index value of three (3) may correspond to the fourth shared memory channel of the multiple-producer/multiple-consumer cross-process queue, an index value of four (4) may correspond to the fifth shared memory channel of the multiple-producer/multiple-consumer cross-process queue, an index value of five (5) may correspond to the sixth shared memory channel of the multiple-producer/multiple-consumer cross-process queue, an index value of six (6) may correspond to the seventh shared memory channel of the multiple-producer/multiple-consumer cross-process queue, an index value of seven (7) may correspond to the eighth shared memory channel of the multiple-producer/multiple-consumer cross-process queue, an index value of eight (8) may correspond to the ninth shared memory channel of the multiple-producer/multiple-consumer cross-process queue, and an index value of nine (9) may correspond to the tenth shared memory channel of the multiple-producer/multiple-consumer cross-process queue.

Stated another way, in one or more embodiments, shared memory 1506 may be segmented into a plurality of distinct shared memory channels 1708 that operate as individual in-memory components. In such embodiments, each distinct shared memory channel of the plurality of distinct shared memory channels 1708 may have an associated cross-process queue that is substantially similar to the cross-process queue 1608 described above. For instance, in a non-limiting example, method 1400 may function to implement three (3) distinct shared memory channels within shared memory 1506 (e.g., POSIX shared memory) of the single computer 1504 and, in turn, the single computer 1504 may have three (3) distinct cross-process queues.

In other words, in one or more embodiments, each distinct shared memory channel of the plurality of distinct shared memory channels 1708 may have an associated cross-process queue that may be used to transfer data (e.g., a target data block or the like) between an operating system process executing a write operation and an operating system process executing a read operation (e.g., a target pair of operating system processes or the like). It shall be recognized that the plurality of shared memory channels 1708 may enable the single computer 1504 to concurrently transfer a plurality of data blocks between a plurality of operating system processes executing write operations and a plurality of operating system processes executing read operations, respectively.

Implementing In-Memory Channel Indices

In one or more embodiments, a system, service, or computing device implementing method 1400 may function to implement one or more in-memory channel indices within shared memory 1506 of the single computer 1504. An in-memory channel index, as generally referred to herein, may be configured to track the plurality of distinct shared memory channels 1708 based on a target channel characteristic.

In one or more embodiments, a system, service, or computing device implementing method 1400 may function to implement a distinct in-memory channel index for each channel utilization characteristic of a plurality of distinct channel utilization characteristics that needs to be tracked by the single computer 1504.

In one or more embodiments, method 1400 may function to implement or initialize a first free channel index 1702 within shared memory 1506 (e.g., POSIX shared memory) of the single computer 1504. The first free channel index 1702 may function to track an index value of a given shared memory channel that is at a head of a queue of shared memory channels that are available to write (e.g., at a head of a free channel linked list or the like). Stated another way, in one or more embodiments, the first free channel index 1702 may be configured to identify or indicate the foremost or next available shared memory channel within a data structure of shared memory channels that are available for writing (e.g., free shared memory channels, shared memory channels not storing data, or the like).

Additionally, or alternatively, in one or more embodiments, method 1400 may function to implement or initialize a first used channel index 1704 within shared memory 1506 (e.g., POSIX shared memory) of the single computer 1504. The first used channel index 1704 may function to track an index value of a given shared memory channel that is at a head of a queue of shared memory channels that are available to read (e.g., at a head of a used channel linked list or the like). Stated another way, in one or more embodiments, the first used channel index 1704, in one or more embodiments, may be configured to identify or indicate the foremost or next available shared memory channel within a data structure of shared memory channels that are available for reading (e.g., used shared memory channels, shared memory channels storing data or the like).

Additionally, or alternatively, in one or more embodiments, method 1400 may function to implement or initialize a last used channel index 1706 within shared memory 1506 (e.g., POSIX shared memory) of the single computer 1504. The last used channel index 1706, in one or more embodiments, may function to track an index value of a given shared memory channel that is at a tail of the queue of shared memory channels that are available to read (e.g., at a tail of a used channel linked list or the like). Stated another way, in one or more embodiments, the last used channel index 1706 may be configured to identify or indicate which shared memory channel of the plurality of shared memory channels 1708 has been most recently used for writing data.

It shall be recognized that, in one or more embodiments, the index values underlying the in-memory channel indices (e.g., the first free channel index 1702, the first used channel index 1704, the last used channel index 1706, etc.) may be obtained by traversing a free channel linked list and a used channel linked list managed by the single computer 1504. A free channel linked list, as generally used herein, may be a linked list data structure that organizes and maintains index values of available shared memory channels that are available for writing data. A used channel linked list, as generally used herein, may be a linked list data structure that organizes and maintains index values of available shared memory channels that are available for reading data.

It shall be further recognized that, in one or more embodiments, the in-memory channel indices (e.g., the first free channel index 1702, the first used channel index 1704, the last used channel index 1706, etc.) may regulate a utilization of the plurality of shared memory channels 1708 as directed by a plurality of operating system processes executing write operations and a plurality of operating system processes executing read operations based on index values of the first free channel index 1702 and index values of the first used channel index 1704.

Implementing a Channel Synchronization Data Structure

In one or more embodiments, method 1400 may function to implement a channel synchronization data structure within a computing device. A channel synchronization data structure, as generally referred to herein, may be any suitable data structure that is configured to keep track of one or more predetermined channel states via a count or the like. It shall be recognized that a "channel synchronization data structure" may be interchangeably referred to herein as a "channel synchronization mechanism", a "synchronization mechanism", or the like.

In one or more embodiments, a system, service, or computing device implementing method 1400 may function to implement channel synchronization data structure 1710 within the single computer 1504. In such embodiments, the channel synchronization data structure 1710 may be configured to track a count of shared memory channels of the plurality of shared memory channels 1708 that are not assigned to any operating system processes. In other words, the channel synchronization data structure 1710 may be configured to track a count of shared memory channels of the plurality of shared memory channels 1708 that are free (e.g., available to have data written to them).

Additionally, or alternatively, in one or more embodiments, the channel synchronization data structure 1710 may be configured to track a count of shared memory channels of the plurality of shared memory channels 1708 that are assigned to a given operating system process executing write operations but not assigned to a given operating system process executing read operations. In other words, the channel synchronization data structure 1710 may be configured to track a count of shared memory channels of the plurality of shared memory channels 1708 that are not free (e.g., not available to have data written to them).

It shall be recognized that, in one or more embodiments, the channel synchronization data structure 1710 may function to control an acquisition of one or more of the plurality of shared memory channels 1708 by a plurality of operating system processes executing write operations and a plurality of operating system processes executing read operations, as described in more detail herein.

At least one technical advantage of the multiple-producer/multiple-consumer queue embodiment illustrated in FIG. 17 includes the ability to write a data block to more than one cell of a cross-process queue of a target shared memory channel when the length of the data block (e.g., ten (10) kilobytes) exceeds the predetermined maximum cell size (e.g., one (1) kilobyte) of each cell of the cross-process queue of the target shared memory channel, as described in more detail herein.

A non-limiting example of using the above-described embodiments and software-based components will now be described.

In one or more embodiments, a computing device (e.g., single computer 1504 or the like) may need to concurrently transfer a plurality of distinct data blocks between multiple operating system processes running on the computing device. For instance, in a non-limiting example, the computing device may need to transfer a first data block between a first pair of operating system processes and a second data block between a second pair of operating system processes.

The first pair of operating system processes, in one or more embodiments, may include a first operating system process requesting to execute a first write operation and a second operating system process requesting to execute a first read operation. The second pair of operating system processes, in one or more embodiments, may include a third operating system process requesting to execute a second write operation and a fourth operating system process requesting to execute a second read operation.

In one or more embodiments, before executing the first operating system process requesting to execute the first write operation and the third operating system process requesting to execute the second write operation, the computing device may use the channel synchronization data structure 1710 to regulate or govern when the first operating system process and the third operating system process have access to one or more of the plurality of shared memory channels 1708. For instance, in a non-limiting example, when the count of shared memory channels of the plurality of shared memory channels 1708 not assigned to any operating system process is greater than zero, the channel synchronization data structure 1710 may allow an acquisition of a given shared memory channel of the plurality of shared memory channels 1708 (e.g., index of shared memory channels or the like) by the first operating system process. In another non-limiting example, when the count of shared memory channels of the plurality of shared memory channels 1708 not assigned to any operating system process is greater than zero, the channel synchronization data structure 1710 may allow an acquisition of a given shared memory channel of the plurality of shared memory channels 1708 (e.g., index of shared memory channels or the like) by the third operating system process.

Conversely, in one or more embodiments, when the count of shared memory channels of the plurality of shared memory channels 1708 not assigned to any operating system process is zero, the channel synchronization data structure 1710 may disallow an acquisition of a given shared memory channel of the plurality of shared memory channels 1708 (e.g., index of shared memory channels or the like) by the first operating system process. Similarly, when the count of shared memory channels of the plurality of shared memory channels 1708 not assigned to any operating system process is zero, the channel synchronization data structure 1710 may disallow an acquisition of a given shared memory channel of the plurality of shared memory channels 1708 (e.g., index of shared memory channels or the like) by the third operating system process.

Accordingly, in one or more embodiments, the computing device may function to assign an index value (or memory address) of a shared memory channel of the plurality of shared memory channels 1708 to the first operating system process when the count of shared memory channels of the plurality of shared memory channels 1708 not assigned to any operating system process is greater than zero. Similarly, in one or more embodiments, the computing device may function to assign an index value (or memory address) of a shared memory channel of the plurality of shared memory channels 1708 to the third operating system process when the count of shared memory channels of the plurality of shared memory channels 1708 not assigned to any operating system process is greater than zero.

It shall be noted that, in one or more embodiments, the index value (or memory address) assigned to the first operating system process may correspond to the first available channel of the plurality of shared memory channels 1708 that is available for writing at the time the first operating system process was created or executed. Similarly, in one or more embodiments, the index value (or memory address) assigned to the third operating system process may correspond to the first available channel of the plurality of shared memory channels 1708 that is available for writing at the time the third operating system process was created or executed.

For instance, in a non-limiting example, the index value (or memory address) assigned to the first operating system process may correspond to the first shared memory channel of the plurality of shared memory channels 1708 and the index value (or memory address) assigned to the third operating system process may correspond to the third shared memory channel of the plurality of shared memory channels 1708. In such a non-limiting example, the first operating system process may function to write a data block to the cross-process queue of the first shared memory channel and the third operating system process may function to write a data block to the cross-process queue of the third shared memory channel, as shown generally by way of example in FIG. 17.

It shall be noted, in one or more embodiments, assigning an index value of a target shared memory channel to a subject operating system process may include removing the index value that corresponds to the target shard memory channel from an array of index values of shared memory channels that are available for writing (e.g., the free channel linked list, etc.) and inserting the index value at the end of an array of index values of shared memory channels that are available for reading (e.g., the used channel linked list or the like) at a completion of the write operation associated with the subject operating system process, as shown generally by way of example in FIG. 21A.

It shall be further noted that, in one or more embodiments, the computing device may have a data structure (e.g., a list or any other suitable data structure) of shared memory channels that have been assigned to a given operating system process executing a write operation (e.g., a writer, a producer, etc.), but not yet assigned to a given operating system process executing a read operation. Thus, when a given operating system process requesting to execute a read operation is identified by the computing device, the computing device may function to assign the given operating system process to one of the shared memory channels within the data structure. For instance, with continued reference to the above non-limiting example, the computing device may function to identify a second operating system process requesting to read data and, in turn, the computing device may function to assign the second operating system process to the first shared memory channel of the plurality of shared memory channels 1708. In another non-limiting example, the computing device may function to identify a fourth operating system process requesting to read data and, in turn, the computing device may function to assign the fourth operating system process to the third shared memory channel of the plurality of shared memory channels 1708.

Accordingly, with continued reference to the above non-limiting example, the second operating system process may function to read the data block stored within the cross-process queue of the first shared memory channel after the first operating system process writes the data block to the cross-process queue of the first shared memory channel. Similarly, in one or more embodiments, the fourth operating system process may function to read the data block stored within the cross-process queue of the third shared memory channel after the third operating system process writes the data block to the cross-process queue associated with the third shared memory channel.

It shall be recognized that, in one or more embodiments, assigning an index value of a target shared memory channel to a subject operating system process executing a read operation may include removing the index value that corresponds to the target shard memory channel from a front of an array of index values of shared memory channels that are available for reading (e.g., the front of the used channel linked list or the like) and inserting the index value at the start of an array of index values of shared memory channels that are available for writing (e.g., the free channel linked list or the like) at a completion of the read operation associated with the subject operating system process, as shown generally by way of example in FIG. 21B.

It shall be further recognized that, in one or more multiple-producer/multiple-consumer embodiments, shared memory channels may not be necessary if each distinct data block of a plurality of data blocks needed to be transferred between a target pair of operating system processes is less than or equal to the maximum cell size of each cell of a cross-process queue, to which the plurality of data blocks will be written. In other words, shared memory channels may not be needed to facilitate multiple operating system processes reading and writing from the cross-process queue if each distinct data block is able to be entirely written into its own respective cell.

In such embodiments, to facilitate multiple operating system processes reading and writing from the cross-process queue at the same time, single computer 1504 may function to implement cell synchronization data structure 1612 in analogous ways described above. Furthermore, in such embodiments, single computer 1504 may function to implement a plurality of cells (e.g., series of cells or the like) of fixed size within shared memory 1506 of the single computer 1504.

Accordingly, in one or more embodiments, to manage a utilization of the plurality of cells, single computer 1504 may function to use a free cell list that tracks which cells of the plurality of cells are free (e.g., available for writing) and a used cell list that tracks which cells of the plurality of cells are not free (e.g., available for reading). Thus, using the free cell list and the used cell list, multiple producer processes (e.g., operating system processes executing write operations) may write data to one or more cells of the plurality of cells and multiple consumer processes (e.g., operating system processes executing read operations) may read data from one or more cells of the plurality of cells at the same time.

Method for Writing and Reading Variable Length Data

FIG. 22 illustrates one embodiment of a method 2200 for writing and reading variable length data. It will be appreciated that other embodiments contemplated within the scope of the present disclosure may involve more operations, fewer operations, different operations, or a different order of operations than as shown in FIG. 22.

In one or more embodiments, a data block having an unknown maximum length may need to be written to and read from a cross-process queue. This scenario may arise when dealing with variable-length data, such as when transferring data associated with text documents, video streams, audio streams, or any other type of content where the maximum size or maximum length may not be known at the time of a data transfer. Accordingly, as described in more detail herein, a system, service, or computing device may use method 2200 to transfer a data block having a variable length between at least two distinct operating system processes running on a single computer.

Identifying a Write Operation Request

In one or more embodiments, method 2200 may include process 2210. Process 2210, which includes identifying a write operation request, may function to identify a request, by a write operation process, to write a data block having variable length to a cross-process queue. That is, in such embodiments, the full length or full size of the data block may not be known at the time of initiation of the write operation request. It shall be recognized that a "data block" may be interchangeably referred to herein as a "message", a "chunk of data", or the like.

Figure 23:
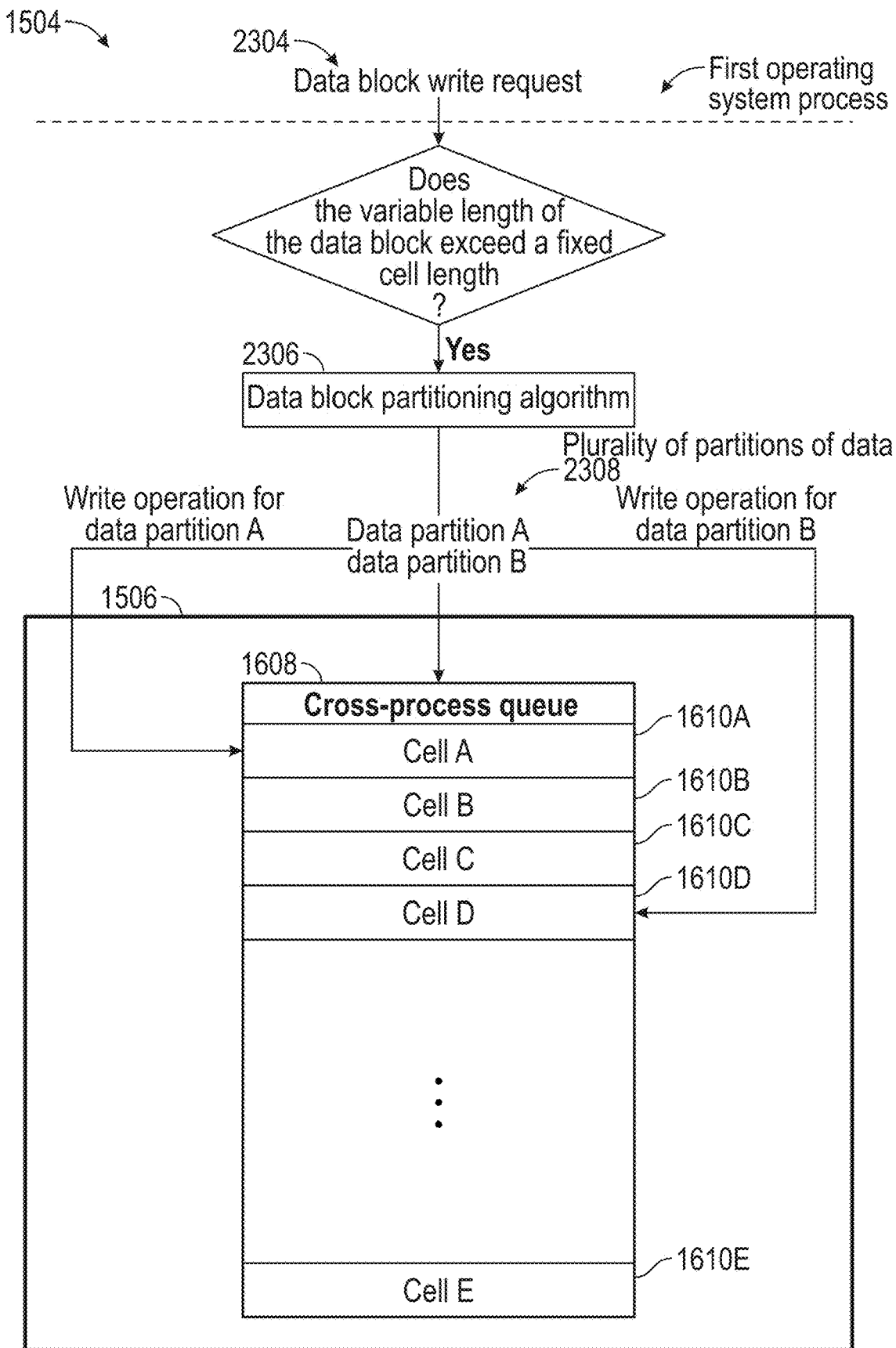
FIG. 23 illustrates an example schematic of partitioning an oversized data block and writing the oversized data block to a cross-process queue, according to some embodiments of the present technology.

Turning to FIG. 23, in one or more embodiments, a computing device (e.g., single computer 1504 or the like) may function to identify a data block write request 2304 from a computer process running on the computing device. In such embodiments, the data block write request 2304 may specify a data block that needs to be written to a cross-process queue so that a downstream computer process may retrieve and use the data block for one or more downstream operations.

For instance, in a non-limiting example, a first operating system process may function as a data layer to obtain data (e.g., a data block or the like) and write the data to a cross-process queue, and in turn, a second operating system process may read the data from the cross-process queue and perform one or more computations with the data.

In another non-limiting example, process 2210 may function to identify a request, by a write operation process of an operating system process, to write a data block having a variable length to a cross-process queue.

In another non-limiting example, process 2210 may function to identify a request, by a write operation process of an analytical compute process, to write a data block having a dynamically changing maximum length to a cross-process queue.

It shall be recognized that the data (e.g., data block or the like), in one or more embodiments, may be textual data associated with a text document, audio data associated with an audio file, video data associated with a video file, streaming data associated with a live broadcast, real-time translation data from a microphone, or any other type of data.

It shall be further recognized that, in one or more embodiments, the cross-process queue may be substantially similar to the cross-process queue 1608 described in method 1400. As described above, in one or more embodiments, the cross-process queue 1608 may be created in-memory of a computing device (e.g., the single computer 1504) and include the plurality of cells 1610. In such embodiments, each cell of the plurality of cells 1610 may have a fixed length (e.g., sub-process 2210A), such as four (4) kilobytes, and may be assigned a distinct cell index value (e.g., sub-process 2210B).

In one or more embodiments, the single computer 1504 may use the cross-process queue 1608 to transfer a given data block between a plurality of analytical compute processes running on the single computer 1504. In such embodiments, the cross-process queue 1608 may be located in random access memory of the single computer 1504. At least one technical benefit of implementing cross-process queue 1608 within random access memory of the single computer 1504 may ensure that each of the plurality of analytical compute processes running on the single computer 1504 has access to cross-process queue 1608.

Figure 19:
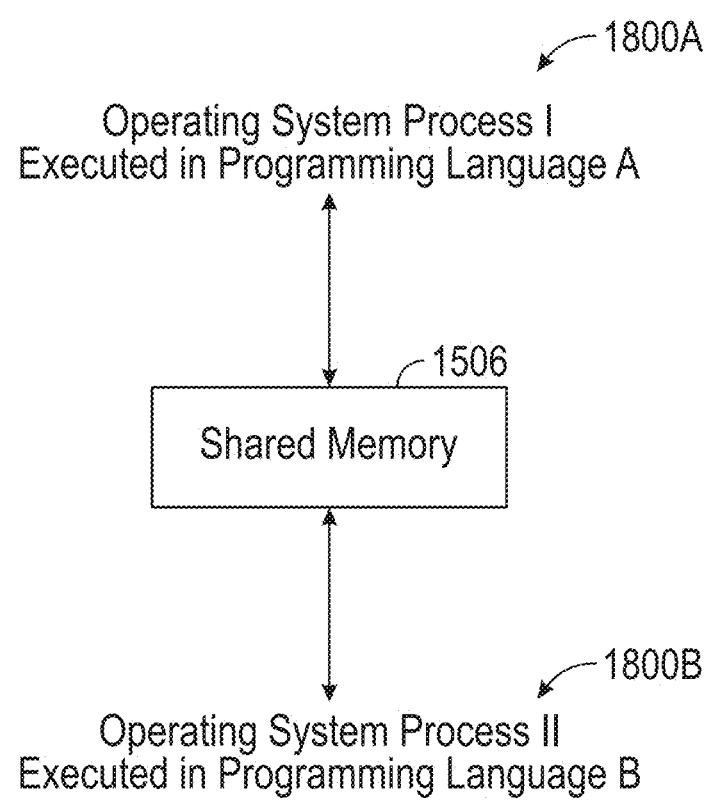
FIG. 19 illustrates an example schematic of using shared memory to transfer data blocks between multiple operating system processes executed in different programming languages, according to some embodiments of the present technology.

It shall be recognized, in one or more embodiments, the plurality of analytical compute processes may be executed in different computer languages (e.g., one of the plurality of analytical compute process may be executed in C++, while another one of the plurality analytical compute processes may be executed in Python, etc.), as shown generally by way of example in FIG. 19. It shall be further recognized, in one or more alternative embodiments, each of the plurality of analytical compute processes may be executed in the same computer language (e.g., each of the plurality of analytical compute process may be executed in Python, etc.).

Data Block Length-to-Cell Length Assessment

In one or more embodiments, method 2200 may include process 2220. Process 2220, which includes assessing a length of a subject data block, may function to assess if the length of a subject data block exceeds a fixed length of one or more cells of a target cross-process queue.

In one or more embodiments, a data block that needs to be written to cross-process queue 1608 may exceed a predetermined maximum fixed length of the plurality of cells 1610. For instance, in one or more embodiments, cross-process queue 1608 may receive a data block from a first operating system process (e.g., a first analytical compute process) and, in turn, the cross-process queue 1608 may identify or determine that the length of the data block exceeds the predetermined maximum fixed length of each cell of the plurality of cells 1610 of cross-process queue 1608. It shall be recognized, in one or more embodiments, all cells within cross-process queue 1608 may have the same fixed length.

In such embodiments, when cross-process queue 1608 identifies that the length of a given data block exceeds the predetermined maximum fixed length of each cell of the plurality of cells 1610 of cross-process queue 1608, a system, service, or computing device implementing method 2200 may function to perform one or more data block processing operations to enable the given data block or a representation of the given data block to be written to cross-process queue 1608. In other words, in one or more embodiments, when cross-process queue 1608 identifies an oversized data block, a system, service, or computing device implementing method 2200 may function to perform one or more data block processing operations to enable the oversized data block to be written to one or more cells of the plurality of cells 1610 of the cross-process queue 1608.

Partitioning a Data Block

In one or more embodiments, method 2200 may include process 2230. Process 2230, which includes partitioning a given data block, may function to partition a data block associated with a subject write operation process of a subject operating system process. In one or more embodiments, process 2230 may function to use a data block partitioning algorithm 2306 to partition or segment a data block into a plurality of partitions of data 2308. It shall be recognized that a "data block partitioning algorithm" may be interchangeably referred to herein as a "data block segmentation algorithm", a "data block splitting algorithm", or the like.

In one or more embodiments, data block partitioning algorithm 2306 may function to receive a data block that has a length greater than the predetermined maximum length of each cell of a plurality of cells of a target cross-process queue. In such embodiments, data block partitioning algorithm 2306 may function to partition (e.g., split, divide, etc.) the data block into multiple smaller segments or partitions. At least one technical advantage of partitioning an oversized data block into multiple smaller data segments ensures that each respective data segment is equal to or less than the predetermined maximum length of each cell of the plurality of cells of the target cross-process queue. In other words, each respective data segment outputted by data block partitioning algorithm 2306 may be written to a distinct cell of the plurality of cells of the target cross-process queue without encountering a cell overflow exception (e.g., buffer overflow exception, cell capacity exception, or the like).

For instance, in a non-limiting example, when a data block associated with data block write request 2304 exceeds a predetermined maximum fixed length of the plurality of cells 1610 of the cross-process queue 1608, the data block may be provided, as input, to the data block partitioning algorithm 2306. In such embodiments, data block partitioning algorithm 2306 may function to partition the data block into a plurality of partitions of data 2308, such as data partition "A" and data partition "B", as shown generally by way of example in FIG. 23. It shall be recognized, in one or more embodiments, each respective partition of data (e.g., data partition "A", data partition "B") of the plurality of partitions of data 2308 does not exceed the predetermined maximum fixed cell length of each cell of the plurality of cells 1610 of the cross-process queue 1608.

Cell Index Assignment

In one or more embodiments, method 2200 may include process 2240. Process 2240, which includes cell index assignment, may function to assign a distinct cell index value to each respective partition of data outputted by data block partitioning algorithm 2306. In one or more embodiments, process 2240 may function to assign, to a distinct partition of data, a distinct cell index value corresponding to a free cell (e.g., a cell available for writing) within the plurality of cells 1610 of the cross-process queue 1608.

For instance, with continued reference to the above non-limiting example, data block partitioning algorithm 2306 may function to output a plurality of partitions of data 2308 including, but not limited to, data partition "A" and data partition "B", as shown generally by way of example in FIG. 23. In such a non-limiting example, process 2240 may function to asynchronously assign cell index values to the plurality of partitions of data 2308. For instance, in one or more embodiments, process 2240 may function to assign, to data partition "A", a cell index value of zero (0) corresponding to cell "A" 1610A of the plurality of cells 1610 of the cross-process queue 1608 as cell "A" 1610A is available for writing. Additionally, in such a non-limiting example, process 2240 may function to assign, to data partition "B", a cell index value of three (3) corresponding to cell "D" 1610D of the plurality of cells 1610 of the cross-process queue 1608 as cell "D" 1610D is available for writing.

It shall be recognized that, in one or more embodiments, process 2240 may function to synchronously assign cell index values to the plurality of partitions of data 2308. For instance, in one or more embodiments, process 2240 may function to assign, to data partition "A", a cell index value of zero (0) corresponding to cell "A" 1610A of the plurality of cells 1610 of the cross-process queue 1608 as cell "A" 1610A is available for writing. Additionally, in such a non-limiting example, process 2240 may function to assign, to data partition "B", a cell index value of one (1) corresponding to cell "B" 1610B of the plurality of cells 1610 of the cross-process queue 1608 as cell "B" 1610B is available for writing.

Data Block Writing

In one or more embodiments, method 2200 may include process 2250. Process 2250, which includes data block writing, may function to write each respective partition of data of the plurality of partitions of data 2308 to a respective cell based on the distinct cell index value assigned to the respective partition of data.

It shall be recognized that, in one or more embodiments, process 2250 may function to write multiple data blocks to cross-process queue 1608 in a variety of modes. For instance, in one or more embodiments, process 2250 may function to sequentially write multiple data blocks to cross-process queue 1608. Additionally, or alternatively, in one or more embodiments, process 2250 may function to concurrently write multiple data blocks to cross-process queue 1608.

In one or more embodiments, process 2240 may have assigned a cell index value to one of the plurality of partitions of data 2308 and, in turn, process 2250 may function to write the one of the plurality of partitions of data 2308 to the cell that corresponds to the cell index value. For instance, in a non-limiting example, process 2240 may have assigned a cell index value of zero (0) to data partition "A" and, in turn, process 2250 may function to write data partition "A" to cell "A" 1610A of the plurality of cells 1610 of the cross-process queue 1608. Additionally, or alternatively, in such a non-limiting example, process 2240 may have assigned a cell index value of three (3) to data partition "B" and, in turn, process 2250 may function to write data partition "B" to cell "D" 1610D of the plurality of cells 1610 of the cross-process queue 1608.

Stated differently, in one or more embodiments, an operating system process requesting to write a data block (e.g., a data stream or the like) may be assigned to a free shared memory channel (e.g., a shared memory channel available for writing) of the plurality of shared memory channels 1708, as shown generally by way of example in FIG. 17. In such embodiments, a length of the data block may exceed the predetermined maximum length of each cell of the cross-process queue of the free shared memory channel. Thus, in one or more embodiments, the data block may be partitioned into a plurality of data block segments that do not exceed the predetermined maximum length of each cell of the cross-process queue of the free shared memory channel. Accordingly, in such embodiments, each respective data block segment may be written to a respective cell within the cross-process queue of the free shared memory channel based on a cell index value assigned to the respective data block segment.

In one or more embodiments, when the maximum length of a subject data block to be written to the cross-process queue 1608 is unknown at the time of writing the subject data block to the cross-process queue 1608 such as in streaming scenarios, process 2250 may function to generate a command signal to the cross-process queue 1608 that identifies a start of a streaming data block. Furthermore, in such embodiments, when the write operation of the streaming data block is complete, process 2250 may function to generate a command signal to the cross-process queue 1608 that identifies an end of the subject data block.

It shall be recognized, in one or more embodiments, writing a data block (e.g., video frame, etc.) to a target cross-process queue may require multiple sub-transfers of data. In such embodiments, a distinct consumer process and a distinct producer process may be paired to a respective shared memory channel for only the duration of a given sub-transfer. Accordingly, after a data transfer of a respective sub-transfer of data is complete, the corresponding shared memory channel may be added to the free channel linked list in analogous ways as described above. In other words, in such embodiments, for each distinct sub-transfer of data, the process of obtaining a free shared memory channel from a free channel linked list and allocating the free shared memory channel to a respective producer process (e.g., operating system process executing a write operation) and consumer process (e.g., operating system process executing a read operation) may be required.

In one or more alternative embodiments, a respective consumer process and a respective producer process may be assigned or allocated to a respective shared memory channel for the entire transfer of the data block (e.g., all sub-transfers). In other words, in such embodiments, a persistent connection may be made between a respective producer process, a respective consumer process, and a respective shared memory channel for the entire set of sub-transfers (e.g., not requiring the above-mentioned process of obtaining a free shared memory channel and allocating the free shared memory channel to a corresponding producer process and a corresponding consumer process for each distinct sub-transfer of data). Accordingly, in such embodiments, persistence may be maintained by not returning the respective shared memory channel to the free channel linked list between sub-transfers of data (e.g., the same shared memory channel may be used for all sub-transfers).

It shall be recognized, in one or more embodiments, if a data block being written to a target cross-process queue via a subject write operation process exceeds an available memory of the target cross-process queue, the subject write operation process may be returned to a wait queue of an operating system until the necessary memory becomes available within the target cross-process queue. In other words, in one or more embodiments, when a data block exceeds the available memory of the target cross-process queue, the subject write operation process may be returned to the wait queue of the operating system until a wait condition is satisfied.

Additionally, or alternatively, in one or more embodiments, when the length or size of a subject data block exceeds a memory available in a target cross-process queue, the computing device may assign an additional cross-process queue (e.g., an auxiliary cross-process queue) to a write operation process associated with the subject data block. In such embodiments, the write operation process may function to write a majority of the data block to the target cross-process queue, while the remaining portions of the data block that exceeds the memory available of the target cross-process queue may be written to the additional cross-process queue.

Additionally, or alternatively, in one or more embodiments, data block write request 2304 may be requesting to write a data block having a length of three (3) kilobytes to a target cross-process queue of a respective shared memory channel. The target cross-process queue of the respective shared memory channel, in such embodiments, may have a predetermined maximum cell size of one (1) kilobyte. In other words, each cell of the target cross-process queue associated with the respective shared memory channel may have a length of one (1) kilobyte (e.g., the maximum amount of data that may be stored within any given cell of the target cross-process queue is one (1) kilobyte).

Therefore, in such embodiments, upon receiving data block write request 2304, data block write request 2304 may function to write the data block to the target cross-process queue in chunks (e.g., one (1) kilobyte data chunks). For instance, in a non-limiting example, data block write request 2304 may request a free cell of the target cross-process queue that is available for writing, and, in turn, data block write request 2304 may write a first data chunk (e.g., a first one kilobyte data chunk) of the data block to the free cell returned from the request in analogous ways as described herein. Subsequently, in such a non-limiting example, data block write request 2304 may request another free cell of the target cross-process queue that is available for writing, and, in turn, data block write request 2304 may write a second data chunk (e.g., a second one kilobyte data chunk) of the data block to the free cell returned from the request. Furthermore, in such a non-limiting example, data block write request 2304 may request another free cell of the target cross-process queue that is available for writing, and, in turn, data block write request 2304 may write a third data chunk (e.g., a third one kilobyte data chunk) of the data block to the free cell returned from the request. In other words, the data block may be iteratively written to the target cross-process queue by iteratively requesting free cells and writing the maximum amount of data to each respective free cell until the entire data block is transferred.

It shall be noted that, in one or more embodiments, during the process of requesting a free cell, a wait may be initiated when a free cell is not available in analogous was as described above.

Data Block Reading

Additionally, in one or more embodiments, method 2200 may further include identifying a read operation request. The read operation request, in one or more embodiments, may not be identified at the same time as the write operation request described in process 2210. That is, in one or more embodiments, the read operation request may be identified or detected after the write operation request.

In one or more embodiments, based on identifying a read operation request, the computing device (e.g., single computer 1504) may function to pair or assign the read operation request to one of the plurality of shared memory channels 1708 that is currently only assigned to an operating system process executing or scheduled to execute a write operation (e.g., a producer process or the like). In such embodiments, the computing device may have a data structure, such as a list or the like, that includes all the shared memory channels of the plurality of shared memory channels 1708 only assigned to a given operating system process scheduled to write a respective data block or actively writing the respective data block to a respective shared memory channel. Accordingly, in such embodiments, based on receiving a read operation request, the computing device may use the data structure to pair the read operation request to one of the shared memory channels within the data structure currently only assigned to a write operation request. Thus, upon paring or assigning the read operation request to the one of the shared memory channels within the data structure, the one of the shared memory channels may be assigned to both a producer process (e.g., write operation request) and a consumer process (e.g., read operation request).

It shall be recognized, in one or more embodiments, in response to assigning or pairing a given operating system process requesting to execute a read operation to a given shared memory channel, the given operating system process may function to execute one or more read operations to retrieve data from the given shared memory channel.

Figure 24:
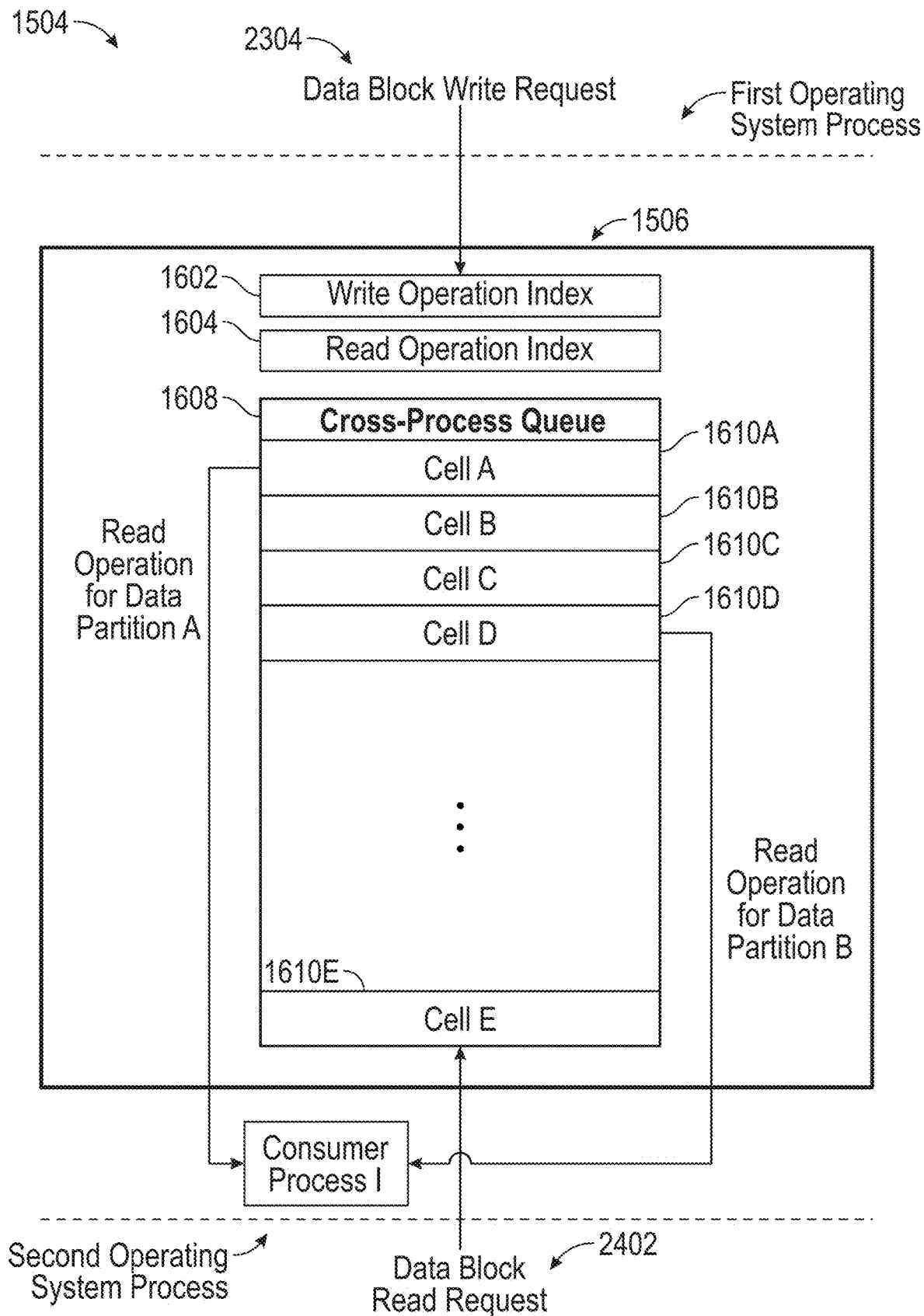
FIG. 24 illustrates an example schematic of reading multiple data blocks written to multiple cells of a cross-process queue, according to some embodiments of the present technology.

Turning to FIG. 24, in one or more embodiments, the computing device may function to receive data block read request 2402 and, in turn, data block read request 2402 may be assigned to a shared memory channel that corresponds to cross-process queue 1608. Stated another way, in one or more embodiments, the computing device may function to identify a request to read the data block associated with data block write request 2304 from cross-process queue 1608. The request to read the data block, in one or more embodiments, may be made by a read operation process of a second analytical compute process or the like. Accordingly, in response to identifying the request to read the data block associated with data block write request 2304 from cross-process queue 1608, the read operation process may function to execute a plurality of read operations for reading the data block from the plurality of cells 1610 of the cross-process queue 1608.

In a non-limiting example, the read operation process may function to execute a distinct read operation for each respective cell of the plurality of cells 1610 of cross-process queue 1608 that stores a distinct partition of data of the data block associated with data block write request 2304. As described in the above non-limiting example, the data block may be divided into two partitions of data, where the first partition of data (e.g., data partition "A") of the data block was written to cell "A" 1610A and the second partition of data (e.g., data partition "B") of the data block was written to cell "D" 1610D. Accordingly, in such a non-limiting example, the read operation process may function to execute a distinct read operation for data partition "A" stored in cell "A" 1610A and a distinct read operation for data partition "B" stored in cell "D" 1610D.

In another non-limiting example, a system, service, or computing device implementing method 2200 may function to identify a sequence of distinct cell index values for the plurality of partitions of data 2308 based on the distinct cell index values assigned to each respective partition of data of the plurality of partitions of data 2308. The sequence of distinct cell index values, in one or more embodiments, may define a sequential ordering of the plurality of partitions of data 2308 that matches or corresponds to an original data structure of the data block associated with data block write request 2304. Accordingly, in one or more embodiments, in response to identifying the request to read the data block associated with data block write request 2304 from cross-process queue 1608, the read operation process may function to execute a plurality of read operations in a predetermined order based on the sequence of distinct cell index values to ensure that data is retrieved or read from cross-process 1608 in a manner that mirrors or matches the original structure of the data block.

Figure 25:
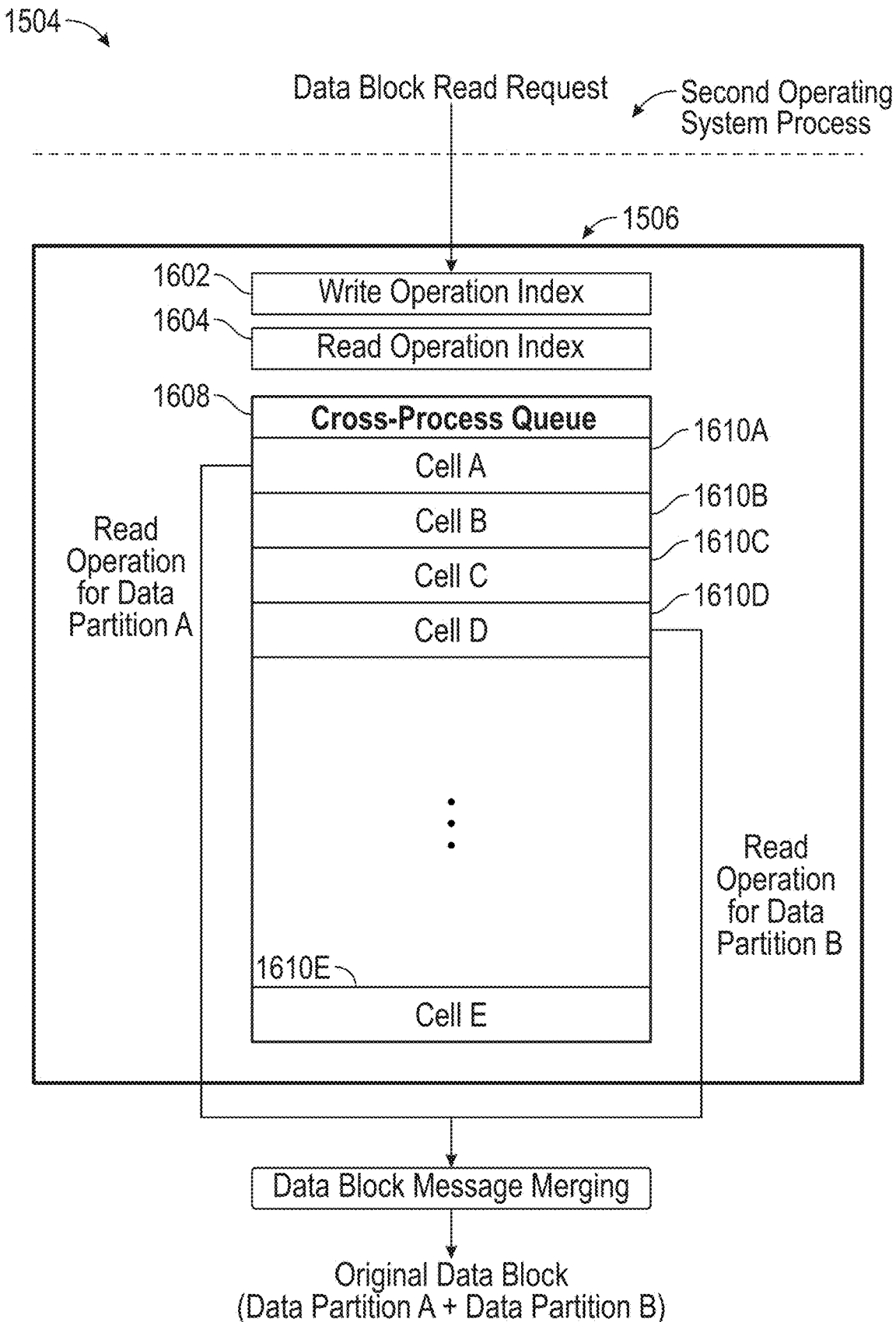
FIG. 25 illustrates an example schematic of merging multiple data blocks written to multiple cells of a cross-process queue, according to some embodiments of the present technology.

Stated another way, in one or more embodiments, in response to identifying a request to read the data block associated with data block write request 2304 from cross-process queue 1608, a system, service, or computing device implementing method 2200 may function to reassemble the plurality of partitions of data 2308 based on the sequence of distinct cell index values. For instance, in a non-limiting example reassembling the plurality of partitions of data 2308 may include merging the plurality of partitions of data 2308 to a merged data block that matches or is equivalent to the original data structure of the data block, as shown generally by way of example in FIG. 25.

It shall be further recognized, in one or more embodiments, reassembling the plurality of partitions of data 2308 may further include a system, service, or computing device implementing method 2200 setting, at a time of executing the read operation process, the plurality of cells storing the plurality of partitions of data 2308 in a predetermined order based on the sequence of distinct cell index values. Accordingly, in such embodiments, the system, service, or computing device may function to merge the plurality of partitions of data 2308 into a single data block that corresponds to, matches, or is equivalent to an original structure of the data block associated with data block write request 2304 by executing a plurality of read operations in accordance with the predetermined order.

Method for Data Block Translation

FIG. 26 illustrates one embodiment of a method 2600 for converting a data block encoded in a data structure of a first computer language to a data block encoded in a corresponding data structure of a second computer language. It will be appreciated that other embodiments contemplated within the scope of the present disclosure may involve more operations, fewer operations, different operations, or a different order of operations than as shown in FIG. 26.

Implementing a Cross-Process Queue

In one or more embodiments, method 2600 may include process 2610. Process 2610, which includes implementing a cross-process queue, may function to implement a cross-process queue within a single computer. In one or more embodiments, process 2610 may use the same or similar techniques for implementing a cross-process queue as described in method 1400.

In one or more embodiments, process 2610 may function to implement cross-process queue 1608 within a computing device (e.g., single computer 1504). The cross-process queue 1608, in one or more embodiments, may enable a transfer of data between a first operating system process and a second operating system process.

In such embodiments, the first operating system process may have been created by executing a computer program written in a first computer language (e.g., C++) and the second operating system process may have been created by executing a computer program written in a second computer language (e.g., Python). It shall be recognized that, in some embodiments, the computer program for the first operating system process and the computer program for the second operating system process may be executed in the same computer language without departing from the scope of the disclosure.

Stated another way, in one or more embodiments, a computing device implementing method 2600 may function to transfer a data block among a plurality of distinct operating system processes, irrespective of whether one or multiple computer languages are involved.

In a non-limiting example, when a data block associated with a data stream is being written, by a first operating system process, to the cross-process queue 1608, a second operating system process may be paired with the first operating system process and configured to read from the cross-process queue 1608 until the transfer of the data block is complete. In such a non-limiting example, the data block may require multiple sub-transfers to write the entire data block to cross-process queue 1608. Thus, in one or more embodiments, the first operating system process may function to iteratively execute a plurality of distinct write operations that each write a distinct data segment of the data block to the cross-process 1608, while the second operating system process may function to iteratively execute a plurality of distinct read operations from the cross-process queue 1608 to obtain all data segments. Accordingly, in one or more embodiments, the second operating system process may merge all obtained data segments into a single data block that accurately represents the entirety of the data stream.

In another non-limiting example, an operating system process executing a write operation may function to write a data block to one or more cells of the cross-process queue 1608 and, in turn, an operating system process executing a read operation may function to read the data block from the one or more cells of the cross-process queue 1608 after the write operation is complete.

Receiving a Data Block

In one or more embodiments, method 2600 may include process 2620. Process 2620, which includes receiving a data block, may function to receive, at a target cross-process queue, a data block from an operating system process executing a write operation.

In one or more embodiments, a target cross-process queue may receive a data block based on or in response to a given operating system process executing a write operation that writes the data block to a memory of the target cross-process queue. That is, in one or more embodiments, the data block may be written to a memory area or memory region of the target cross-process queue based on the execution of the write operation process by a first operating system process.

Figure 27:
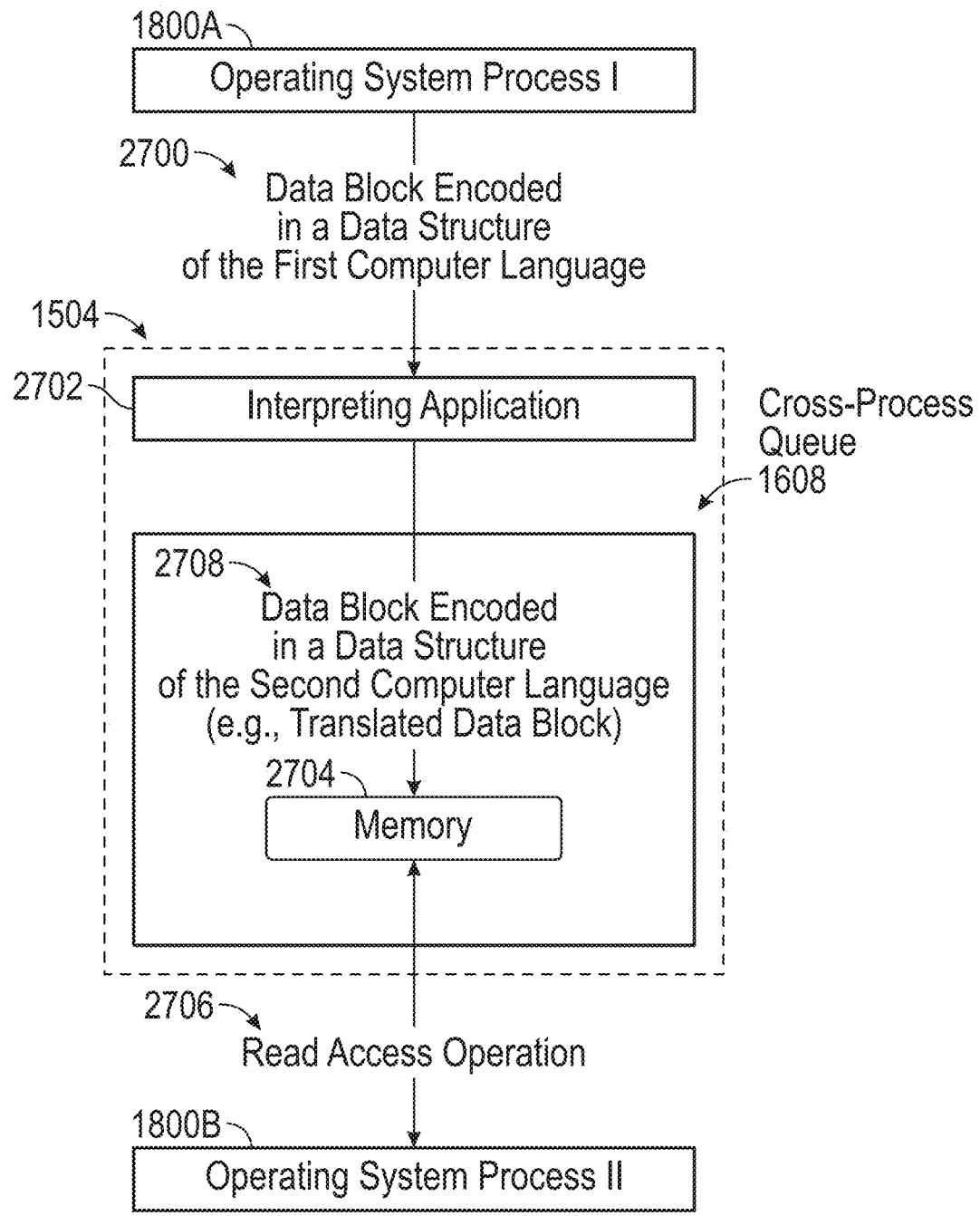
FIG. 27 illustrates an example schematic of using an interpreting application, according to some embodiments of the present technology.

Turning to FIG. 27, in one or more embodiments, operating system process I 1800A (e.g., first operating system process or the like) may function to execute a write operation that writes a data block to memory 2704 of cross-process queue 1608. In such a non-limiting example, the data block may be encoded in a data structure of a first computer language, such as C++. It shall be recognized that the data block may be encoded in any suitable data structure of any suitable computer language without departing from the scope of the disclosure.

In one or more embodiments, memory 2704 may include a plurality of cells of fixed length, such as the plurality of cells 1610. In such embodiments, the plurality of cells of fixed length may be available for reading and writing operations by a plurality of operating system processes assigned to cross-process queue 1608.

Data Block Conversion

In one or more embodiments, method 2600 may include process 2630. Process 2630, which includes converting a data block, may function to convert, by an interpreting application, a data block encoded in a data structure of a first computer language to a translated data block encoded in a data structure of a second computer language. In one or more embodiments, the interpreting application may be extensible to interpreting a given data block encoded in a data structure of a first computer language to a target computer language of a plurality of computer languages based on identifying a computer language of a given operating system process that executes read operations in the target computer language.

It shall be recognized that automatically converting a data block encoded in a data structure of a first computer language to a translated data block encoded in a data structure of a second computer language presents many technical advantages. For instance, when a downstream operating system process or child operating system process requires a data block to be encoded in another computer language for processing or analytics purposes, the interpreting application 2702 may be used to automatically convert the data block to a translated data block that is encoded in a data structure of the computer language required by the downstream operating system process or child operating system process.

Turning to FIG. 27, in one or more embodiments, based on the cross-process queue 1608 receiving the data block encoded in the data structure of the first computer language, interpreting application 2702 may function to automatically convert the data block encoded in the data structure of the first computer language 2700 to a translated data block encoded in a data structure of a second computer language 2708. In such embodiments, the interpreting application 2702 may function to automatically convert one or more data types of the first computer language to one or more corresponding data types of the second computer language.

For instance, in a non-limiting example, interpreting application 2702 may function to receive a data block encoded in C++ doubles and, in turn, interpreting application 2702 may function to output a corresponding data block encoded in Python floats.

In another non-limiting example, interpreting application 2702 may function to receive a data block encoded in C++ long and, in turn, interpreting application 2702 may function to output a corresponding data block encoded in Python integers.

In another non-limiting example, interpreting application 2702 may function to receive a data block encoded in C++ strings and, in turn, interpreting application 2702 may function to output a corresponding data block encoded in Python strings.

In another non-limiting example, interpreting application 2702 may function to receive a data block encoded in a C++ vector and, in turn, interpreting application 2702 may function to output a corresponding data block encoded in a Python NumPy array.

In another non-limiting example, interpreting application 2702 may function to receive a data block encoded in a C++ Apache Arrow data frame and, in turn, interpreting application 2702 may function to output a corresponding data block encoded in a Python Pandas data frame.

Figure 28:
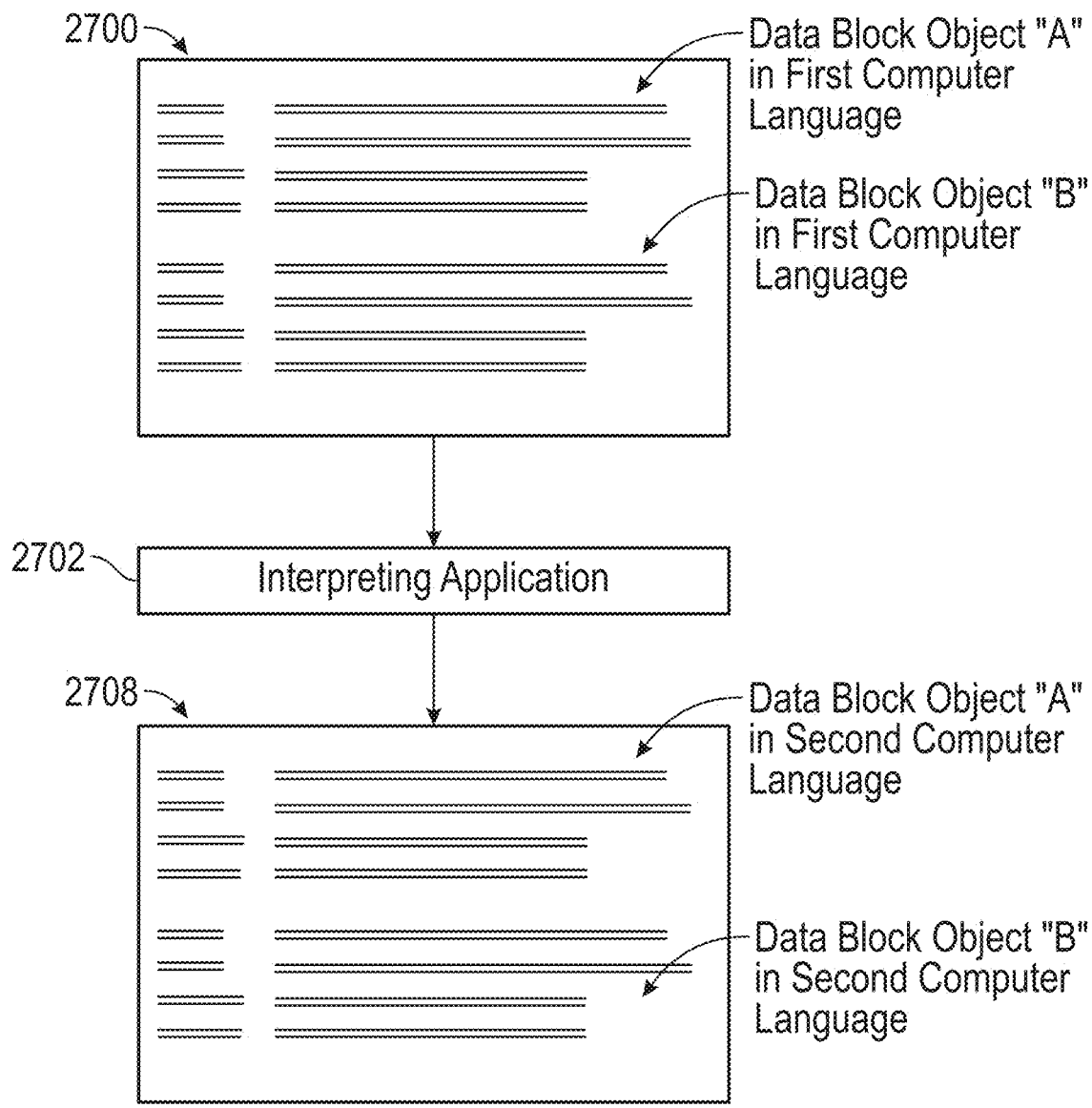
FIG. 28 illustrates an example input and example output of an interpreting application, according to some embodiments of the present technology.

Turning to FIG. 28, in one or more embodiments, based on the cross-process queue 1608 receiving the data block encoded in the data structure of the first computer language 2700, interpreting application 2702 may function to automatically convert the data block encoded in the data structure of the first computer language 2700 to the translated data block encoded in the data structure of the second computer language 2708. In such embodiments, interpreting application 2702 may function to automatically convert one or more objects of the first computer language to one or more corresponding objects of the second computer language.

For instance, in a non-limiting example, interpreting application 2702 may receive the data block encoded in the data structure of the first computer language 2700. The data block encoded in the data structure of the first computer language 2700, in one or more embodiments, may include data block object "A" and data block object "B". Accordingly, in such a non-limiting example, interpreting application 2702 may function to automatically convert both data block objects from their representations in the first computer language to their corresponding representations in the second computer language, as shown generally by way of example in FIG. 28.

It shall be recognized, in one or more embodiments, when an operating system process, such as operating system process II 1800B is paired with operating system process I 1800A, operating system process I 1800A may function to automatically connect to interpreting application 2702 when operating system process I 1800A and operating system process II 1800B were created by executing computer programs written in different computer languages (e.g., operating system process I 1800A is created by executing a computer program written in a first computer language and operating system process II 1800B is created by executing a computer program written in a second computer language). In other words, in one or more embodiments, based on identifying that the computer language associated with operating system process II 1800B is different than the computer language associated with operating system process I 1800A, operating system process I 1800A may function to automatically connect to interpreting application 2702 and convert the data block to a translated data block during the write operation by operating system process I 1800A to memory 2704 of cross-process queue 1608. Thus, when operating system process II 1800B reads the translated data block from cross-process 1608, it is in the expected data format or data type (e.g., the translated data block is encoded in one or more data structures of the second computer language).

It shall be further recognized, in one or more embodiments, interpreting application 2702 may be implemented as a child process of operating system process I 1800A.

Data Block Storing

In one or more embodiments, method 2600 may include process 2640. Process 2640, which includes storing a data block, may function to store, within memory of a target cross-process queue, a translated data block or a representation of the translated data block.

In one or more embodiments, a translated data block (e.g., the data block encoded in the data structure of the second computer language 2708) may be stored within memory 2704 of cross-process queue 1608 in response to writing the translated data block to cross-process queue 1608 in analogous ways described above.

For instance, in a non-limiting example, when the translated data block does not exceed the predetermined maximum fixed length of the plurality of cells 1610 of the cross-process queue 1608, an entirety of the translated data block may be stored within a single cell of the plurality of cells 1610 by writing the translated data block to the single cell.

In another non-limiting example, when the translated data block exceeds the predetermined maximum fixed length of the plurality of cells 1610 of cross-process queue 1608, the translated data block may be partitioned into a plurality of distinct pieces of data that are each less than or equal to the predetermined maximum fixed length of the plurality of cells 1610. In such embodiments, each respective piece of data of the plurality of distinct pieces of data may be stored within a respective cell of the plurality of cells 1610 by writing the respective piece of data to the respective cell. In other words, in one or more embodiments, the translated data block may be stored in more than one cell of the cross-process queue 1608.

It shall be noted, in one or more embodiments, the data (e.g., data block, partition of data, or the like) stored within each cell of the plurality of cells 1610 may be encoded with a respective type safety header that identifies a respective data type of a plurality of predetermined data types of an item of data stored within the respective cell.

It shall be further noted, in one or more embodiments, the data (e.g., data block, partition of data, or the like) stored within respective cell may further be encoded with a respective length of the data, the respective data and/or any other suitable information, as described above.

Enabling a Read Access

In one or more embodiments, method 2600 may include process 2650. Process 2650, which includes enabling a read access, may function to enable a read access to a target translated data block stored within memory of a target cross-process queue.

Turning to FIG. 27, in one or more embodiment, a system, service, or computing device implementing method 2600 may enable or grant operating system process II 1800B read access to the translated data block (e.g., the data block encoded in a data structure of the second computer language 2708). In such embodiments, before operating system process II 1800B reads the translated data block (e.g., the data block encoded in a data structure of the second computer language 2708) from memory 2704 of cross-process queue 1608, the system, service, or computing device implementing method 2600 may function to perform one or more data block validations.

For instance, in one or more embodiments, the system, service, or computing device implementing method 2600 may prohibit an attempted read operation by operating system process II 1800B if the attempted read operation (e.g., read access operation 2706) is attempting to execute a read operation in a data type different than the data type specified by the type safety header for each cell involved in the read operation. For example, if the type safety header of a target cell indicates that the data type of the target cell is of an integer data type, any read operation attempting to read the data from the target cell as a string would be prohibited.

Conversely, in one or more embodiments, the system, service, or computing device implementing method 2600 may allow an attempted read operation (e.g., read access operation 2706) by operating system process II 1800B if the attempted read operation is attempting to execute a read operation in the same data type specified by the type safety header for each cell involved in the read operation. For example, if the type safety header of a target cell indicates that the data type of the target cell is of a string data type, any read operation attempting to read the data from the target cell as a string would be allowed.

In other words, in one or more embodiments, a given type safety header associated with a specific cell may prevent a read operation an item of data stored within that cell if the read operation is attempting to read the data in a data type different from the one identified by the type safety header.

Stated another way, in one or more embodiments, process 2650 may function to detect an attempted read operation for a given piece of data stored within a given cell of the plurality of cells 1610 when the attempted read operation executes or is attempting to execute a read operation in a different data type than a given data type identified by the type safety header that corresponds to the given cell. Accordingly, in such embodiments, process 2650 may function to generate a read exception based on the detection of the attempted read operation and, in turn, automatically transform the given data type of the given piece of data to the different data type based on the read exception.

Additionally, or alternatively, in one or more embodiments, an operating system process executing a write operation process may function to write a data block to a target cross-process queue. The data block, in one or more embodiments, may be encoded in a native form of the computer language (e.g., C++) associated with the operating system process executing the write operation process. In other words, the data block stored within the target cross-process queue may be encoded in C++. It shall be noted that in other embodiments the data block may be encoded in any other suitable computer language.

Accordingly, when an operating system process executing a read operation process attempts to read the data block having a type safety header indicating a data type different from the one expected by the read operation process (e.g., the data is encoded in C++ and the reader operation process in Python), the operating system process executing the read operation process may function to implement, access, or use interpreting application 2702 to convert the data block from its C++ encoded format to a data block compatible with the read operation process, such as a Python-compatible data block. Accordingly, the operating system process executing the read operation process may use the Python-compatible data block in one or more downstream operations.

It shall also be further noted that the system and methods of the embodiment and variations described herein can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as that are offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product embodied in a non-transitory machine-readable storage medium storing computer instructions that, when executed by one or more processors, perform operations comprising:
   implementing a cross-process queue within a single computer that enables a transfer of data between a first operating system process and a second operating system process, wherein:
      the first operating system process is created by executing a computer program written in a first computer language, and the second operating system process is created by executing a computer program written in a second computer language;
   receiving, at the cross-process queue, a data block from the first operating system process based on an execution by the first operating system process of a write operation to a memory of the cross-process queue, wherein the data block is encoded in a data structure of the first computer language;
   implementing a cell synchronization data structure tracking states of a plurality of cells of index of cells of the cross-process queue, wherein the cell synchronization data structure counts cells of the plurality of cells of the index of cells to determine available cells for the write operation and the read operation;
   regulating a utilization of the cross-process queue for the first or second operating system process executing the write operation and read operation based on the count of cells of the index of cells that are available for the write operation and the read operation;
   converting, by an interpreting application, the data block encoded in the data structure of the first computer language to a translated data block encoded in a data structure of the second computer language;
   storing, within the memory of the cross-process queue, the translated data block based on the conversion of the data block; and
   enabling a read access, by the second operating system process, to the translated data block stored within the memory of the cross-process queue.

2. The computer-program product according to claim 1, wherein converting, by the interpreting application, the data block encoded in the data structure of the first computer language includes:
   automatically converting one or more data types of the first computer language to one or more data types of the second computer language based on the receiving, at the cross-process queue, the data block from the first operating system process.

3. The computer-program product according to claim 1, wherein converting, by the interpreting application, the data block encoded in the data structure of the first computer language includes:
   automatically converting one or more objects of the first computer language to one or more objects of the second computer language based on the receiving, at the cross-process queue, the data block from the first operating system process.

4. The computer-program product according to claim 1, wherein the first operating system process based on identifying the second computer language of the second operating system process, automatically connects to the interpreting application enabling the conversion of the data block during the write operation by the first operating system process to the memory of the cross-process queue.

5. The computer-program product according to claim 1, wherein the interpreting application is implemented as a child process of the first operating system process.

6. The computer-program product according to claim 5, wherein the interpreting application is extensible to interpreting a given data block encoded in the data structure of the first computer language to a target computer language of a plurality of computer languages based on identifying a computer language of a given operating system process that executes read operations in the target computer language.

7. The computer-program product according to claim 1, wherein the memory of the cross-process queue comprises:
   a plurality of cells of fixed length that are available for writing data to and available for reading from by each of the first operating system process and the second operating system process.

8. The computer-program product according to claim 7, wherein data stored within each of the plurality of cells of the memory channel is encoded with a respective type safety header identifying a respective data type of a plurality of data types of an item of data stored within a respective cell of the plurality of cells.

9. The computer-program product according to claim 8, wherein a given type safety header a given cell of the plurality of cells prohibits an attempted read operation of a given item of data stored within the given cell when the attempted read operation executes a read operation in a different data type than a data type identified by the given type safety header.

10. The computer-program product according to claim 8, further comprising:
   detecting an attempted read operation of a given data stored within a given cell of the plurality of cells when the attempted read operation executes a read operation in a different data type than a given data type identified by the type safety header;
   generating a read exception based on the detection of the attempted read operation; and
   automatically transforming the given data type of the type safety header of the given data to the different data type based on the read exception.

11. A computer-implemented method comprising:
   implementing a cross-process queue within a single computer that enables a transfer of data between a first operating system process and a second operating system process, wherein:
   the first operating system process is created by executing a computer program written in a first computer language, and the second operating system process is created by executing a computer program written in a second computer language;
   receiving, at the cross-process queue, a data block from the first operating system process based on an execution by the first operating system process of a write operation to a memory of the cross-process queue, wherein the data block is encoded in a data structure of the first computer language;
   implementing a cell synchronization data structure tracking states of a plurality of cells of index of cells of the cross-process queue, wherein the cell synchronization data structure counts cells of the plurality of cells of the index of cells to determine available cells for the write operation and the read operation;
   regulating a utilization of the cross-process queue for the first or second operating system process executing the write operation and read operation based on the count of cells of the index of cells that are available for the write operation and the read operation;
   converting, by an interpreting application, the data block encoded in the data structure of the first computer language to a translated data block encoded in a data structure of the second computer language;
   storing, within the memory of the cross-process queue, the translated data block based on the conversion of the data block; and
   enabling a read access, by the second operating system process, to the translated data block stored within the memory of the cross-process queue.

12. The computer-implemented method according to claim 11, wherein converting, by the interpreting application, the data block encoded in the data structure of the first computer language includes:
   automatically converting one or more data types of the first computer language to one or more data types of the second computer language based on the receiving, at the cross-process queue, the data block from the first operating system process.

13. The computer-implemented method according to claim 11, wherein converting, by the interpreting application, the data block encoded in the data structure of the first computer language includes:
   automatically converting one or more objects of the first computer language to one or more objects of the second computer language based on the receiving, at the cross-process queue, the data block from the first operating system process.

14. The computer-implemented method according to claim 11, wherein the first operating system process based on identifying the second computer language of the second operating system process, automatically connects to the interpreting application enabling the conversion of the data block during the write operation by the first operating system process to the memory of the cross-process queue.

15. The computer-implemented method according to claim 11, wherein the interpreting application is implemented as a child process of the first operating system process.

16. The computer-implemented method according to claim 15, wherein the interpreting application is extensible to interpreting a given data block encoded in the data structure of the first computer language to a target computer language of a plurality of computer languages based on identifying a computer language of a given operating system process that executes read operations in the target computer language.

17. The computer-implemented method according to claim 11, wherein the memory of the cross-process queue comprises:
   a plurality of cells of fixed length that are available for writing data to and available for reading from by each of the first operating system process and the second operating system process.

18. The computer-implemented method according to claim 17, wherein data stored within each of the plurality of cells of the memory channel is encoded with a respective type safety header identifying a respective data type of a plurality of data types of an item of data stored within a respective cell of the plurality of cells.

19. The computer-implemented method according to claim 18, wherein a given type safety header a given cell of the plurality of cells prohibits an attempted read operation of a given item of data stored within the given cell when the attempted read operation executes a read operation in a different data type than a data type identified by the given type safety header.

20. The computer-implemented method according to claim 18, further comprising:
   detecting an attempted read operation of a given data stored within a given cell of the plurality of cells when the attempted read operation executes a read operation in a different data type than a given data type identified by the type safety header;
   generating a read exception based on the detection of the attempted read operation; and
   automatically transforming the given data type of the type safety header of the given data to the different data type based on the read exception.

21. A computer-implemented system comprising:
   one or more processors;
   a memory;
   a computer-readable medium operably coupled to the one or more processors, the computer-readable medium having computer-readable instructions stored thereon that, when executed by the one or more processors, cause a computing device to perform operations comprising:
   implementing a cross-process queue within a single computer that enables a transfer of data between a first operating system process and a second operating system process, wherein:
   the first operating system process is created by executing a computer program written in a first computer language, and the second operating system process is created by executing a computer program written in a second computer language;
   receiving, at the cross-process queue, a data block from the first operating system process based on an execution by the first operating system process of a write operation to a memory of the cross-process queue, wherein the data block is encoded in a data structure of the first computer language;
   implementing a cell synchronization data structure tracking states of a plurality of cells of index of cells of the cross-process queue, wherein the cell synchronization data structure counts cells of the plurality of cells of the index of cells to determine available cells for the write operation and the read operation;

regulating a utilization of the cross-process queue for the first or second operating system process executing the write operation and read operation based on the count of cells of the index of cells that are available for the write operation and the read operation;

converting, by an interpreting application, the data block encoded in the data structure of the first computer language to a translated data block encoded in a data structure of the second computer language;

storing, within the memory of the cross-process queue, the translated data block based on the conversion of the data block; and enabling a read access, by the second operating system process, to the translated data block stored within the memory of the cross-process queue.

22. The computer-implemented system according to claim 21, wherein converting, by the interpreting application, the data block encoded in the data structure of the first computer language includes:

automatically converting one or more data types of the first computer language to one or more data types of the second computer language based on the receiving, at the cross-process queue, the data block from the first operating system process.

23. The computer-implemented system according to claim 21, wherein converting, by the interpreting application, the data block encoded in the data structure of the first computer language includes:

automatically converting one or more objects of the first computer language to one or more objects of the second computer language based on the receiving, at the cross-process queue, the data block from the first operating system process.

24. The computer-implemented system according to claim 21, wherein the first operating system process based on identifying the second computer language of the second operating system process, automatically connects to the interpreting application enabling the conversion of the data block during the write operation by the first operating system process to the memory of the cross-process queue.

25. The computer-implemented system according to claim 21, wherein the interpreting application is implemented as a child process of the first operating system process.

26. The computer-implemented system according to claim 25, wherein the interpreting application is extensible to interpreting a given data block encoded in the data structure of the first computer language to a target computer language of a plurality of computer languages based on identifying a computer language of a given operating system process that executes read operations in the target computer language.

27. The computer-implemented system according to claim 21, wherein the memory of the cross-process queue comprises:

a plurality of cells of fixed length that are available for writing data to and available for reading from by each of the first operating system process and the second operating system process.

28. The computer-implemented system according to claim 27, wherein data stored within each of the plurality of cells of the memory channel is encoded with a respective type safety header identifying a respective data type of a plurality of data types of an item of data stored within a respective cell of the plurality of cells.

29. The computer-implemented system according to claim 28, wherein a given type safety header a given cell of the plurality of cells prohibits an attempted read operation of a given item of data stored within the given cell when the attempted read operation executes a read operation in a different data type than a data type identified by the given type safety header.

30. The computer-implemented system according to claim 28, further comprising:

detecting an attempted read operation of a given data stored within a given cell of the plurality of cells when the attempted read operation executes a read operation in a different data type than a given data type identified by the type safety header;

generating a read exception based on the detection of the attempted read operation; and automatically transforming the given data type of the type safety header of the given data to the different data type based on the read exception.

* * * * *